United States Patent
Younkins et al.

(10) Patent No.: US 10,837,382 B2
(45) Date of Patent: Nov. 17, 2020

(54) MULTI-LEVEL FIRING ENGINE CONTROL

(71) Applicant: Tula Technology, Inc., San Jose, CA (US)

(72) Inventors: Matthew A. Younkins, San Jose, CA (US); Louis J. Serrano, Los Gatos, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/783,495

(22) Filed: Feb. 6, 2020

(65) Prior Publication Data

US 2020/0232404 A1 Jul. 23, 2020

Related U.S. Application Data

(60) Continuation of application No. 16/035,614, filed on Jul. 14, 2018, now Pat. No. 10,557,427, which is a
(Continued)

(51) Int. Cl.
*F02D 41/04* (2006.01)
*F02D 13/06* (2006.01)
(Continued)

(52) U.S. Cl.
CPC .......... *F02D 41/0087* (2013.01); *F01L 1/047* (2013.01); *F02D 11/02* (2013.01);
(Continued)

(58) Field of Classification Search
CPC ............. F02D 41/0087; F02D 41/0002; F02D 41/008; F02D 41/04; F02D 41/107;
(Continued)

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

CN 1715621 1/2006
CN 101608578 12/2009
(Continued)

OTHER PUBLICATIONS

International Search Report dated Feb. 19, 2016 from International Application No. PCT/US2015/059776.
(Continued)

*Primary Examiner* — Mahmoud Gimie
(74) *Attorney, Agent, or Firm* — Beyer Law Group LLP

(57) ABSTRACT

In various aspects, internal combustion engines, engine controllers and methods of controlling engines are described. The engine includes a camshaft and a two cylinder sets. Cylinders in the first are deactivatable and cylinders in the second set may be fired at high or low output levels. The air charge for each fired working cycle is set based on whether a high or low torque output is selected. In some implementations, the camshaft is axially shiftable between first and second positions. First cam lobes are configured to cause their associated cylinders to intake a large air charge during intake strokes that occur when the camshaft is in the first position. Second cam lobes for cylinders in the second set cause their associated cylinders to intake a smaller air charge when the camshaft is in the second position. Second cam lobes for cylinders in the first set deactivate their associated cylinders.

19 Claims, 27 Drawing Sheets

Related U.S. Application Data division of application No. 15/485,000, filed on Apr. 11, 2017, now Pat. No. 10,072,592, which is a continuation of application No. 15/274,029, filed on Sep. 23, 2016, now Pat. No. 9,689,328, which is a division of application No. 15/180,332, filed on Jun. 13, 2016, now Pat. No. 9,476,373, which is a division of application No. 14/919,011, filed on Oct. 21, 2015, now Pat. No. 9,399,964.

(60) Provisional application No. 62/077,439, filed on Nov. 10, 2014, provisional application No. 62/117,426, filed on Feb. 17, 2015, provisional application No. 62/121,374, filed on Feb. 26, 2015.

(51) Int. Cl.
| | |
|---|---|
| *F02D 13/02* | (2006.01) |
| *F02D 41/00* | (2006.01) |
| *F02D 17/02* | (2006.01) |
| *F02D 41/10* | (2006.01) |
| *F02D 41/12* | (2006.01) |
| *F02P 5/145* | (2006.01) |
| *F01L 1/047* | (2006.01) |
| *F02D 41/26* | (2006.01) |
| *F02P 5/15* | (2006.01) |
| *F02D 11/02* | (2006.01) |

(52) U.S. Cl.
CPC ..... *F02D 13/0223* (2013.01); *F02D 13/0273* (2013.01); *F02D 13/06* (2013.01); *F02D 17/02* (2013.01); *F02D 41/0002* (2013.01); *F02D 41/008* (2013.01); *F02D 41/04* (2013.01); *F02D 41/107* (2013.01); *F02D 41/123* (2013.01); *F02D 41/26* (2013.01); *F02P 5/145* (2013.01); *F02P 5/1502* (2013.01); *F02D 2041/001* (2013.01); *F02D 2041/0012* (2013.01); *F02D 2250/18* (2013.01); *Y02T 10/12* (2013.01); *Y02T 10/40* (2013.01)

(58) Field of Classification Search
CPC ........ F02D 41/123; F02D 41/26; F02D 11/02; F02D 13/0223; F02D 13/0273; F02D 13/06; F02D 17/02; F02D 2041/001; F02D 2041/0012; F02D 2250/18; F01L 1/047; F02P 5/146; F02P 5/1502; Y02T 10/12; Y02T 10/40
USPC ...................................................... 123/481
See application file for complete search history.

(56) References Cited

U.S. PATENT DOCUMENTS

| | | | |
|---|---|---|---|
| 4,509,488 A | 4/1985 | Forster et al. |
| 4,592,315 A | 6/1986 | Kobayashi et al. |
| 4,991,558 A | 2/1991 | Daly et al. |
| 5,117,790 A | 6/1992 | Clarke et al. |
| 5,129,407 A | 7/1992 | Phillips et al. |
| 5,154,151 A | 10/1992 | Bradshaw et al. |
| 5,377,631 A | 1/1995 | Schechter |
| 5,597,371 A | 1/1997 | Toukura |
| 5,617,829 A | 4/1997 | Bidner et al. |
| 5,713,315 A | 2/1998 | Jyoutaki et al. |
| 5,743,221 A | 4/1998 | Schmitz |
| 5,836,274 A | 11/1998 | Saito et al. |
| 6,158,411 A | 12/2000 | Morikawa |
| 6,343,581 B2 | 2/2002 | Suzuki |
| 6,382,193 B1 | 5/2002 | Boyer et al. |
| 6,443,125 B1 | 9/2002 | Mendler |
| 6,484,677 B2 | 11/2002 | Leone et al. |
| 6,571,771 B2 | 6/2003 | Doering et al. |
| 6,600,989 B2 | 7/2003 | Sellnau et al. |
| 6,619,258 B2 | 9/2003 | McKay et al. |
| 6,647,947 B2 | 11/2003 | Boyer et al. |
| 6,805,095 B2 | 10/2004 | Sun et al. |
| 6,866,020 B2 | 3/2005 | Allston et al. |
| 7,058,501 B2 | 6/2006 | Yasui et al. |
| 7,063,062 B2 | 6/2006 | Lewis et al. |
| 7,066,136 B2 | 6/2006 | Ogiso |
| 7,072,758 B2 | 7/2006 | Kolmanovsky et al. |
| 7,086,386 B2 | 8/2006 | Doering |
| 7,128,044 B1 | 10/2006 | Doering et al. |
| 7,140,355 B2 | 11/2006 | Michelini et al. |
| 7,146,966 B2 | 12/2006 | Nakamura |
| 7,167,792 B1 | 1/2007 | Kolmanovsky et al. |
| 7,249,583 B2 | 7/2007 | Bidner et al. |
| 7,249,584 B2 | 7/2007 | Rozario et al. |
| 7,260,467 B2 | 8/2007 | Megli et al. |
| 7,377,260 B2 | 5/2008 | Jehle et al. |
| 7,426,915 B2 | 9/2008 | Gibson et al. |
| 7,503,312 B2 | 3/2009 | Surnilla et al. |
| 7,562,530 B2 | 7/2009 | Kolmanovsky |
| 7,577,511 B1 | 8/2009 | Tripathi et al. |
| 7,603,972 B2 | 10/2009 | Han et al. |
| 7,757,657 B2 | 7/2010 | Albertson et al. |
| 7,765,806 B2 | 8/2010 | Clark |
| 7,801,691 B2 | 9/2010 | Panciroli et al. |
| 7,849,835 B2 | 12/2010 | Tripathi et al. |
| 7,908,913 B2 | 3/2011 | Cinpinski et al. |
| 7,930,087 B2 | 4/2011 | Gibson et al. |
| 7,950,359 B2 | 5/2011 | Choi |
| 7,954,474 B2 | 6/2011 | Tripathi et al. |
| 8,028,665 B2 | 10/2011 | Ralston |
| 8,061,318 B2 | 11/2011 | Cleary et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,215,099 B2 | 7/2012 | Ono et al. |
| 8,286,471 B2 | 10/2012 | Doering |
| 8,312,849 B2 | 11/2012 | Roe et al. |
| 8,347,857 B2 | 1/2013 | Cleary et al. |
| 8,402,942 B2 | 3/2013 | Tripathi et al. |
| 8,468,987 B2 | 6/2013 | Kirchweger et al. |
| 8,473,179 B2 | 6/2013 | Whitney et al. |
| 8,499,743 B2 | 8/2013 | Tripathi et al. |
| 8,511,281 B2 | 8/2013 | Tripathi et al. |
| 8,631,646 B2 | 1/2014 | Smith et al. |
| 8,789,502 B2 | 7/2014 | Barnes |
| 8,839,766 B2 | 9/2014 | Serrano et al. |
| 8,892,330 B2 | 11/2014 | Yuille et al. |
| 8,931,444 B2 | 1/2015 | McConville et al. |
| 9,086,020 B2 | 7/2015 | Tripathi et al. |
| 9,239,037 B2 | 1/2016 | Carlson et al. |
| 9,399,964 B2 | 7/2016 | Younkins et al. |
| 9,476,373 B2 | 10/2016 | Younkins et al. |
| 9,482,202 B2 | 11/2016 | Carlson et al. |
| 9,605,601 B2 | 3/2017 | Leone |
| 9,982,611 B2 | 5/2018 | Tripathi et al. |
| 10,557,427 B2 | 2/2020 | Younkins et al. |
| 2001/0023686 A1 | 9/2001 | Okamoto et al. |
| 2001/0035141 A1 | 11/2001 | Pierik |
| 2002/0096134 A1 | 7/2002 | Michelini et al. |
| 2003/0062019 A1 | 4/2003 | Schaefer-Siebert |
| 2003/0230280 A1 | 12/2003 | Allston |
| 2004/0182340 A1 | 9/2004 | Cecur |
| 2004/0237949 A1 | 12/2004 | Yasui |
| 2005/0000480 A1 | 1/2005 | Yasui et al. |
| 2005/0045156 A1 | 3/2005 | Yokoi |
| 2005/0150561 A1 | 7/2005 | Flynn et al. |
| 2005/0161023 A1 | 7/2005 | Albertson |
| 2005/0193720 A1 | 9/2005 | Surnilla et al. |
| 2005/0199220 A1 | 9/2005 | Ogiso |
| 2005/0268880 A1 | 12/2005 | Bidner et al. |
| 2005/0284438 A1 | 12/2005 | Hasebe |
| 2006/0020386 A1 | 1/2006 | Kang |
| 2006/0037578 A1 | 2/2006 | Nakamura |
| 2006/0101903 A1 | 5/2006 | Moninger |
| 2006/0169231 A1 | 8/2006 | Fuwa |
| 2006/0180119 A1 | 8/2006 | Winstead |

(56) References Cited

U.S. PATENT DOCUMENTS

| | | |
|---|---|---|
| 2006/0236960 A1 | 10/2006 | Nakamura et al. |
| 2007/0006831 A1 | 1/2007 | Leone et al. |
| 2007/0012283 A1 | 1/2007 | Rockwell |
| 2007/0131196 A1 | 6/2007 | Gibson et al. |
| 2007/0157901 A1 | 7/2007 | Caine et al. |
| 2007/0215106 A1 | 9/2007 | Petridis et al. |
| 2007/0233332 A1 | 10/2007 | Kawada et al. |
| 2007/0234985 A1 | 10/2007 | Kolmanovsky |
| 2007/0235005 A1 | 10/2007 | Lewis |
| 2008/0035082 A1 | 2/2008 | Liu et al. |
| 2008/0135021 A1 | 6/2008 | Michelini et al. |
| 2008/0156293 A1 | 7/2008 | Huang |
| 2009/0048764 A1 | 2/2009 | Fuwa |
| 2009/0151673 A1 | 6/2009 | Choi |
| 2009/0177371 A1 | 7/2009 | Reinke |
| 2009/0204312 A1 | 8/2009 | Moriya |
| 2009/0277407 A1 | 11/2009 | Ezaki |
| 2010/0050993 A1 | 3/2010 | Zhao et al. |
| 2010/0100299 A1 | 4/2010 | Tripathi et al. |
| 2011/0000459 A1 | 1/2011 | Elsäβer |
| 2011/0073069 A1 | 3/2011 | Marriott et al. |
| 2011/0139099 A1 | 6/2011 | Roe et al. |
| 2011/0146637 A1 | 6/2011 | Kang et al. |
| 2011/0208405 A1 | 8/2011 | Tripathi et al. |
| 2011/0213541 A1 | 9/2011 | Tripathi et al. |
| 2011/0214640 A1 | 9/2011 | Chang et al. |
| 2012/0031357 A1 | 2/2012 | Ervin et al. |
| 2012/0042633 A1 | 2/2012 | Silvestri et al. |
| 2013/0006497 A1 | 1/2013 | Silvers et al. |
| 2013/0008412 A1 | 1/2013 | Kidooka et al. |
| 2013/0066502 A1 | 3/2013 | Yuille et al. |
| 2013/0092128 A1 | 4/2013 | Pirjaberi et al. |
| 2013/0118443 A1 | 5/2013 | Tripathi et al. |
| 2013/0276730 A1 | 10/2013 | Borean et al. |
| 2014/0041624 A1 | 2/2014 | Rayl et al. |
| 2014/0041625 A1* | 2/2014 | Pirjaberi ............... F02D 17/02 123/349 |
| 2014/0045652 A1 | 2/2014 | Carlson et al. |
| 2014/0069381 A1 | 3/2014 | Beikmann |
| 2014/0109847 A1 | 4/2014 | Hayman et al. |
| 2014/0158067 A1 | 6/2014 | Woo et al. |
| 2014/0277999 A1 | 9/2014 | Switkes et al. |
| 2014/0318485 A1 | 10/2014 | Stolk et al. |
| 2014/0360477 A1 | 12/2014 | Doering et al. |
| 2015/0233308 A1 | 8/2015 | Kidooka et al. |
| 2015/0308301 A1 | 10/2015 | Mcconville et al. |
| 2015/0322869 A1 | 11/2015 | Shost |
| 2016/0003168 A1 | 1/2016 | Leone et al. |
| 2016/0003169 A1 | 1/2016 | Leone et al. |
| 2016/0010568 A1* | 1/2016 | Whiston ............... F02D 13/06 123/445 |
| 2016/0040614 A1 | 2/2016 | Younkins et al. |
| 2016/0102616 A1* | 4/2016 | McConville ....... F02D 41/3064 123/334 |
| 2016/0102620 A1* | 4/2016 | Ervin ................. F02D 41/0087 123/345 |
| 2016/0108798 A1 | 4/2016 | VanDerWege |
| 2016/0108828 A1 | 4/2016 | Glugla |
| 2016/0115878 A1 | 4/2016 | VanDerWege |
| 2016/0115884 A1 | 4/2016 | Vanderwege |
| 2016/0146120 A1* | 5/2016 | Kawaguchi ........... F02D 13/023 123/559.2 |
| 2016/0160701 A1 | 6/2016 | Choi et al. |
| 2016/0222899 A1 | 8/2016 | Glugla |
| 2016/0377007 A9 | 12/2016 | Wilcutts et al. |
| 2017/0009729 A1 | 1/2017 | Younkins et al. |
| 2017/0218866 A1 | 8/2017 | Shost et al. |
| 2017/0218867 A1 | 8/2017 | Younkins et al. |
| 2019/0003442 A1 | 1/2019 | Ortiz-Soto et al. |

FOREIGN PATENT DOCUMENTS

| | | |
|---|---|---|
| CN | 101978141 | 9/2012 |
| DE | 3018065 | 1/1982 |
| DE | 4406982 | 9/1998 |
| DE | 0980965 A2 | 2/2000 |
| EP | 2669495 | 12/2013 |
| JP | H05306637 | 11/1993 |
| JP | H09170462 | 6/1997 |
| JP | 2001-271661 | 10/2001 |
| JP | 2001217661 | 10/2001 |
| JP | 2005067591 | 3/2005 |
| JP | 2006242012 A | 9/2006 |
| JP | 2008255866 | 10/2008 |
| JP | 2009002173 | 1/2009 |
| JP | 2011043076 | 3/2011 |
| JP | 2011089525 | 5/2011 |
| JP | 2012233423 | 11/2012 |
| JP | 2014020265 | 2/2014 |
| WO | WO 2010/006311 | 1/2010 |
| WO | WO 2011/085383 | 7/2011 |
| WO | WO 2012112817 | 8/2012 |
| WO | WO 2016036936 | 3/2016 |

OTHER PUBLICATIONS

Written Opinion dated Feb. 19, 2016 from International Application No. PCT/US2015/059776.
International Search Report dated Sep. 3, 2015 from International Application No. PCT/US 15/29543.
Written Opinion dated Sep. 3, 2015 from International Application No. PCT/US 15/29543.
Chinese Office Action dated Apr. 9, 2020 from Chinese Application No. 201810728715.7.
Chinese Office Action dated Apr. 7, 2020 from Chinese Application No. 201810728990.9.
Japanese Office Action dated Dec. 12, 2018 from Japanese Application No. 2017-523940.
Chinese Office Action dated Feb. 1, 2018 from Chinese Application No. 201580059861.X.
German Office Action dated Sep. 12, 2018 from German Application No. 11 2015 005 091.4.
Japanese Notice of Allowance dated Jul. 2, 2019 from Japanese Application No. 2017-523940.
Japanese Office Action dated Jul. 21, 2020 from Japanese Application No. 2019-142263.
Japanese Office Action dated Aug. 12, 2020 from Japanese Application No. 2019-142264.

* cited by examiner

1300

|  | | Normal Valve | |
|---|---|---|---|
|  | | ON | OFF |
| EIVC Valve | ON | Higher Load, Moderate Swirl 1302 | Low Load, High Swirl 1304 |
|  | OFF | High Load, High Swirl 1306 | Deactivated Cylinder 1308 |

|  | | Normal Valve | |
|---|---|---|---|
|  | | ON | OFF |
| LIVC Valve | ON | Low Load, Low-Mod Swirl 1352 | Low Load, High Swirl 1354 |
|  | OFF | High Load, High Swirl 1356 | Deactivated Cylinder 1358 |

*FIG. 13B*

Fuel Economy Gain In Simulation

|  | 1 | 2 | 3 | 4 |
|---|---|---|---|---|
| Power Level 1 | Full | Full | Full | Full |
| Power Level 2 |  |  |  |  |
| Power Level 3 | Zero | Zero | Zero | Zero |

|  | 1 | 2 | 3 | 4 |
|---|---|---|---|---|
| Power Level 1 | Full | Full | Full | Full |
| Power Level 2 |  |  |  |  |
| Power Level 3 |  | Zero | Zero |  |

|  | 1 | 2 | 3 | 4 |
|---|---|---|---|---|
| Power Level 1 | Full | Full | Full | Full |
| Power Level 2 | Partial | Partial | Partial | Partial |
| Power Level 3 | Zero | Zero | Zero | Zero |

|  | 1 | 2 | 3 | 4 |
|---|---|---|---|---|
| Power Level 1 | Full | Full | Full | Full |
| Power Level 2 | Partial |  |  | Partial |
| Power Level 3 | Zero |  |  | Zero |

|  | 1 | 2 | 3 | 4 |
|---|---|---|---|---|
| Power Level 1 | Full | Full | Full | Full |
| Power Level 2 | Partial |  |  | Partial |
| Power Level 3 | Zero | Zero | Zero | Zero |

Fuel Economy Gain In Simulation 9.3%

FIG. 14E

|  | 1 | 2 | 3 | 4 |
|---|---|---|---|---|
| Power Level 1 | Full | Full | Full | Full |
| Power Level 2 |  | Partial | Partial |  |
| Power Level 3 | Zero |  |  | Zero |

|  | 1 | 2 | 3 | 4 |
|---|---|---|---|---|
| Power Level 1 | Full | Full | Full | Full |
| Power Level 2 | Partial | Partial | Partial | Partial |
| Power Level 3 | Zero |  |  | Zero |

|  | 1 | 2 | 3 | 4 |
|---|---|---|---|---|
| Power Level 1 | Full | Full | Full | Full |
| Power Level 2 | Partial | Partial | Partial | Partial |
| Power Level 3 |  |  |  |  |

| EFF/RPM | 1000 | 1050 | 1100 | 1150 | 1200 | 1250 | 1300 | 1350 | 1400 | 1450 | 1500 |
|---|---|---|---|---|---|---|---|---|---|---|---|
| 0.23 | 0 | 0 | 0 | 0.11 | 0.13 | 0.15 | 0.17 | 0.19 | 0.21 | 0.23 | 0.25 |
| 0.28 | 0 | 0 | 0 | 0 | 0 | 0 | 0 | 0 | 0 | 0 | 0.12 |
| 0.33 | 0 | 0 | 0 | 0 | 0 | 0 | 0.12 | 0.13 | 0.14 | 0.16 | 0.17 |
| 0.35 | 0.15 | 0.17 | 0.2 | 0.22 | 0.23 | 0.26 | 0.28 | 0.31 | 0.35 | 0.36 | 0.37 |
| 0.43 | 0 | 0 | 0 | 0 | 0 | 0.12 | 0.13 | 0.15 | 0.18 | 0.2 | 0.22 |
| 0.5 | 0 | 0.12 | 0.14 | 0.15 | 0.16 | 0.18 | 0.2 | 0.22 | 0.24 | 0.25 | 0.26 |
| 0.47 | 0 | 0 | 0 | 0.11 | 0.13 | 0.15 | 0.17 | 0.19 | 0.21 | 0.23 | 0.25 |
| 0.57 | 0 | 0 | 0 | 0 | 0 | 0.12 | 0.14 | 0.15 | 0.16 | 0.18 | 0.2 |
| 0.67 | 0 | 0 | 0 | 0 | 0 | 0 | 0.12 | 0.13 | 0.14 | 0.16 | 0.17 |
| 0.7 | 0.54 | 0.55 | 0.56 | 0.56 | 0.57 | 0.57 | 0.58 | 0.59 | 0.59 | 0.6 | 0.61 |
| 0.85 | 0.35 | 0.41 | 0.47 | 0.51 | 0.55 | 0.57 | 0.58 | 0.59 | 0.59 | 0.6 | 0.61 |
| 1 | 1.00 | 1.00 | 1.00 | 1.00 | 1.00 | 1.00 | 1.00 | 1.00 | 1.00 | 1.00 | 1.00 |

FIG. 18

| EFF | FF | HLF |
|---|---|---|
| 0.23 | 1/3 | 0 |
| 0.28 | 1/3 | 1/2 |
| 0.33 | 1/3 | 1 |
| 0.35 | 1/2 | 0 |
| 0.43 | 1/2 | 1/2 |
| 0.50 | 1/2 | 1 |
| 0.47 | 2/3 | 0 |
| 0.57 | 2/3 | 1/2 |
| 0.67 | 2/3 | 1 |
| 0.70 | 1 | 0 |
| 0.85 | 1 | 1/2 |
| 1.00 | 1 | 1 |

Table 2200 — efficiency (EFF) vs. cylinder firing pattern:

| EFF | 1 | 2 | 3 | 4 | 1 | 2 | 3 | 4 | 1 | 2 | 3 | 4 |
|---|---|---|---|---|---|---|---|---|---|---|---|---|
| 0.23 | 1 | 0 | 0 | 0 | 0 | 0 | 0 | 0 | 0 | 0 | 0 | 0 |
| 0.28 | 0.7 | 0 | 0 | 0.7 | 0 | 0 | 0.7 | 0 | 0 | 0.7 | 0 | 0 |
| 0.33 | 0.7 | 0 | 0.7 | 0 | 0 | 0.7 | 0 | 0 | 0.7 | 0 | 0 | 0 |
| 0.35 | 1 | 0 | 0.7 | 0 | 0.7 | 0 | 0.7 | 0 | 0.7 | 0 | 0.7 | 0 |
| 0.43 | 0.7 | 0 | 1 | 0 | 1 | 0 | 1 | 0 | 1 | 0 | 1 | 0 |
| 0.50 | 1 | 0 | 1 | 0 | 1 | 0 | 1 | 0 | 1 | 0 | 1 | 0 |
| 0.47 | 0.7 | 0.7 | 0 | 0.7 | 0.7 | 0.7 | 0 | 0.7 | 0.7 | 0.7 | 0 | 0.7 |
| 0.57 | 0.7 | 0 | 0.7 | 1 | 0.7 | 0 | 0.7 | 1 | 0.7 | 0 | 0.7 | 1 |
| 0.67 | 1 | 0.7 | 1 | 0.7 | 1 | 0.7 | 1 | 0.7 | 1 | 0.7 | 1 | 0.7 |
| 0.70 | 0.7 | 1 | 0.7 | 1 | 0.7 | 1 | 0.7 | 1 | 0.7 | 1 | 0.7 | 1 |
| 0.85 | 0.7 | 1 | 0.7 | 1 | 0.7 | 1 | 0.7 | 1 | 0.7 | 1 | 0.7 | 1 |
| 1.00 | 1 | 1 | 1 | 1 | 1 | 1 | 1 | 1 | 1 | 1 | 1 | 1 |

MULTI-LEVEL FIRING ENGINE CONTROL

CROSS-REFERENCE TO RELATED APPLICATIONS

This application is a Continuation of U.S. application Ser. No. 16/035,614, filed on Jul. 14, 2018 which is a Divisional of U.S. application Ser. No. 15/485,000, filed on Apr. 11, 2017 (now U.S. Pat. No. 10,072,592, issued Sep. 11, 2018), which is a Continuation of U.S. application Ser. No. 15/274,029 (now U.S. Pat. No. 9,689,328, issued Jun. 27, 2017) filed Sep. 23, 2016, which is a Divisional of U.S. application Ser. No. 15/180,332 (now U.S. Pat. No. 9,476,373, issued Oct. 25, 2016), filed Jun. 13, 2016. U.S. application Ser. No. 15/180,332 is a Divisional of U.S. application Ser. No. 14/919,011 (now U.S. Pat. No. 9,399,964, issued Jul. 26, 2016), filed Oct. 21, 2015, which claims priority to U.S. Provisional Patent Application Nos. 62/077,439, filed Nov. 10, 2014; 62/117,426, filed Feb. 17, 2015; and 62/121,374, filed Feb. 26, 2015. All of these priority applications are incorporated herein in their entirety for all purposes.

FIELD OF THE INVENTION

The present invention relates to methods and systems for operating an engine in a skip fire manner. In various embodiments, skip fire engine control systems are described that can selectively deactivate working chambers and fire them at multiple different output levels.

BACKGROUND

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. Engine control approaches that vary the effective displacement of an engine can be classified into two types of control, multiple fixed displacements and skip fire. In fixed multiple displacement control some fixed set of cylinders is deactivated under low load conditions; for example, an 8 cylinder engine that can operate on the same 4 cylinders under certain conditions. In contrast, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Similarly, firing every other cylinder in a 3 cylinder engine would provide an effective displacement of $\frac{1}{2}$, which is a fractional displacement that is not obtainable by simply deactivating a set of cylinders. U.S. Pat. No. 8,131,445 (which was filed by the assignee of the present application and is incorporated herein by reference in its entirety for all purposes) teaches a variety of skip fire engine control implementations. In general, skip fire engine control is understood to offer a number of potential advantages, including the potential of significantly improved fuel economy in many applications. Although the concept of skip fire engine control has been around for many years, and its benefits are understood, skip fire engine control has not yet achieved significant commercial success.

It is well understood that operating engines tend to be the source of significant noise and vibrations, which are often collectively referred to in the field as NVH (noise, vibration and harshness). In general, a stereotype associated with skip fire engine control is that skip fire operation of an engine will make the engine run significantly rougher, that is with increased NVH, relative to a conventionally operated engine. In many applications such as automotive applications, one of the most significant challenges presented by skip fire engine control is vibration control. Indeed, the inability to satisfactorily address NVH concerns is believed to be one of the primary obstacles that has prevented widespread adoption of skip fire types of engine control.

U.S. Pat. Nos. 7,954,474; 7,886,715; 7,849,835; 7,577,511; 8,099,224; 8,131,445 and 8,131,447 and U.S. patent application Ser. Nos. 13/004,839; 13/004,844; and others, describe a variety of engine controllers that make it practical to operate a wide variety of internal combustion engines in a skip fire operational mode. Each of these patents and patent applications is incorporated herein by reference. Although the described controllers work well, there are continuing efforts to further improve the performance of these and other skip fire engine controllers to further mitigate NVH issues in engines operating under skip fire control. The present application describes additional skip fire control features and enhancements that can improve engine performance in a variety of applications.

SUMMARY

The present invention relates generally to engine control. In one aspect, an internal combustion engine is described. The engine includes a plurality of working chambers (e.g. cylinders) and a camshaft. The working chambers are arranged in first and second sets. Each working chamber has at least one associated intake valve and at least one associated exhaust valve. The camshaft has a multiplicity of cam lobes. Each of the cam lobes is associated with an associated working chamber and an associated intake valve. Each working chamber has first and second associated cam lobes of the multiplicity of cam lobes. The camshaft is axially shiftable between a first axial position in which the first cam lobes engage their associated intake valves and a second axial position in which the second cam lobes engage their associated intake valves. The first cam lobes are configured to cause all of the working chambers to intake a large air charge during intake strokes that occur when the camshaft is in the first axial position. The second cam lobes associated with working chambers in the second working chamber set cause the associated working chambers to intake a second air charge that is smaller than the first air charge during intake strokes that occur when the camshaft is in the second axial position. The second cam lobes associated with working chambers in the first working chamber set cause the associated working chambers to not intake an air charge during intake strokes that occur when the camshaft is in the second axial position to thereby deactivate the associated working chambers.

In some embodiments, the camshaft is additionally axially shiftable to a third axial position in which third cam lobes associated with working chambers in the first working chamber set cause the associated working chambers to intake the second air charge and wherein the working chambers in the second working chamber set also intake the second air charge when the camshaft is in the third axial position.

In some embodiments, there are a total of four working chambers arranged in a single bank. In some such embodiments, and working chambers in the first set are located at opposing ends of the bank.

In some embodiments, the first cam lobes have a first lift profile, the second cam lobes associated with the working chambers in the second set have a second lift profile, and the second cam lobes associated with working chambers in the first set have a third lift profile, the first, second and third lift profiles being different.

In some embodiments, the first cam lobes have a first lift profile, the second cam lobes associated with the working chambers in the second set of working chambers have a second lift profile, the third cam lobes associated with the working chambers in the first set of working chambers have the second lift profile, and the second cam lobes associated with working chambers in the first set of working chambers have a third lift profile, the first, second and third lift profiles being different.

In another aspect, a method of controlling operation of an internal combustion engine is described. The engine has plurality of working chambers, with each working chamber having at least one cam-actuated intake valve and at least one exhaust valve. The working chambers are arranged in first and second working chamber sets each including at least one working chamber. Working chambers in the first set are deactivatable and working chambers in the second set are not capable of being deactivated during operation of the engine. The engine is operated to deliver a desired engine output by causing each of the working chambers in the second set to be fired during every engine cycle and causing the working chambers in the first set to sometimes be fired and sometimes be skipped. The air charge for each fired working cycle is set based on whether a high or low torque output was selected for the fired working cycle.

In another method aspect, the engine is operated in a skip fire manner that skips selected skipped working cycles and fires selected working cycles to deliver a desired engine output. An air charge is adjusted for each fired working cycle based on whether a high or low torque output was selected for the fired working cycle.

In some embodiments, the internal combustion engine includes a camshaft that carries a multiplicity of cam lobes. The camshaft is axially shifted from a first position to a second position to adjust the air charge for at least a first one of the intake valve. In a first camshaft position, a first one of the cam lobes engages the first intake valves, and in the second camshaft position, a second one of the cam lobes engages the first intake valve.

In some embodiments, one of the cam lobes associated with each working chambers in the first set is a zero-lift lobe that effectively deactivates its associated working chamber.

Selected engine setting may be adjusted to ensure that the engine delivers the desired output. In some embodiments, the adjusted engine setting may include a setting selected from a group consisting of spark timing, cam timing, exhaust gas recirculation adjustment, and throttle position.

In some embodiments, all of the working chambers are arranged in a single bank. In some implementation, the first set of working chambers are the working chambers positioned at opposing ends of the bank.

Various engine controllers capable of implementing the described methods are also disclosed.

BRIEF DESCRIPTION OF THE DRAWINGS

The invention and the advantages thereof, may best be understood by reference to the following description taken in conjunction with the accompanying drawings in which:

FIGS. 13A-13B are charts illustrating how valves can be operated to generate different levels of torque output from a working chamber in accordance with various embodiments of the present invention.

FIGS. 14A-14H are charts illustrating different arrangements and features of working chambers according to various embodiments of the present invention.

FIG. 18 is an example lookup table indicating maximum allowable working chamber output as a function of engine speed and an effective firing fraction.

FIG. 19 is an example lookup table indicating a firing fraction and a level fraction as a function of an effective firing fraction.

FIG. 22 is an example lookup table that provides a multi-level skip fire firing sequence as a function of an effective firing fraction.

In the drawings, like reference numerals are sometimes used to designate like structural elements. It should also be appreciated that the depictions in the figures are diagrammatic and not to scale.

DETAILED DESCRIPTION

Figure 1B:
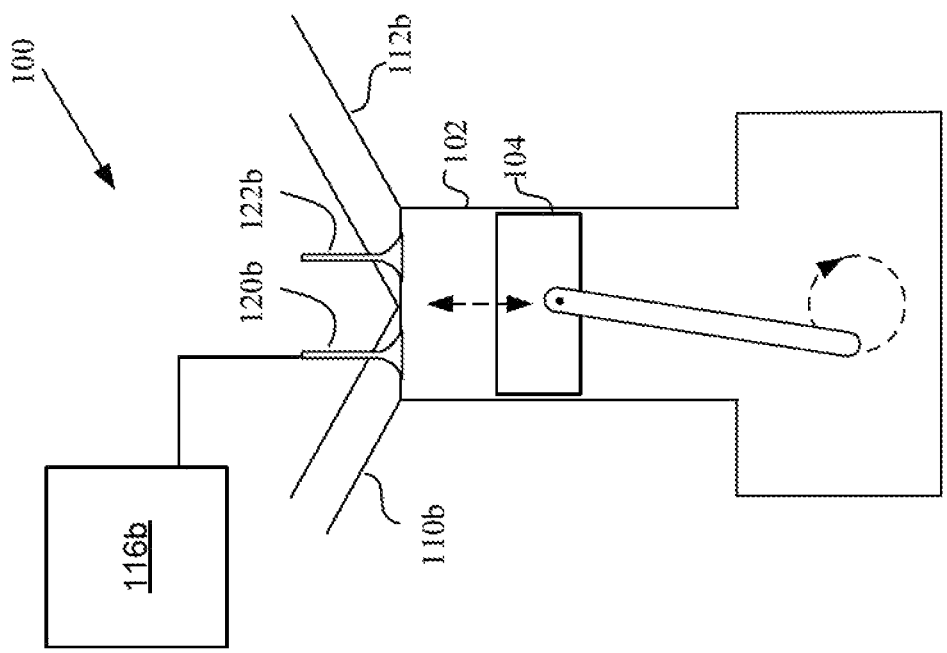
FIGS. 1A and 1B are cross-sectional views of a working chamber and an associated valve control system according to a particular embodiment of the present invention.

The present invention relates to a system for operating an internal combustion engine in a skip fire manner. More specifically, various implementations of the present invention involve a skip fire engine control system that is capable of selectively firing a working chamber at multiple different torque output levels.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

One challenge with skip fire engine control is reducing undesirable noise, vibration and harshness (NVH) to an acceptable level. The noise and vibration produced by the engine can be transmitted to occupants in the vehicle cabin through a variety of paths. Some of these paths, for example the drive train, can modify the amplitude of the various frequency components present in the engine noise and vibration signature. Specifically, lower transmission gear ratios tend to amplify vibrations, since the transmission is increasing the torque and the torque variation at the wheels. The noise and vibration can also excite various vehicle resonances, which can then couple into the vehicle cabin.

Some noise and vibration frequencies can be particularly annoying for vehicle occupants. In particular, low frequency, repeating patterns (e.g., frequency components in the range of 0.2 to 8 Hz) tend to generate undesirable vibrations perceived by vehicle occupants. The higher order harmonics of these patterns can cause noise in the passenger cabin. In particular, a frequency around 40 Hz may resonate within the vehicle cabin, the so called "boom" frequency. Commercially viable skip fire engine control requires operating at an acceptable NVH level while simultaneously delivering the driver desired or requested engine torque output and achieving significant fuel efficiency gains.

The NVH characteristics vary with the engine speed, firing frequency, and transmission gear. For example, consider an engine controller that selects a particular firing frequency that indicates a percentage of firings necessary to deliver a desired torque at a particular engine speed and gear. Based on the firing frequency, the engine controller generates a repeating firing pattern to operate the working chambers of the engine in a skip fire manner. As is well known by those familiar in the art, at a given engine speed an engine that runs smoothly with some firing patterns may generate undesirable acoustic or vibration effects with other firing patterns. Likewise, a given firing pattern may provide acceptable NVH at one engine speed, but the same pattern may produce unacceptable NVH at other engine speeds. Engine induced noise and vibration is also affected by the cylinder load or working chamber output. If less air and fuel is delivered to a cylinder, the firing of the cylinder will generate less output, as well as less noise and vibration. As a result, if the cylinder output is reduced, some firing frequencies and sequences that were unusable due to their poor NVH characteristics may then become usable.

As described in U.S. patent application Ser. No. 14/638,908, which is incorporated herein in its entirety for all purposes, it is generally desirable for a skip fire engine controller design to deliver the requested engine output while minimizing fuel consumption and providing acceptable NVH performance. This is a challenging problem because of the wide range of operating conditions encountered during vehicle operation. A requested engine output may be expressed as a torque request at an engine operating speed. It should be appreciated that the amount of engine torque delivered can be represented by the product of the firing frequency and the cylinder load. Thus, if the firing frequency (FF) is increased, the cylinder torque fraction (CTF) can be decreased to generate the same engine torque, and vice versa. In other words, $$\text{Engine Torque Fraction (ETF)} = CTF*FF \quad \text{(Eq. 1)}$$

where the ETF is a value that represents normalized net or indicated engine torque. In this equation all values are dimensionless, which allows it to be used with all types of engines and in all types of vehicles. That is, to deliver the same engine torque, a variety of different firing frequencies and CTF combinations may be used. Equation 1 does not include the affects of engine friction. A similar analysis could be done including friction. In this case the calculated parameter would be brake torque fraction. Either engine net torque fraction, engine brake torque fraction, engine indicated torque fraction, or some similar metric can be used as the basis of a control algorithm. For clarity the term engine torque fraction can refer to any of these measures of engine output and will be used in the subsequent discussion of engine controllers and engine control methods.

Various embodiments of the present invention relate to a skip fire engine control system that is capable of firing a selected working chamber at multiple different output levels. This is referred to herein as multi-level skip fire operation. In some embodiments, multi-level skip fire operation can be modeled by modifying Eq. 1 above to include the possibility of multiple firing levels as follows:

$$\text{Engine Torque Fraction (ETF)} = CTF_1*FF_1 + CTF_2*FF_2 + \ldots + CTF_n*FF_n \quad \text{(Eq. 2)}$$

Where $CTF_1$ is the cylinder torque fraction and $FF_1$ is the firing fraction at the first level, $CTF_2$ is the cylinder torque fraction and $FF_2$ is the firing fraction at the second level, and $CTF_n$ is the cylinder torque fraction and $FF_n$ is the firing fraction at the $n^{th}$ level. The sum of the various level firing fractions equals the total firing fraction, i.e.

$$FF = FF_1 + FF_2 + \ldots + FF_n \quad \text{(Eq. 3)}$$

In some embodiments described below, n equals two, although this is not a limitation.

It should be appreciated that there are many equivalent methods of expressing the concepts described above. For example, instead of modeling based on an engine torque fraction (ETF) the modeling could be based on the net engine torque (ET), since the quantities are simply proportional. The cylinder torque fraction (CTF) may be proportional to the net mean effective pressure (NMEP) and the $n^{th}$ level firing fraction ($FF_n$) may be proportional to the fractional engine displacement for cylinders operating at the $n^{th}$ level (FEDn). Equation 2 can thus be equivalently formulated as $$ET = +NMEP_2*FED_2 + \ldots + NMEPn*FEDn \quad \text{(Eq. 4)}$$

Equation 4 above is only an exemplary reformation and many equivalent reformations may be devised. They all have in common a quantity related to engine output torque expressed as a sum of quantities where each quantity is related to the output of a cylinder group and there are at least two cylinder groups having different non-zero outputs.

An example of multi-level skip fire operation may be described as follows. A working chamber may be deactivated during one selected working cycle, fired at a high level of output during the next working cycle, and then fired at a lower level of output (e.g., 0-80% of the high level output) during the next working cycle. In various implementations, the low level output may substantially correspond to a working chamber load that provides optimum fuel efficiency, i.e. the lowest BSFC (brake specific fuel consumption) operating point. As is well known, the BSFC working chamber load varies as a function of RPM. As such, the ratio between the high and low firing level may vary as a function of engine RPM and possibly other variables in various embodiments of the present invention. The firings and deactivations are coordinated so that a desired engine torque is generated. The availability of multi-level skip fire operation allows the engine control system to have more options for finding a balance between engine output, fuel efficiency, noise and vibration.

It should be appreciated that any suitable technology may be used to enable multi-level skip fire operation. In some embodiments, for example, working chamber torque output is controlled using throttle control, spark timing, valve timing, MAP adjustment and/or exhaust gas recirculation. In this application, a variety of working chamber control systems and arrangements are described. Such systems are arranged to enable a working chamber to generate multiple levels of torque output. This application also describes various multi-level skip fire engine control methods (e.g., as described in connection with FIGS. 16-26), which may be implemented using the aforementioned systems. However, these methods are not limited to the systems described herein, and may be used with any suitable working chamber design, system, or mechanism.

Working Chamber Valve Control System

Figure 1A:
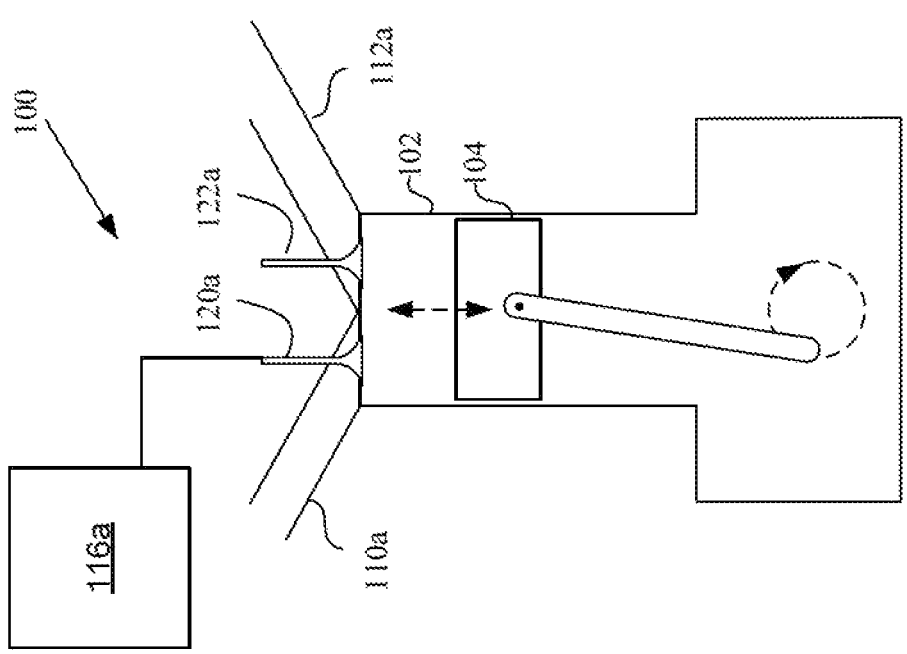

Various embodiments of the present invention relate to a working chamber valve control system. Referring initially to FIGS. 1A and 1B, two cross-sectional views of an example working chamber valve control system 100 will be described. The working chamber valve control system 100 includes a working chamber 102 with a piston 104, two intake valves 120a/120b and two exhaust valves 122a/122b. Actuators 116a/116b control the opening and closing of the intake valves. Intake passages 110a/110b couple the intake valves 120a/120b, respectively, with an intake manifold (not shown).

When an intake valve is opened, air is delivered from the intake manifold into the working chamber 102 through the corresponding intake passage 110a/110b. As is well known to persons of ordinary skill in the art, if the working chamber 102 is to be fired, the air is mixed with fuel in the working chamber 102 and the fuel-air mixture is ignited. The resulting combustion drives the piston 104 to the bottom of the working chamber 102. The exhaust valves 122a/122b are opened and exhaust gases are pushed out of the working chamber 102 into the exhaust passages 112a/112b as the piston 104 rises.

In many conventional designs, the intake valves 120a/120b of the working chamber 102 are opened and closed at the same time. That is, they are controlled by the same actuator and/or are opened and closed in accordance with the same lift profile. The timing of the lift profile may be adjusted using a cam phaser, which shifts the valve opening and closing times relative to the crankshaft motion. However, in various conventional designs, cam phaser mechanics generally allow only small changes in the valve timing on a cycle to cycle basis and operate all cylinders in a bank in a similar manner. In the illustrated embodiment, however, intake valves 120a/120b are actuated and operated independently. From one working cycle to the next, the timing of the opening and closing of one intake valve may differ or be the same as the other intake valve. By way of example, during a selected working cycle, the intake valve 120a may remain deactivated or closed, while the intake valve 120b is opened to allow air into the working chamber. Alternatively, during a selected working cycle, intake valve 120a may be opened and closed based on an Otto cycle, while the other intake valve 120b may be opened and closed based on an Atkinson or other cycle. During any selected working cycle, one or both of the intake valves may be deactivated or closed. In various embodiments, each intake valve for the working chamber 102 may be independently actuated or deactivated on a firing opportunity by firing opportunity basis.

The ability to independently control the intake valves of the same working chamber offers a variety of advantages. For one, the torque output of the working chamber can be dynamically adjusted. By way of example, in various designs, if both intake valves are open during an intake stroke and then closed during the subsequent compression stroke, then deactivating one of the intake valves during a selected working cycle will result in less air being delivered to the working chamber. This, in turn, will reduce the torque generated by the firing of the working chamber relative to a situation in which both intake valves were opened. Likewise closing one or both of the intake valves prior to completion of the intake stroke, will result in less air induction and lower working cycle torque output. Similarly leaving one or both of the intake valves open through both the intake stroke and part of the compression stroke will result in lower working cycle output. In this case air inducted into the cylinder is expelled from the cylinder prior to initiation of the power stroke. Through the use of independent control of each intake valve and the use of different types of opening/closing timing for each intake valve two, three or more levels of working chamber output are possible, as will be discussed later in the application. As previously discussed, the ability to modulate working chamber torque output quickly, such as on a firing opportunity by firing opportunity basis, can allow for better control over vibration, noise and fuel consumption.

The actuators 116a/116b may use a wide variety of mechanisms to control the opening and closing of the intake valves 120a/120b for the working chamber 102. In various embodiments, for example, each intake valve is cam-actuated and/or mechanically controlled. In the illustrated embodiment, for example, the actuator 116a and 116b are separate cams that independently operate the intake valves 120a and 120b, respectively. In some designs, a lost-motion, collapsible valve lifter, collapsible lash adjuster, collapsible roller finger follower, or collapsible concentric bucket may be situated in the valve train to allow for deactivation of the valve. These devices may allow an intake valve to be activated or deactivated on any given working cycle. In some implementations, camshafts that move axially, where different cam lobes may be shifted to engage an intake valve stem may also be used to control valve motion. In this case one of the cam lobes may be a zero-lift lobe, effectively deactivating the cylinder. In some embodiments, only a single intake valve may be used and the valve opening may track and be operated based on two or more different lift profiles. The different profiles may be generated using different cams or through use of more complex valve trains. However, it should be appreciated that a variety of other designs are also possible, as will be discussed later in this application. The actuation of the intake valves may be performed mechanically, electromechanically, electrohydraulically or using any other suitable mechanism.

A wide variety of systems may be use to actuate and control the intake and exhaust valves of the working chamber 102. Some example designs are illustrated in FIGS. 2-7. FIGS. 2-7 are diagrammatic top views of an example working chamber valve control system (e.g., the working chamber control system 100 illustrated FIGS. 1A and 1B.) Each of FIGS. 2-7 illustrates a working chamber 102, actuators 116a/116b, intake valves 120a/120b, an exhaust valve 122a and possibly an additional exhaust valve 122b. A line drawn between an actuator and a particular valve indicates that the actuator controls the opening and closing of the valve. Generally, when a line is drawn between an actuator and two or more valves, this means that when the actuator is activated, all of the valves must be actuated during a selected working cycle; alternatively, if the actuator is not activated during a working cycle, all of the valves must be deactivated during the working cycle. If a line is not drawn between an actuator and a particular valve, this means that the actuator does not control that particular valve. The aforementioned actuation may be performed using any suitable technology or mechanism, such as through the use of a camshaft assembly including one or more cams and/or camshafts.

Figure 2:
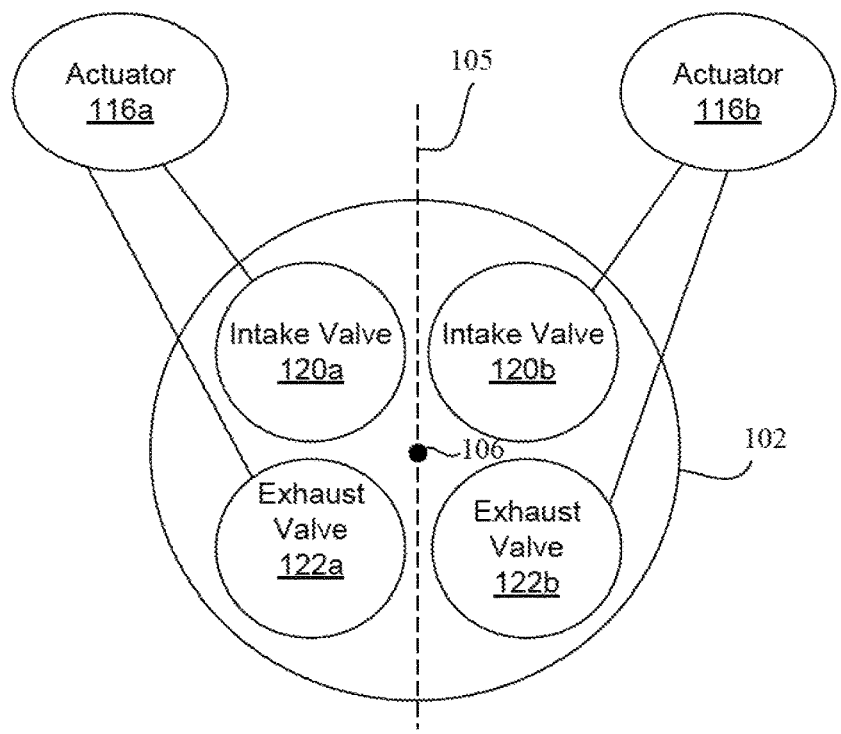
FIGS. 2-7 are diagrams illustrating valve control systems according to various embodiments of the present invention.

There may be a variety of different valve control arrangements. In FIG. 2, for example, intake valve 120a and exhaust valve 122a are on one side of the working chamber 102 (i.e. on one side of the line of symmetry 105). Intake valve 120b and exhaust valve 122b are on the other side of the working chamber 102 (i.e., on the other side of line 105). Actuator 116a controls the valves on one side of the working chamber 102 (i.e., intake valve 120a and exhaust valve 122a) and another actuator (actuator 116b) controls the valves on the other side of the working chamber (i.e., intake valve 120b and exhaust valve 122b).

Figure 3:
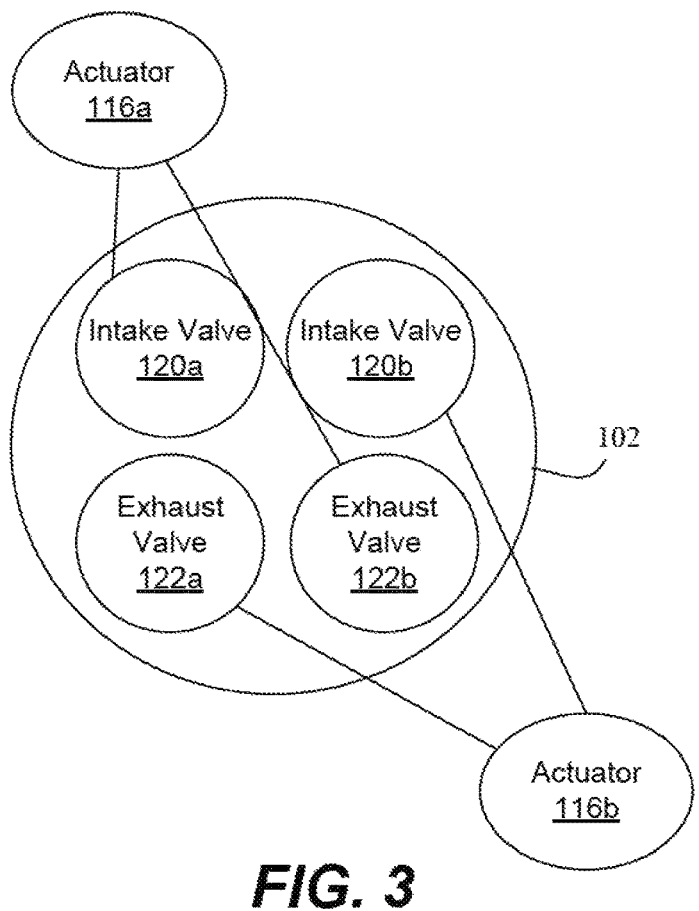

FIG. 3 illustrates a somewhat different arrangement. In this example, each actuator 116a/116b controls an intake valve on one side of the working chamber and the exhaust valve on the other side of the working chamber. That is, actuator 116a controls intake valve 120a and exhaust valve 122b, while actuator 116b controls intake valve 120b and exhaust valve 122a.

The above arrangements can result in different flows in the interior of the working chamber 102. For example, if an actuator controls an intake valve and exhaust valve on the same side of the working chamber (e.g., as in FIG. 2), air that flows from the intake valve to the exhaust valve tends not to flow through the middle or a central axis 106 of the working chamber. If the actuator controls an intake valve and an exhaust on valve on different sides of the working chamber (e.g., as with FIG. 3), air that flows between the intake and exhaust valves tends to pass through the middle or central axis of the working chamber. This can have different effects on the swirl or tumble of air and gases in the chamber. Different control schemes and arrangements for actuators and valves can help achieve a desired amount of swirl in the chamber. Generally, a moderate amount of swirl is desired. If there is too much swirl, there may be too much convection of heat to the walls of the working chamber. If there is too little swirl, the burn rate in the working chamber may be too low.

Figure 4:
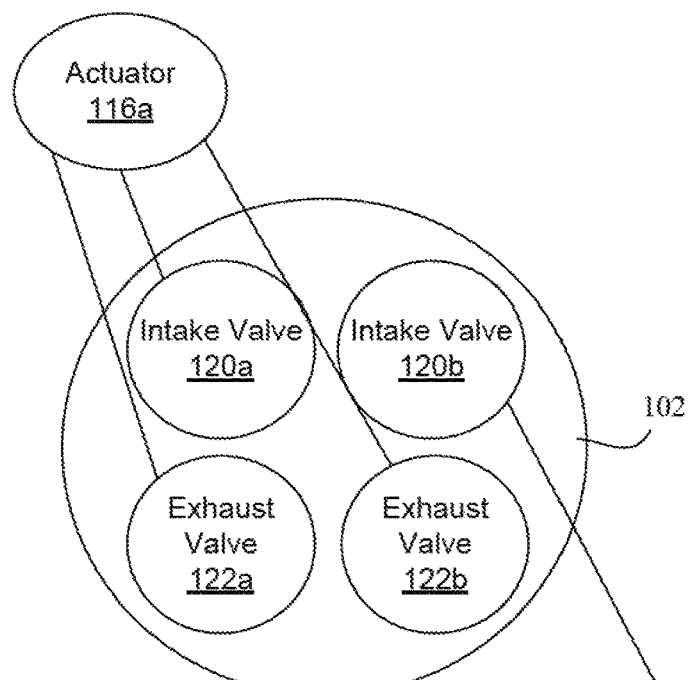

Other valve control arrangements are also possible. In FIG. 4, for example, the actuator 116a controls an intake valve 120a on one side of the working chamber 102 and both exhaust valves 122a/122b on the other side of the working chamber. The other actuator 116b controls the remaining intake valve (intake valve 120b). Thus, whenever actuator 116b is activated to open intake valve 120b during a selected working cycle and an exhaust event is desired, actuator 116a must also be activated. Put another way, whenever an exhaust event is desired for a selected working cycle, actuator 116a must be activated and intake valve 120a and both exhaust valves 122a and 122b will be opened during the working cycle. Opening both exhaust valves can help improve blowdown i.e., the venting of exhaust gases from the working chamber just before piston reaches top dead center (i.e., before the beginning of the intake stroke).

Figure 5:
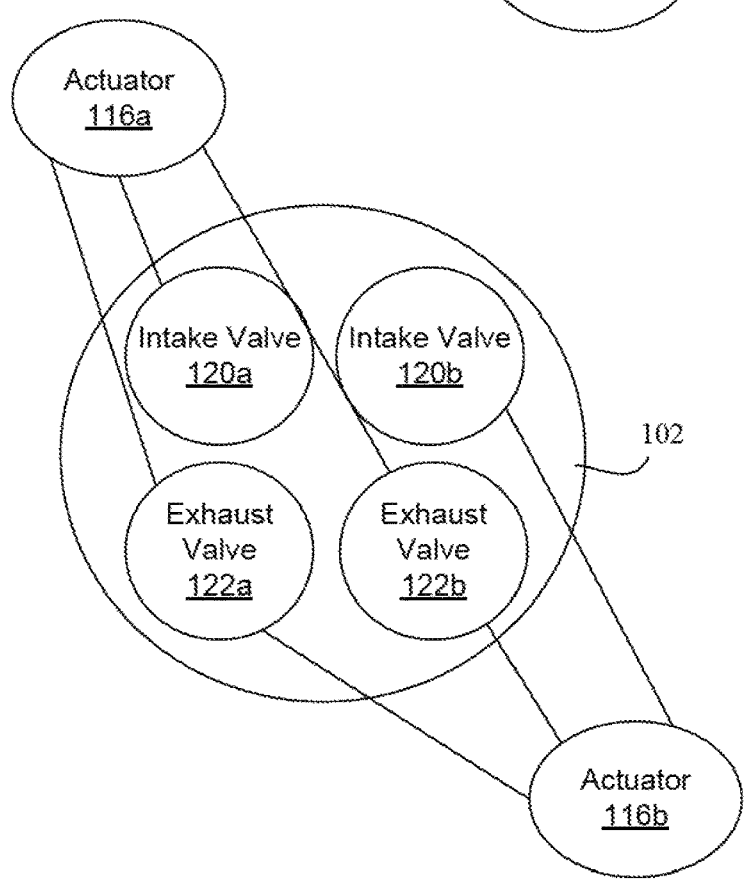

FIG. 5 illustrates another valve control system. In this example, an actuator 116a controls an intake valve 120a on one side of the working chamber 102 and both exhaust valves 122a and 122b. The other actuator 116b has a similar functionality i.e., it controls the intake valve 120b on the other side of the working chamber and both exhaust valves 122a and 122b as well. This arrangement also causes both exhaust valves 122a/122b to be actuated during a selected working cycle in which an exhaust event is desired and/or whenever one of the intake valves 120a/120b is actuated during a selected working cycle. The exhaust valves 122a and 122b will be activated if either actuator 116a or 116b is activated. In contrast to FIG. 4, however, when a combustion event is desired, intake valve 120b can be opened during a selected working cycle without requiring the opening of intake valve 120a.

Figure 6:
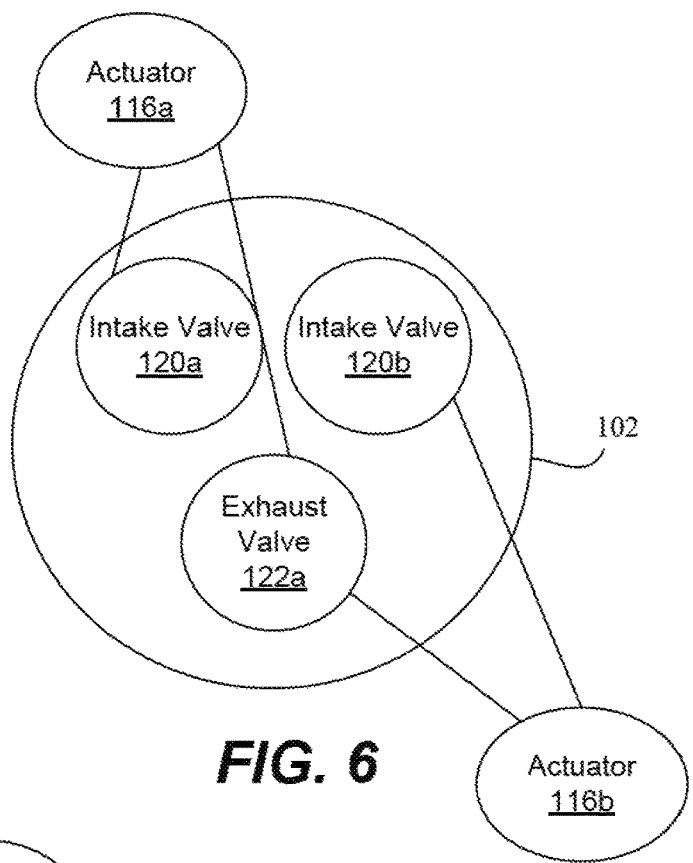

Although the above examples involve a working chamber with two intake valves and two exhaust valves, this is not a requirement and the working chamber may include any suitable number of intake or exhaust valves. By way of example, FIG. 6 illustrates a working chamber 102 with two intake valves 120a/120b and a single exhaust valve 122a. Actuator 116a controls intake valve 120a on one side of the working chamber and the exhaust valve 122a. Actuator 116b controls the intake valve 120b on the other side of the working chamber 102 and the exhaust valve 116b. Thus, during a selected working cycle, irrespective of which intake valve is opened, the exhaust valve 122a is opened if an exhaust event is desired.

Figure 7:
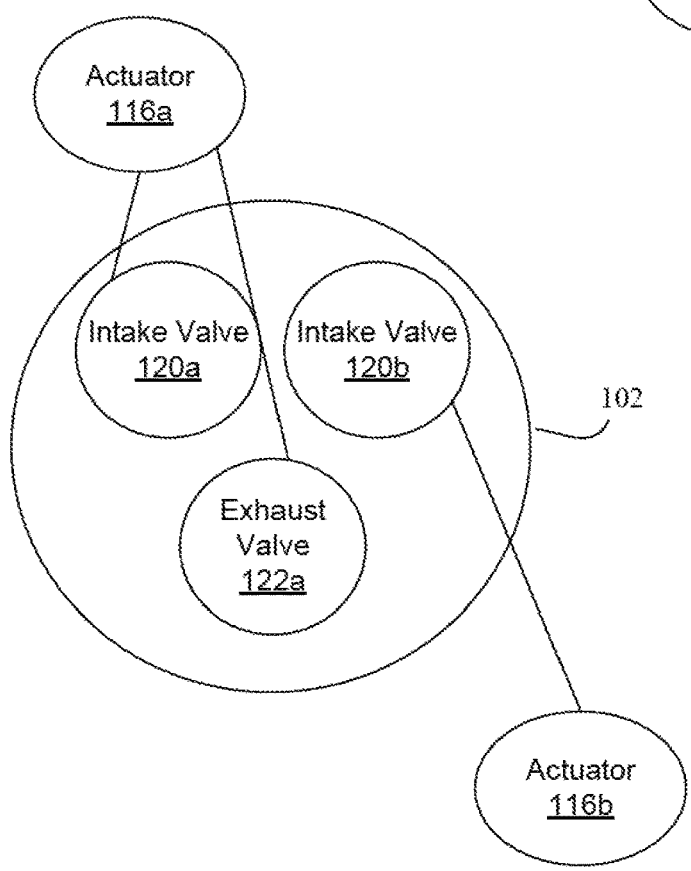

FIG. 7 describes a different control scheme that also involves a working chamber 102 with two intake valves 120a/120b and a single exhaust valve 122a. In this example scheme, actuator 116a controls the intake valve 120a on one side of the working chamber 102 and the exhaust valve 122a. The actuator 116b controls only the intake valve 120b on the other side of the working chamber. In contrast to the control system illustrated in FIG. 6, the actuator 116b does not control the exhaust valve 122a as well. Thus, if an exhaust event is desired during a selected working cycle, actuator 116a must be activated and intake valve 120a must be opened. That is, during a selected working cycle in which combustion and exhaust events will take place in the working chamber 102, intake valve 120b will not be the only intake valve that is actuated, but rather is always actuated together with intake valve 120a. However, intake valve 120a and exhaust valve 122a can be opened during a selected working cycle while intake valve 120b remains deactivated.

Figure 8:
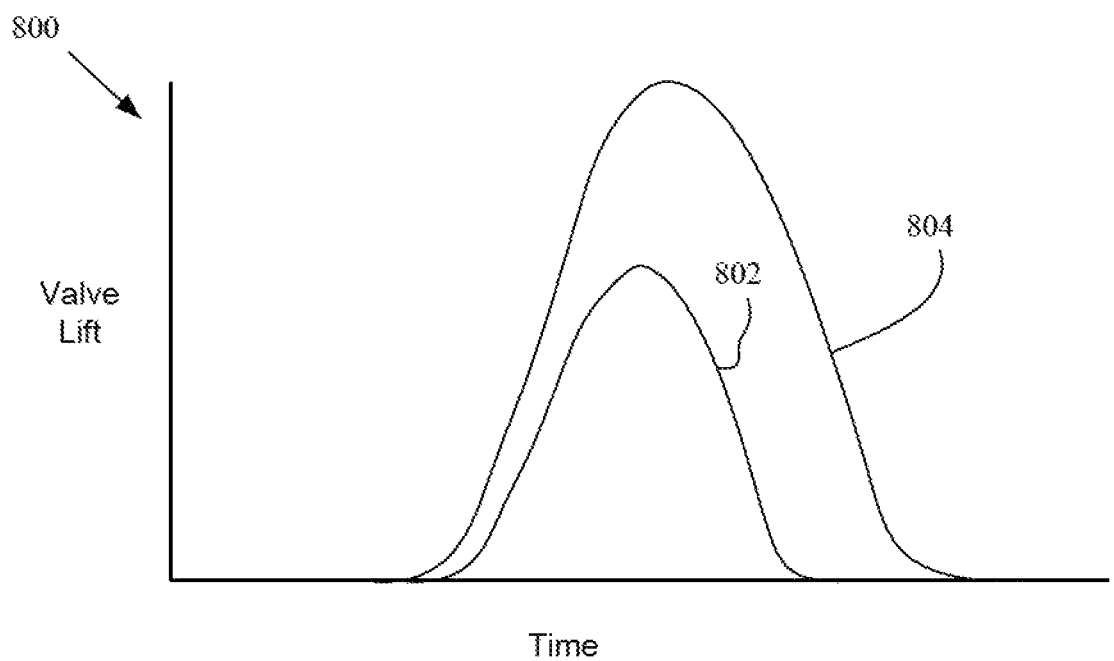
FIG. 8 is a graph illustrating valve lift adjustment for a working chamber according to a particular embodiment of the present invention.
Figure 9:
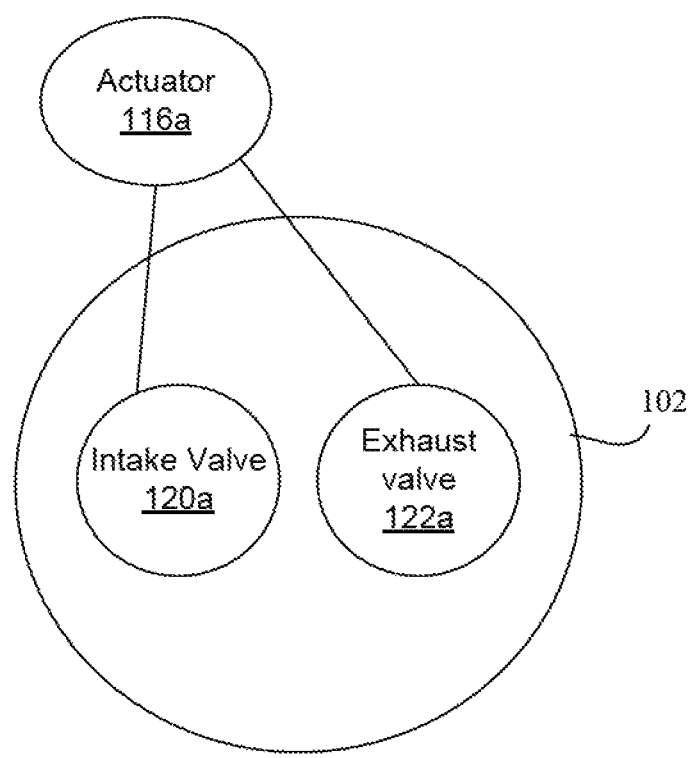
FIG. 9 is a valve control system according to a particular embodiment of the present invention.

FIGS. 8 and 9 describe another type of control scheme involving an actuator that can vary the duration and timing of the opening of an intake valve. Put another way, in some of the above examples, an actuator is capable of only two states—deactivating a corresponding intake valve, or activating a corresponding intake valve. If the intake valve is actuated, then the timing and duration of the opening of the intake valve is fixed for a selected working cycle. However, in other embodiments, the actuator is capable of additional functionality. That is, the actuator is capable of following multiple cam profiles or valve lift settings, each of which have different valve timing characteristics.

An example of this approach is shown FIGS. 8 and 9. FIGS. 8 and 9 pertain to a working chamber 102 with a single intake valve 120a, exhaust valve 122a and actuator 116a (FIG. 9). As seen in FIG. 9, the actuator 116a controls all of the valves in the working chamber 102. To vary the output of the working chamber, the actuator 116a is arranged to selectively adjust the valve lift of the intake valve 120a based on a valve lift adjustment setting or cam profile.

FIG. 8 is a graph 800 that indicates valve lift as a function of time. Two valve lift adjustment settings are represented by curves 802 and 804. The actuator 116a is arranged to operate the intake valve 120a based on either of the valve lift adjustment settings. In various embodiments, the actuator 116a can shift between settings on a working cycle by working cycle basis. The graph 800 indicates how the duration and extent of the opening of the intake valve 120a varies from one setting to the next. That is, for the setting represented by curve 804, the maximum amount of valve lift and the amount of time that the intake valve 120a is open during a selected working cycle is greater than with the setting represented by graph 802. Thus, different settings cause different amounts of air to be delivered to the working chamber 102, which results in different levels of torque output from the working chamber 102. The implementation of different valve lift adjustment settings may be performed using any suitable technology or valve adjustment mechanism.

As noted above, some of the above valve control systems may be used to help control the tumble and/or swirl of gases within the working chamber. Control of gas flow within the working chamber may be further improved with particular intake passage designs. Various examples of such designs are illustrated in FIGS. 10 and 11.

Figure 10:
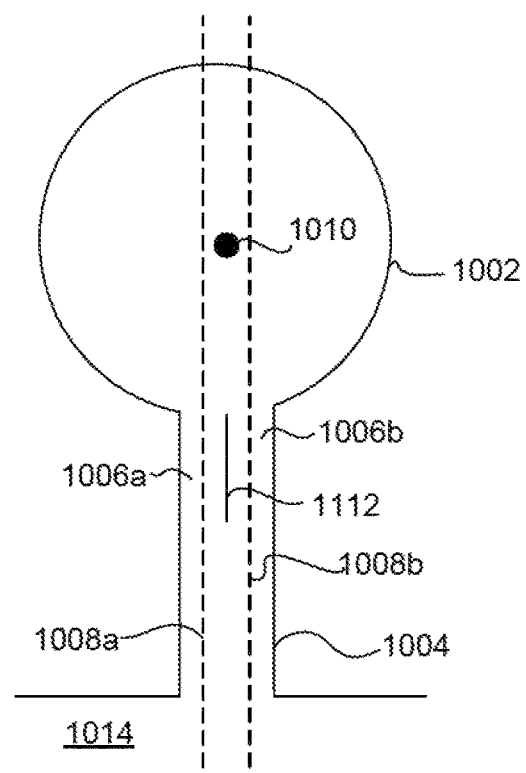
FIG. 10 is a diagram illustrating example intake passages.

For the purpose of comparison, FIG. 10 is a top view of a working chamber 1002 and associated intake passages 1006a/1006b with a conventional design. The two intake passages 1006a/1006b connect, respectively, the two intake valves of the working chamber 102 with an intake manifold 1014. In this example, the separate intake passages 1006a/1006b are formed by the dividing of a single intake passage 1004 by a shared passage wall 1112. It should be noted that the central axis of each intake passage (axes 1008a and 1008b) does not intersect with a central axis 1010 of the working chamber. (The central axis 1010 may be understood as a line that rises out of the page.)

Figure 11:
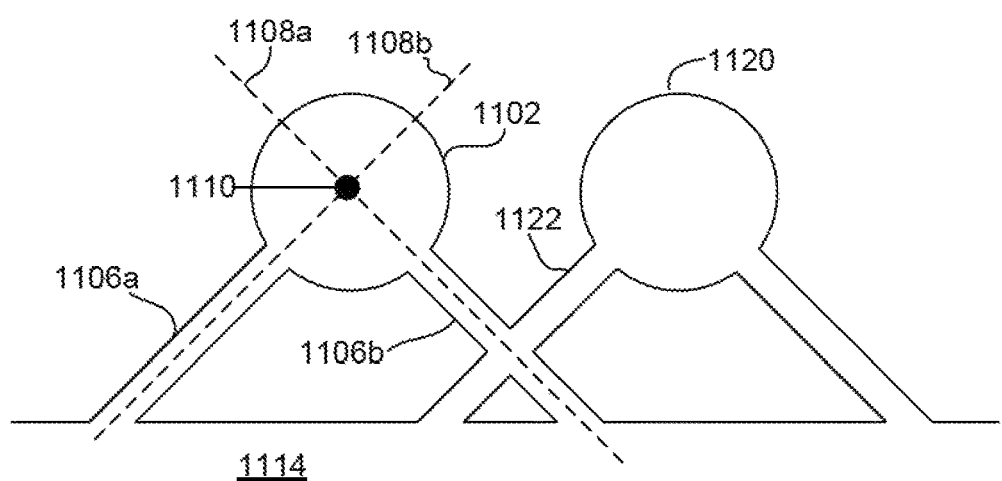
FIG. 11 is a diagram illustrating intake passages according to a particular embodiment of the present invention.

FIG. 11 illustrates another intake passage design according to a particular embodiment of the present invention. In FIG. 11, two intake passages 1106a/1106b couple the intake manifold 1114 with the working chamber 1102 and are each coupled with a separate intake valve on the working chamber 1102. The intake passages 1106a/1106b are splayed i.e., they do not extend parallel to one another and connect with the working chamber 1102 at an angle. In the illustrated embodiment, the intake passage 1106b for one working chamber 1102 shares an air flow path with an intake passage 1122 for an adjacent working chamber 1120, although in other embodiments, the intake passages for adjacent working chambers are entirely separate.

The angle at which each intake passage 1106a/1106b connects with the working chamber 1102 causes the central axis 1108a/1108b of each intake passage 1106a/1106b to (substantially) intersect with a central axis 1110 of the working chamber 1102. Because of this design, air that is delivered using the intake passages 1106a/1106b is delivered directly to the center of the working chamber, thereby possibly reducing the amount of swirl or mixing relative to the arrangement in FIG. 10. Such arrangements, optionally combined with the valve systems illustrated in FIGS. 1-7, can help improve control of the motion of gases in the working chamber 1102.

Additional adjustment may be made to the design of the working chamber to further control the delivery of air into the working chamber and/or the flow of gases in the working chamber. In some embodiments, for example, the intake valves of a working chamber (e.g., intake valves 120a/120b of FIGS. 1A and 1B) have different sizes and/or diameters. That is, their shape, size or design causes the air flow rate through the valves to be different. The asymmetric delivery of air into the working chamber can help induce swirl in the working chamber, which may be desirable under some circumstances.

When the intake valves of a working chamber are independently controlled (e.g., as described in FIGS. 1-7), they can also follow different valve lift profiles and/or have different open/closing times. These profiles and valve opening/closing times can be mixed and matched as desired consistent with the available valve control mechanisms. By way of example, one intake valve may be actuated to implement a lift profile having the valve open for the entire intake stroke and closing soon after BDC. This lift profile allows induction of a maximum air charge and may be referred to as a normal timing and lift profile. The other intake valve is actuated to implement an early intake valve closing (EIVC) or late intake valve closing (LIVC) profile. Both the EIVC and LIVC profiles and timing result in reduced air induction compared to a normal lift profile. Use of a normal timing and lift profile will result in an engine operating in an Otto cycle, i.e. where the valve timing results in a substantially maximum air charge. Use of EIVC or LIVC valve timing will result in less air charge and thus a lower effective compression ratio. This is often denoted as operating an engine using an Atkinson or Miller cycle. The use of different lift profiles and timing can help provide additional control over working chamber output, vibration, noise and fuel efficiency.

A particular scheme involving using a particular lift profile and/or valve timing for one or more intake valves to generate a particular level of torque is referred to herein as a valve control scheme. Thus, there may be different valve control schemes for generating different (e.g., low, moderate and/or high) levels of torque from a fired working chamber, respectively. Each valve control scheme involves independently controlling each intake valve in the working chamber such that each intake valve is operated using a particular lift profile and/or timing cycle (e.g., Otto, Atkinson, etc.) A particular valve control scheme may cause multiple intake valves of a working chamber to be operated using the same or different lift profiles and/or timing cycles.

Figure 12A:
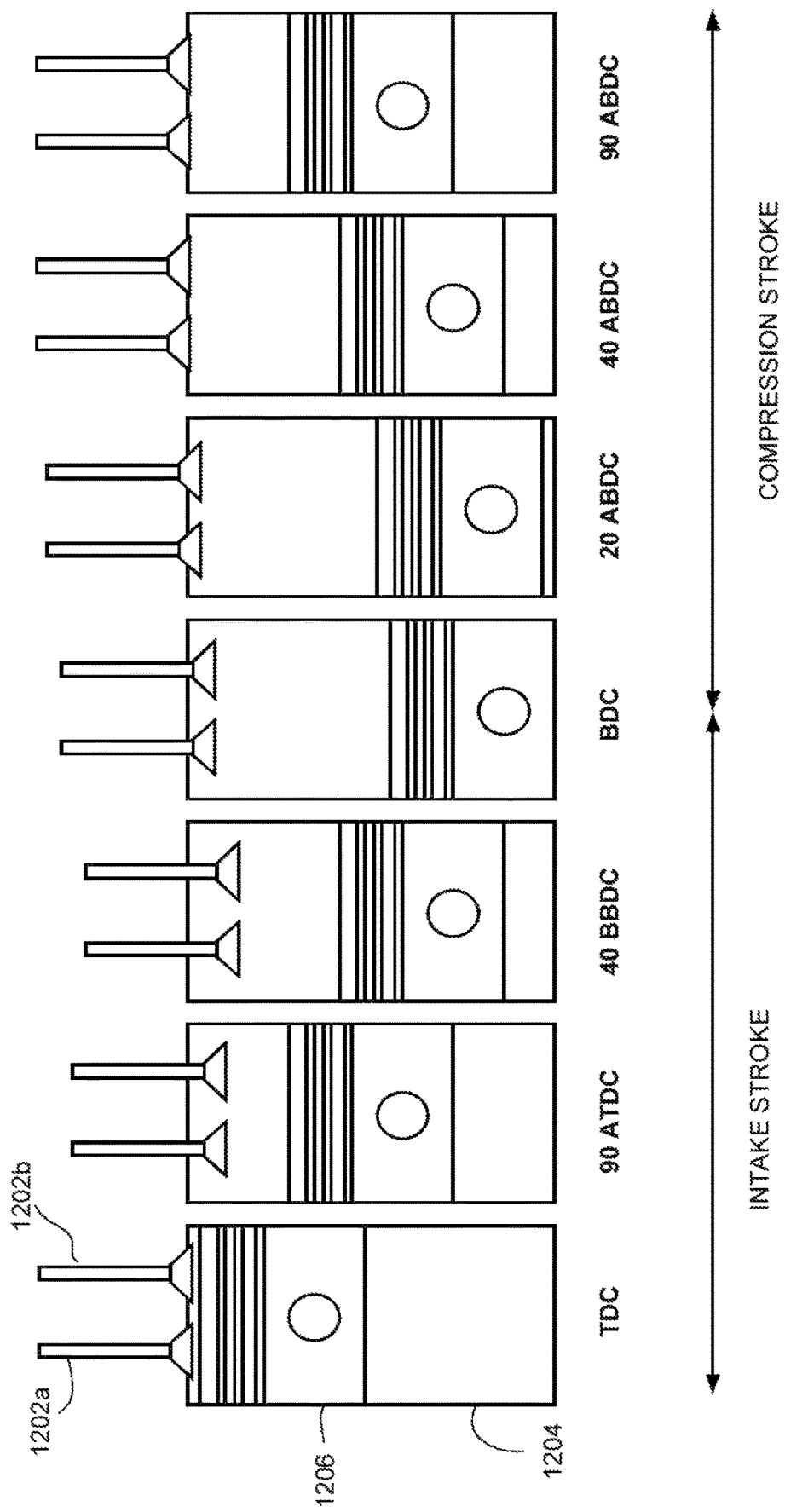
FIGS. 12A-12F are diagrams illustrating stages in the operation of a working chamber and intake valves according to various embodiments of the present invention.

Referring now to FIGS. 12A-12E, some of the differences between such valve control systems and conventional valve control systems are described. For purposes of comparison, FIG. 12A illustrates various stages of operation of a working chamber during the intake and compression strokes of an example Otto cycle, which is currently used in many automobile engines. The working chamber includes two intake valves (intake valves 1202a and 1202b) that are both operated in the same manner based on a normal timing and lift profile resulting in the engine operating on an Otto cycle.

During the intake stroke, both valves 1202a/1202b are opened. The piston 1206 moves from top dead center (TDC) to bottom dead center (BDC). Approximately 40° before the piston 1206 reaches BDC, the valve lift reaches its maximum point. Once the piston 1206 reaches BDC, the compression stroke begins. The piston then moves back towards top dead center (TDC). Approximately 40° after BDC, the intake valves are shut.

Figure 12B:
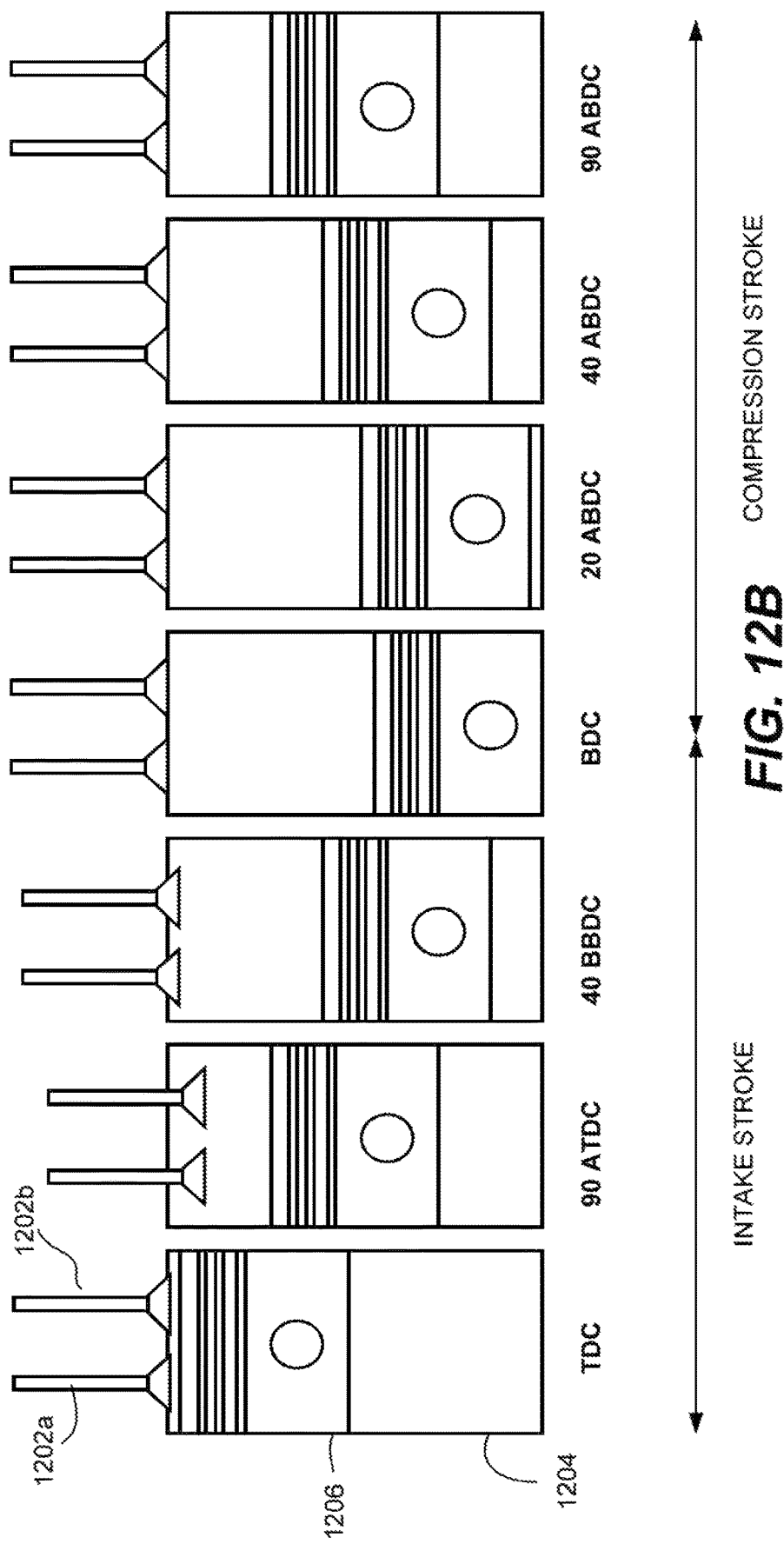

In an Atkinson cycle, the intake valves may be closed earlier or later. The former is referred to as early intake valve closure (EIVC). An example of EIVC valve operation is illustrated in FIG. 12B. In FIG. 12B, both intake valves 1202*a*/1202*b* are operated in accordance with an EIVC Atkinson cycle. The intake valves 1202*a*/1202*b* are closed by the time that the piston 1206 reaches BDC at the end of the intake stroke. This is much sooner than in the Otto cycle illustrated in FIG. 12A, in which the intake valves were closed 40° afterward. Thus, in comparison to an Otto cycle, the intake valves are closed early and kept open for a shorter period of time, resulting in less air in the working chamber and lower torque output.

Figure 12C:
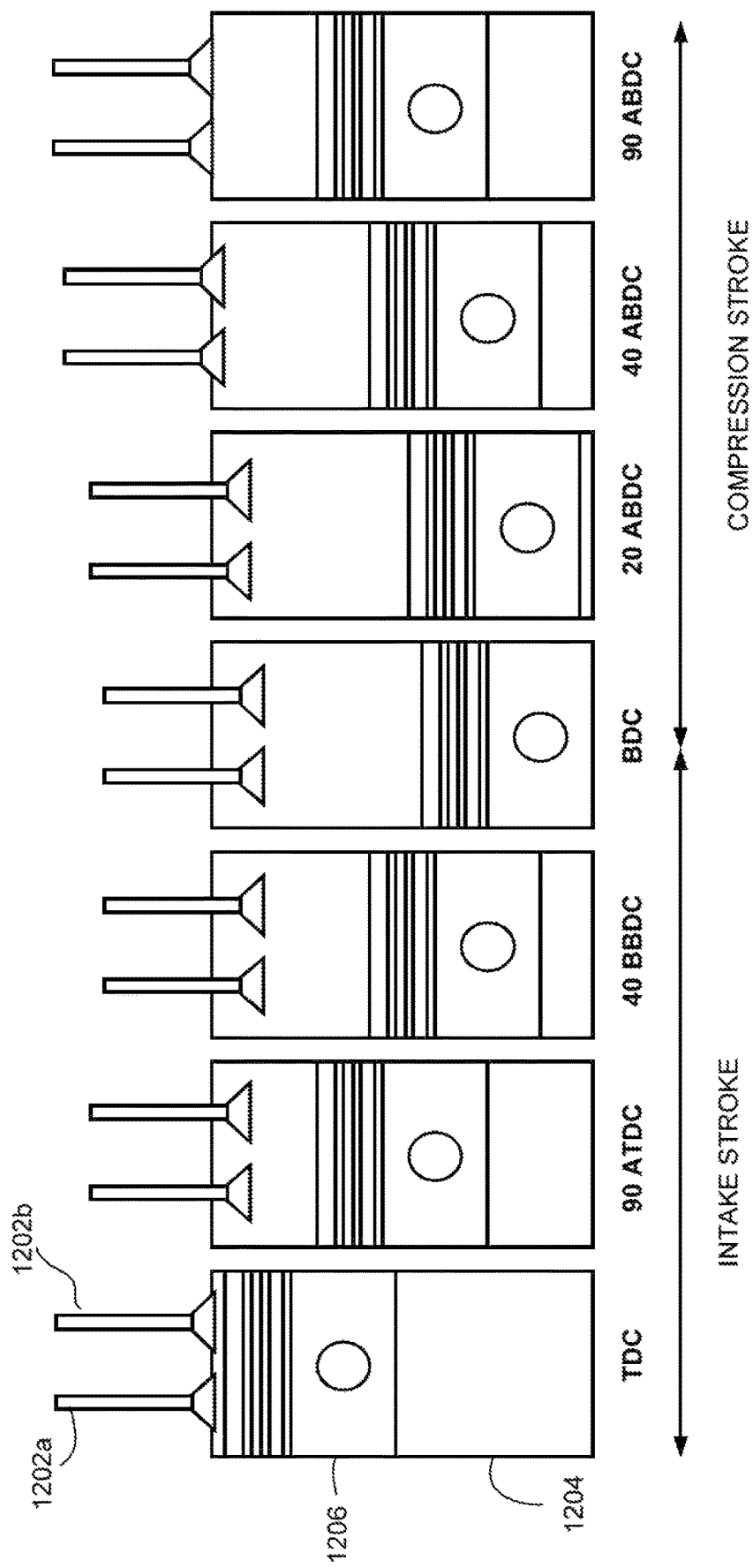

FIG. 12C illustrates an alternative Atkinson cycle in which both intake valves are closed late relative to a standard Otto cycle. This approach is referred to as late intake valve closure (LIVC). An example LIVC valve control system is illustrated in FIG. 12C. As shown in the figure, the intake valves 1202*a*/1202*b* are closed approximately 90° after BDC at the middle of the compression stroke. By contrast, in the example Otto cycle, the intake valves are closed approximately 40° after BDC. This results in a relatively lower amount of air being delivered to the working chamber, since more of the air delivered to the working chamber during the intake phase is pushed out of the working chamber during the compression stroke.

Since air delivery from the intake manifold to the working chamber is reduced in an Atkinson cycle relative to an Otto cycle, the torque output generated by the firing of the working chamber is less. However, the Atkinson cycle is generally more fuel efficient than the Otto cycle, since a larger fraction of the combustion energy can be converted to useful torque. Running a working chamber on the Atkinson cycle may result in the working chamber operating at or near its minimum BSFC operating point.

Figure 12D:
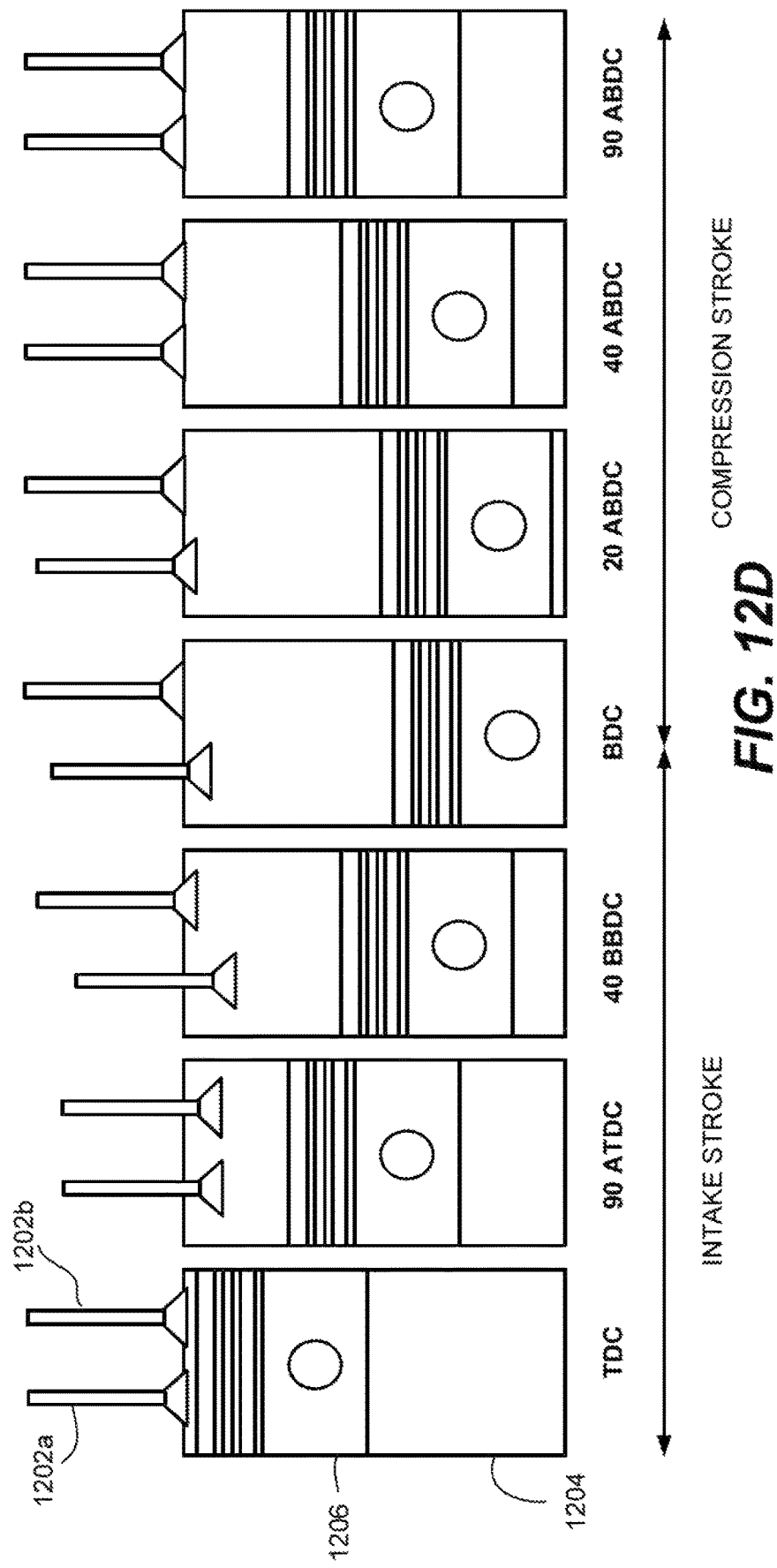
Figure 12E:
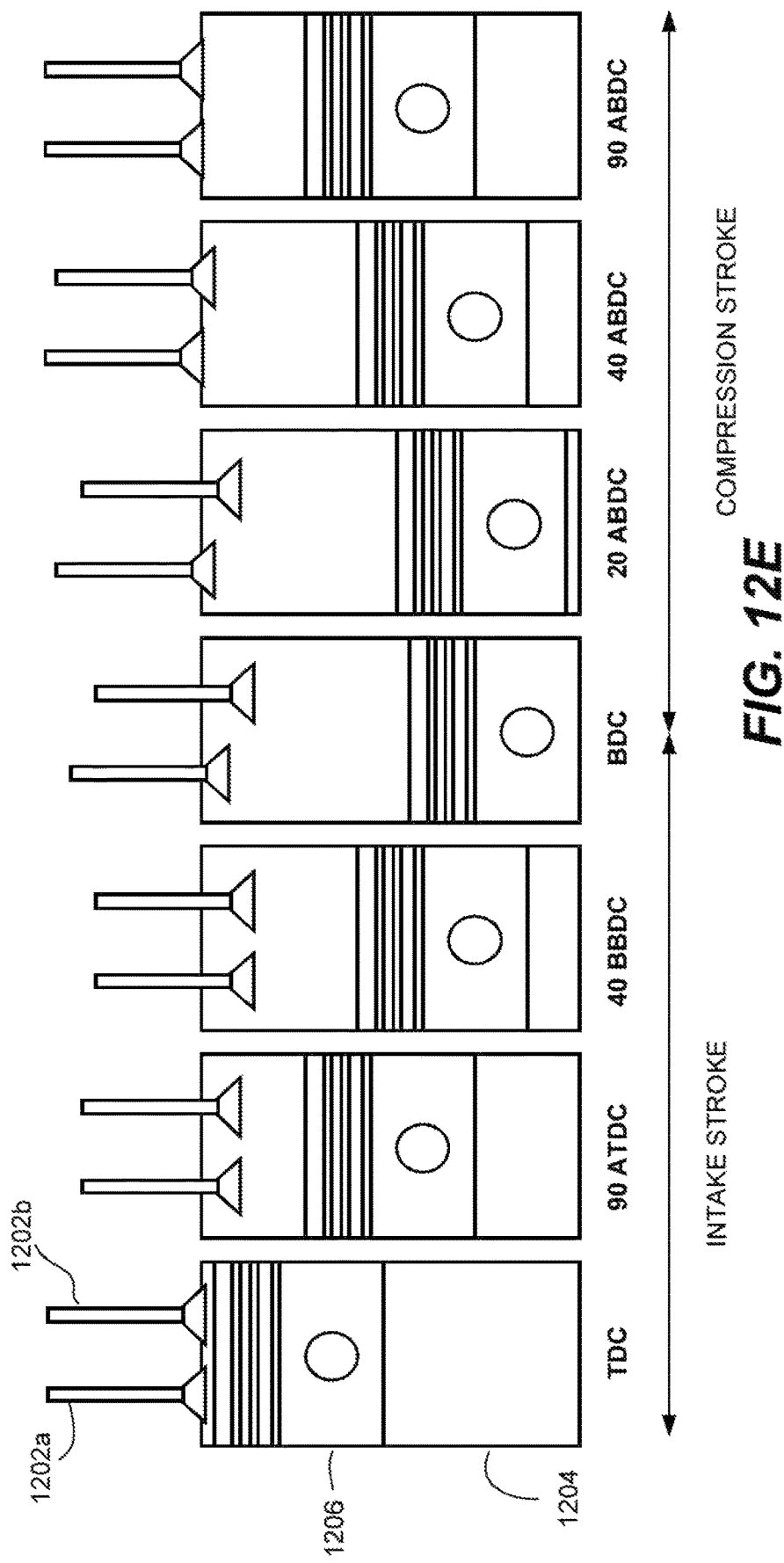

In the above examples illustrated in FIGS. 12A-12C, both intake valves are activated at the same times based on the same cycle. FIGS. 12D-12E contemplate implementations in which independently controlled intake valves open and close based on different cycles. The intake valves described in these embodiments may be controlled or actuated using any of the aforementioned techniques (e.g., those described in connection with FIGS. 1A, 1B and 2-11.)

In FIG. 12D, intake valve 1202*b* is operated using an EIVC Atkinson cycle. Intake valve 1202*a* is operated using an Otto cycle. Thus, as shown in the figure, the intake valve 1202*a* closes approximately 40° after BDC while the piston 1206 is early in a compression stroke. The intake valve 1202*b*, however, closes earlier i.e., around the end of the intake stroke when the piston is at BDC.

FIG. 12E illustrates a system in which intake valve 1202*a* is operated using an Otto cycle and intake valve 1202*b* is operated using an LIVC Atkinson cycle. The intake valve 1202*b* thus closes later than then intake valve 1202*a* i.e., approximately 90° after BDC during the compression stroke, rather than around 40° after BDC.

The operation of intake valves using different cycles offers a variety of potential advantages. For one, it provides another means to control flow within the working chamber. By way of example, in FIG. 12D, air enters the working chamber 1206 asymmetrically. That is, more air comes in through one intake valve (intake valve 1202*a*) for a longer period than the other during the intake phase. This can have desirable affects on gas motion in the working chamber e.g., it may cause increased swirl. In FIG. 12E, during the compression stroke more air is pushed out of one intake valve (e.g., intake valve 1202*b*) for a longer period than the other. This asymmetric air flow may advantageously increase combustion charge motion i.e. swirl and tumble, improving combustion characteristics.

Figure 12F:
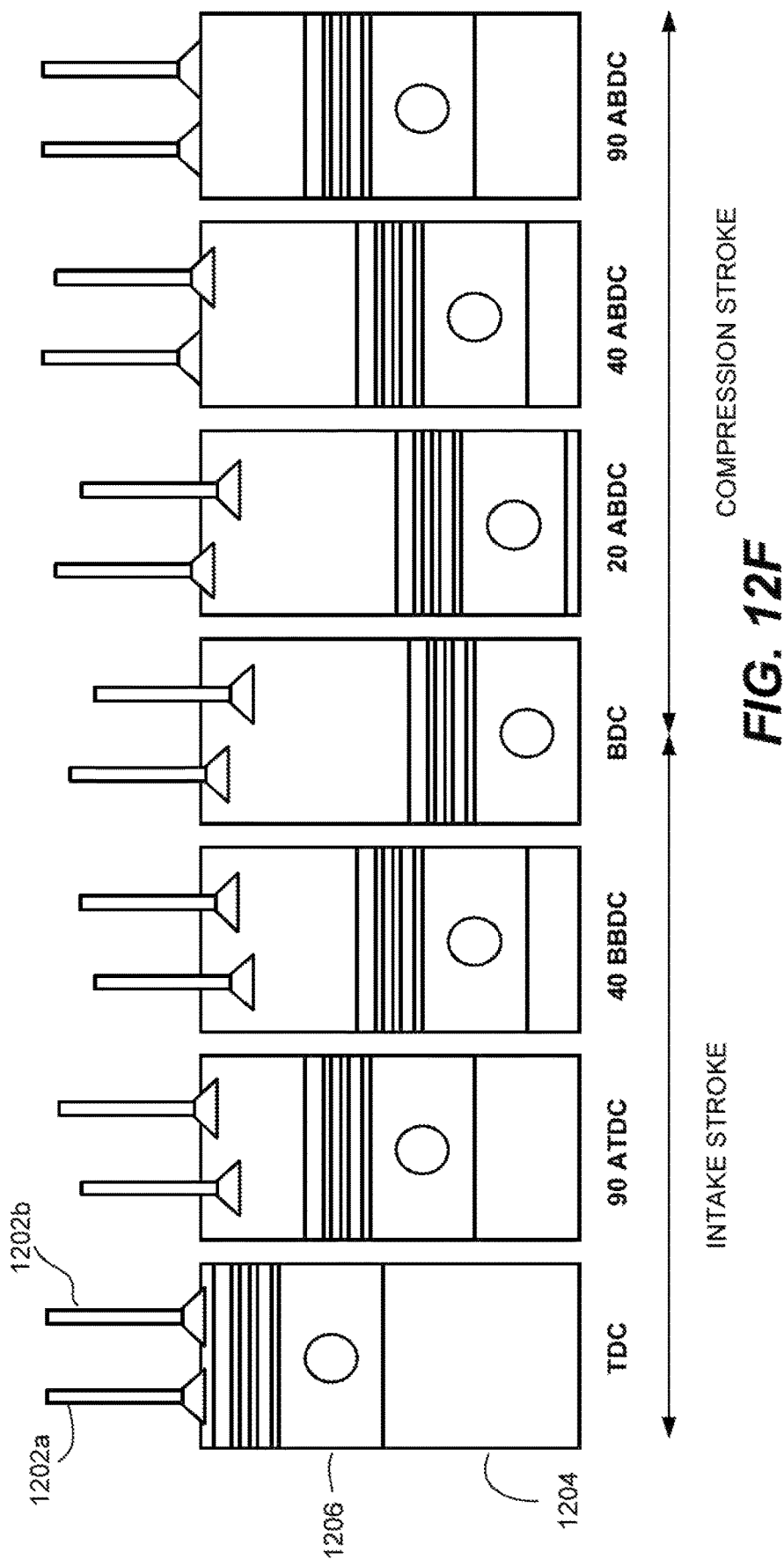

In some approaches, the intake valves are offset i.e., they are phased relative to one another. An example of this approach is illustrated in FIG. 12F. Intake valves 1202*a* and 1202*b* are operated based on the same Otto cycle, but the opening and closing times are offset. That is, intake valve 1202*a* opens earlier and closes earlier than intake valve 1202*b*. This system functions somewhat similarly to the system illustrated in FIG. 12E. Air exits the working chamber in an asymmetrical manner, which can affect swirl in the working chamber. The amount of offset may vary widely, depending on the needs of a particular application.

An additional advantage of independently operating intake valves for a working chamber using different cycles is that it can offer a high degree of control over the torque output of the working chamber, depending on how the valves are operated. Referring next to FIGS. 13A and 13B, various example valve control schemes are described. That is, the charts illustrated in FIGS. 13A and 13B indicate how intake valves can be operated in different ways to generate different levels of torque. In some embodiments, the valve control schemes illustrated in FIGS. 13A and 13B use the systems illustrated in FIGS. 12D and 12E, respectively.

FIG. 13A describes a working chamber valve control system in which there are two intake valves that are controlled independently e.g., by distinct actuators or cams. The valve control system may have any feature of the systems described in connection with FIGS. 2-7 and/or 12D. During a selected working cycle, intake valve 1202*a* is capable of being deactivated or actuated using an Otto cycle (referred to hereinafter as the "Normal Valve.") During the selected working cycle, intake valve 1202*b* is also capable of being deactivated or actuated using an Atkinson (EIVC) cycle (referred to hereinafter as the "EIVC valve.") Thus, four different valve control schemes are possible for the Normal and EIVC valves, which produce four different results 1302/1304/1306/1308, which are shown in the chart 1300 of FIG. 13A.

In results 1302, 1304 and 1306, the working chamber is fired during a selected working cycle and the level of torque output generated by the fire depends on the valve control scheme. The result 1302 in the chart indicates that the highest working chamber torque output can be achieved if both intake valves are actuated. This also causes a moderate amount of swirl. The next highest level of working chamber output can be generated if the EIVC valve is deactivated and the normal valve is actuated (result 1306). The next highest level of working chamber output (i.e., lower output than with results 1302 and 1306) is generated when the EIVC valve is activated and the normal valve is deactivated (result 1304). This is because EIVC operation limits the amount of air that is delivered to the working chamber. In both results 1304 and 1306, a higher amount of swirl may be generated (i.e., higher than in result 1302), because the activation of only one valve promotes the flow and mixing of gases in the working chamber. Additionally, both intake valves can be deactivated, which means that combustion does not occur during a selected working cycle and no torque output is generated, as indicated by result 1308 in the chart of FIG. 13A.

FIG. 13B includes a similarly structured chart 1350, although in this figure intake valve 1202b is capable of being deactivated or operated using an Atkinson (LIVC) cycle (referred to hereinafter as the LIVC valve.) Valve 1202a is capable of being deactivated or operated based on an Otto cycle (referred to hereinafter as the normal valve.) Thus, four different valve control schemes are again possible for a selected working cycle: 1) LIVC valve actuated, normal valve actuated, combustion event occurs; 2) LIVC valve deactivated, normal valve actuated, combustion event occurs; 3) LIVC valve actuated, normal valve deactivated, combustion event occurs; 4) LIVC valve deactivated, normal valve deactivated, combustion event does not occur. The results of each valve control scheme are shown in FIG. 13B. The valve control system used to implement any of the valve control schemes of FIG. 13B may have any feature of the systems described in connection with FIGS. 2-7 and/or 12E.

The results in the illustrated chart 1350 are quite different from those in the chart 1300 of FIG. 13A. In particular, the highest working chamber torque output is achieved when the normal valve is actuated and the LIVC valve is deactivated (result 1356). A lower, moderate level of working chamber output is achieved if both valves are actuated (result 1352). This is because when both valves are actuated, some of the air delivered through the two valves is pushed out of the working chamber due to the late closing of the LIVC valve during a compression stroke. A low level of working chamber output (i.e., less than in result 1352) is also achieved if the normal valve is deactivated and the LIVC valve is activated (result 1354). In result 1358, both intake valves are deactivated and no torque output is generated.

As previously discussed, results 1354 and 1356 involve higher amounts of swirl than with result 1352, because of the asymmetric delivery of air to the working chamber. Additionally, both the LIVC valve and the normal valve can also be deactivated (result 1358) i.e., the working cycle is skipped.

The charts illustrated in FIGS. 13A and 13B indicate that the use of independently controlled intake valves and different cycles for different valves allows for increased flexibility in the operation of the working chamber. That is, the working chamber is capable of implementing three or four different levels of torque output. Additionally, the working chamber is able to selectively use the Atkinson cycle on a single valve to generate lower levels of torque output in a more fuel efficient manner compared to some other techniques (e.g., lowering torque output by adjusting spark timing, throttle, etc.)

It should be appreciated that not all of the working chambers in the engine need to have the same valve control system. Instead, the working chamber may be divided into two or more different sets, each of which has different capabilities. By way of example, one or more working chambers may be capable only of two modes (i.e., deactivation or firing while actuating all intake valves) or only one mode (i.e., firing during every engine cycle without being skipped.) Other working chambers, however, may have independently controlled intake valves as described above in connection with FIGS. 1-13. Such mixed sets of working chambers still allows for greater flexibility and control relative to a conventional engine, but also helps reduce hardware costs and complexity relative to an engine in which every working chamber is capable of multi-level torque output.

A variety of different example working chamber arrangements are described in FIGS. 14A-14H. Each of the figures includes a chart with multiple cells and indices for a power level and a cylinder number. Each chart indicates the different power levels (i.e., torque output levels) that each cylinder (designated by numbers 1-4) is capable of in an example four cylinder engine. That is, if a cylinder has a cell associated with power level 1 filled in, this means that the cylinder is capable of being fired to generate a high torque output (e.g., CTF=1.0 or 100% of a maximum allowable output.) If a cylinder has a cell associated with power level 2 filled in, this means that the cylinder is capable of being fired to generate a low or partial torque output. (e.g., CTF=0.7 or 70% of a maximum allowable output.) If a cylinder has a cell filled in that is associated with power level 3, this means that the cylinder is capable of being deactivated (thus generating no torque output for a selected working cycle.)

In the illustrated embodiment, only three power levels are available, however in other embodiments at least some of the cylinders may be capable of generating more than three power levels e.g., as shown in FIGS. 13A-13B. Each chart in FIGS. 14A-14H indicates a different arrangement and combination of working chambers/valve systems with different capabilities. The cylinders described in the charts are arranged to generate the different power levels using any of the valve control systems, operations and features described in this application (e.g., as discussed in connection with FIGS. 1-13.)

Each chart is also associated with a fuel efficiency value. Each fuel efficiency value is based on simulations performed by the inventors. The value indicates an estimated fuel efficiency gain that the configuration had relative to a conventional four cylinder engine (e.g., one without any capacity to deactivate cylinders.) It should be appreciated that the fuel efficiency values associated with each of the charts in FIGS. 14A-14H are preliminary, based on experimental simulations, and may vary for different engine designs and applications.

For purposes of comparison, FIG. 14A is a chart indicating a cylinder configuration in which all of the cylinders are capable of only two power levels i.e., each cylinder can be skipped or fired to generate a single level of torque output. Such a configuration may be used in a skip fire engine control system. In this design, both intake valves are actuated during any firing. The air charge associated with a firing may be adjusted by a cam phaser, which controls the valves opening and closing times, and a throttle, which controls the MAP for all cylinders. Generally, these control systems do not allow large, rapid adjustment in the output of an isolated working chamber. While a working chamber's output may be reduced by retarding the spark timing, it is often desirable to avoid this control method since it is fuel inefficient. The cylinder configuration shown in FIG. 14A is moderately fuel efficient, since firing under such conditions helps to reduce pumping losses in the working chamber and in some cases cylinders can be fired near optimal fuel efficiency.

FIG. 14B illustrates a configuration for a conventional engine with cylinder deactivation. Two cylinders are fired during every engine cycle i.e., are not capable of being deactivated. During selected working cycles, two other cylinders can be fired to generate a single level of torque output or deactivated. Since such an engine is not capable of skipping every cylinder, its fuel efficiency may be somewhat less than that of the configuration illustrated in FIG. 14A. However, less hardware may be required to support such a system relative to a single level skip fire engine design for all cylinders e.g., as shown in FIG. 14A.

FIG. 14C describes a configuration in which every cylinder is capable of three output levels: being deactivated (no torque output) and firing at an additional two distinct power levels. Such a configuration may be enabled using any of the valve control system described in this application (e.g., independent control of intake valves for each cylinder, operating intake valves based on the Otto and Atkinson cycles, etc.) Such an approach may provide substantial gains in fuel efficiency. However, it also may require that each cylinder be outfitted with additional hardware and valve control-related features.

FIG. 14D represents a simpler approach, in which two cylinders are capable of the three power levels referenced in FIG. 14C. The remaining two cylinders, however, are not deactivatable and are fired during every engine cycle at a single power level. Thus, cylinders 2 and 3 may require little or no additional hardware relative to a cylinder in a conventional, non-skip fire engine.

Figure 15:
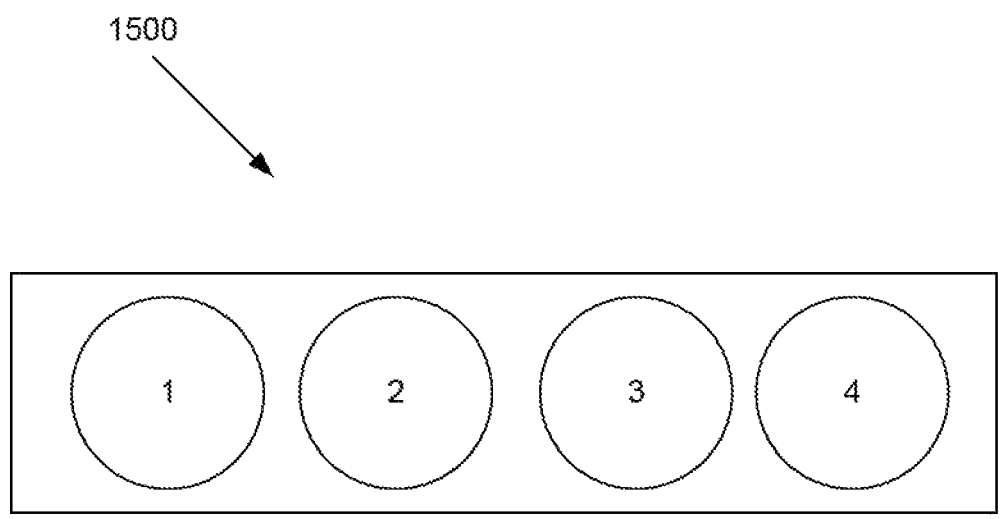
FIG. 15 is a diagram of a bank of cylinders according to a particular embodiment of the present invention.

In some embodiments, the cylinders 1-4 referenced in FIG. 14D are arranged to make the most efficient use of space in the engine. An example of such an arrangement is shown in FIG. 15. FIG. 15 is a top view of a bank or row of cylinders 1-4 in an engine 1500. Cylinders 1 and 4 are positioned at the ends of the bank, and cylinders 2 and 3 are in the middle of the row of cylinders.

FIG. 15 illustrates an example in which cylinders that are capable of more output levels/deactivation are positioned at the ends of a bank of cylinders, and cylinders that are capable of fewer torque output levels and/or that are not capable of being deactivated are positioned in the middle. This allows additional hardware to be more easily attached to the cylinders at the ends of the bank; those with less hardware requirements are positioned in the middle of the bank, where there is less space and where each cylinder is bordered on either side by another cylinder. The illustrated embodiment includes four cylinders, but it should be appreciated that a similar arrangement can also be used for a banks/row with more or fewer cylinders (e.g., a row with three, five or more cylinders). Put another way, in various implementations, the outermost cylinders (e.g., cylinder(s) at or closer to the ends of the row) are capable of more output levels and the inner cylinders (e.g., cylinder(s) that are closer to the middle of the row and/or are surrounded on both sides by other cylinders) are capable of fewer output levels. In engines with two or more rows/banks of cylinders, each cylinder bank/row may have the same arrangement as shown in FIG. 15.

FIG. 14E represents a configuration that is a modification of the one illustrated in FIGS. 14D and/or 15. In FIG. 14E as in FIG. 14D, cylinders 1 and 4 are capable of three levels of output. Cylinders 2 and 3, however, are capable of two levels of output (i.e., they can be skipped or fired at a single torque output level.) The configuration illustrated in FIG. 14E can also be arranged as shown in FIG. 15, as the innermost cylinders (cylinders 2 and 3) may require less hardware and have fewer associated output levels than the outermost cylinders (cylinder 1 and 4.)

In FIG. 14F, each cylinder is capable of two output levels, but the types of output levels that they are capable of differ. In this example configuration, cylinders 1 and 4 are capable of two output levels—they can be fired to generate a single torque output level, and also can be deactivated for a selected working cycle. Cylinders 2 and 3 are not capable of being deactivated, but can be fired at two different output levels. Relative to a configuration in which every cylinder is capable of generating three or more output levels, the configuration illustrated in FIG. 14F may require less hardware. Preliminary testing also indicates that such a configuration can be fairly fuel efficient, even in comparison to a single level skip fire engine system (e.g., as illustrated in FIG. 14A.)

FIG. 14G illustrates a configuration in which two of the cylinders (cylinders 1 and 4) are capable of three levels of output (i.e., deactivation and firing at two different torque output levels). The two other cylinders (cylinders 2 and 3) cannot be deactivated but are capable of being fired to generate two different torque output levels. The configuration described in FIG. 14G may also be arranged as shown in FIG. 15. That is, cylinder 1 and 4, which are capable of more output levels, are placed at the ends of the row/bank of cylinders, while the cylinders that are capable of fewer output levels (cylinders 2 and 3) are positioned in the middle or in the inner portion of the row/bank. As previously discussed, in various embodiments cylinders 1 and 4 require more hardware to support the additional output levels, and the outer ends of the cylinder row/bank provide more space for such hardware to be installed.

FIG. 14H represents a variation in which all of the cylinders are not capable of being deactivated or skipped. Each cylinder, however, is capable of being fired to generate two different torque output levels. In various implementations, this configuration may have lower NVH relative to a conventional skip fire engine control system, and may require less hardware relative to a system in which the cylinders are capable of more output levels.

Any of the valve control systems described in this application may be used to implement the embodiments illustrated in FIGS. 14A-14H. That is, various embodiments illustrated in FIGS. 14A-14H involve one or more cylinders that can be deactivated and/or fired to generate multiple levels of torque output. Such multi-level torque output may be enabled in a wide variety of ways. In some implementations, for example, each cylinder includes two intake valves, where each intake valve is controlled by a different actuator (e.g., as described in FIGS. 2-7.) To generate a high torque output, air is passed through both intake valves during a selected working cycle. To generate a low torque output, air is passed through only one intake valve during a selected working cycle or air is pushed out of the cylinder by a LIVC valve. As illustrated in FIGS. 2-7, the control of one or more exhaust valves may be handled by one or more actuators. In some approaches, the cylinder is configured to have a single intake valve in which the valve lift is adjustable so that the cylinder is capable of being fired to generate different torque output levels (e.g., as discussed in connection with FIGS. 8 and 9.) The configurations illustrated in FIGS. 14A-14H may also be used in an engine system with any of the aforementioned valve passage arrangements (e.g., as described in connection with FIGS. 10A, 10B and 11). In some designs, each cylinder capable of multi-level torque output operates different intake valves using different cycles (e.g., as described in connection with FIGS. 12A-12E and 13A-13B.) That is, the different levels of torque output described in the charts of FIGS. 14A-14H may be generated using the techniques described in the charts of FIGS. 13A and 13B (e.g., actuating an EIVC/LIVC valve and a normal valve to generate a particular torque output, and deactivating one of the valves to generate a different, second torque output, etc.).

Multi-Level Skip Fire Engine Control System

Various embodiments of the present invention relate to a multi-level skip fire engine control system. One or more working chambers of the engine are capable of being fired to generate at least two distinct levels of non-zero torque output. The working chamber output torque may be controlled on a firing opportunity by firing opportunity basis. The overall engine torque output can be controlled by firing or skipping cylinders on a firing opportunity by firing opportunity basis. Based on a desired engine torque, the engine control system determines a firing sequence to operate the engine in a skip fire manner. The sequence indicates a series of skips and fires. For each fire, the sequence indicates an associated level of torque output. The working chambers of the engine are operated based on the firing sequence to deliver the desired engine torque. Such a skip fire firing sequence is referred to herein as a multi-level skip fire firing sequence.

The described embodiments of a multi-level skip fire engine control system may be used with any of the engine, working chamber, intake passage and valve control system designs described in this application. In various embodiments, for example, the system generates a firing sequence that involves firings at multiple torque output levels from one or more working chambers. Each of these working chambers may generate such high or low torque output firings by using independently controlled intake valves and/or exhaust valves, by operating intake valves for the same working chamber in accordance with different cycles (e.g., Otto and Atkinson) and/or any other feature or technique described in connection with the figures. It should also be appreciated, however, that the described multi-level skip fire engine control systems are not limited to such systems and operations, and that they may be applied to any engine or working chamber design that is capable of generating multiple levels of working chamber output. It is particularly applicable to control systems that make firing decisions on a firing opportunity by firing basis, although it is not limited to this type of control system.

Figure 16:
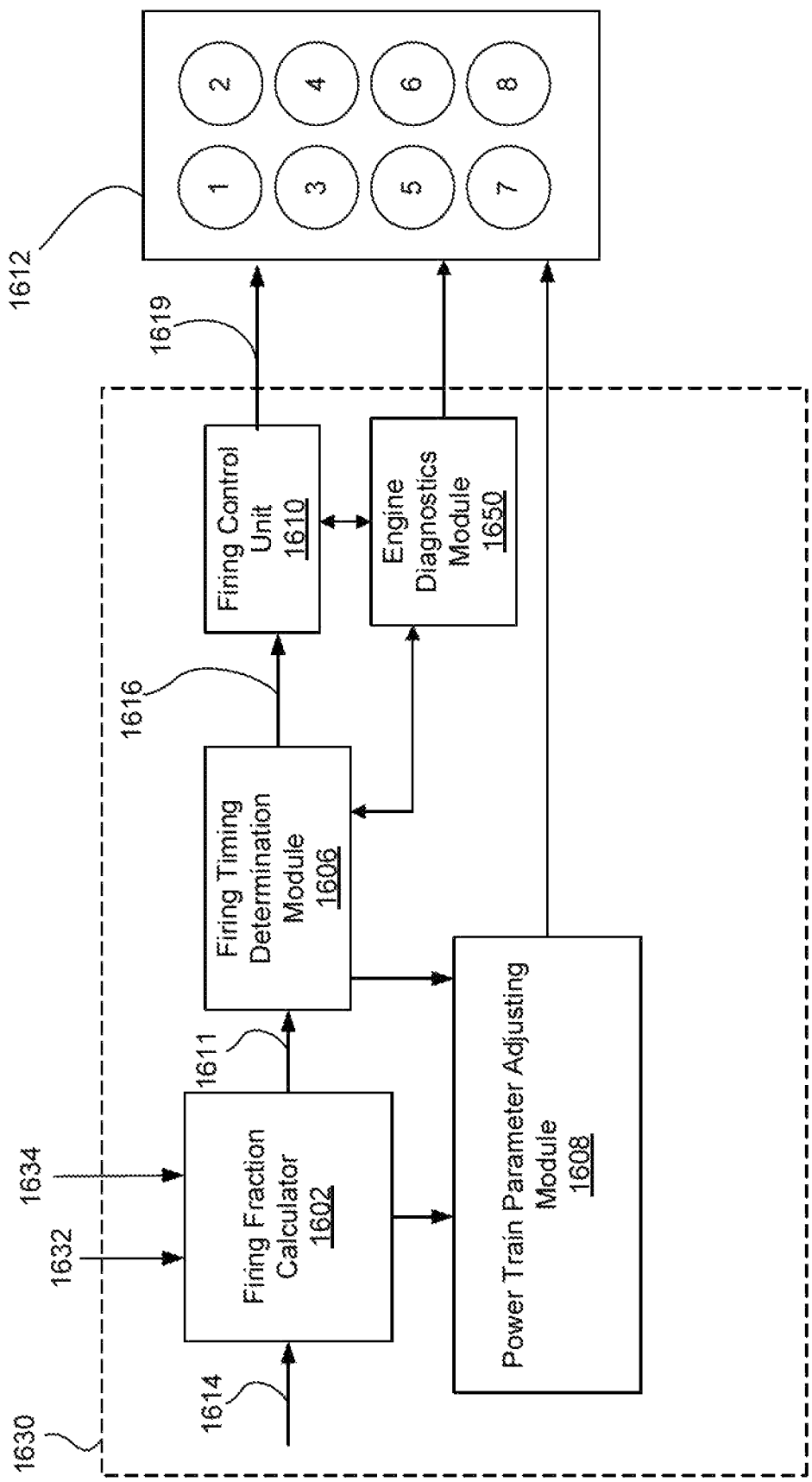
FIG. 16 is a block diagram of an engine controller according to a particular embodiment of the present invention.

Referring next to FIG. 16, a multi-level skip fire engine controller 1630 will be described according to a particular embodiment of the present invention. The engine controller 1630 includes a firing fraction calculator 1602, a firing timing determination module 1606, a firing control unit 1610, a power train parameter adjusting module 1608 and an engine diagnostics module 1650. The engine controller 1630 is arranged to operate the engine in a skip fire manner.

The engine controller 1630 receives an input signal 1614 representative of the desired engine output and various vehicle operating parameters, such as an engine speed 1632 and transmission gear 1634. The input signal 1614 may be treated as a request for a desired engine output or torque. The signal 1614 may be received or derived from an accelerator pedal position sensor (APP) or other suitable sources, such as a cruise controller, a torque calculator, etc. An optional preprocessor may modify the accelerator pedal signal prior to delivery to the engine controller 1630. However, it should be appreciated that in other implementations, the accelerator pedal position sensor may communicate directly with the engine controller 1630.

The firing fraction calculator 1602 receives input signal 1614 (and when present other suitable sources) and engine speed 1632 and is arranged to determine a firing fraction that would be appropriate to deliver the desired output. In various embodiments, the firing fraction is any data that indicates or represents a ratio of firings to firing opportunities (i.e., firings plus skips).

In some implementations, the firing fraction calculator 1602 initially generates an effective firing fraction. In various embodiments, an effective firing fraction (EFF) is the product of the firing fraction and the weighted average normalized reference cylinder charge for firing events. (Accordingly, in such embodiments, the effective firing fraction, unlike the firing fraction, may not clearly indicate a ratio of firings to firing opportunities.) In various embodiments, the normalized reference cylinder charge or cylinder torque fraction has at least two potential distinct non-zero values, each associated with a cylinder group. Mathematically the engine torque fraction (ETF) may be expressed in terms of the effective firing fraction (EFF) as $$ETF = EFF * CTF^{act}_H \qquad \text{(Eq. 5a)}$$

where $CTF^{act}_H$ is the actual charge in the highest charge level cylinder group. For systems with two charge levels the high level torque charge may be referred to as a full charge and the low torque level charge may be referred to as a partial charge. In the various examples previously described in this application, the amount of torque generated by the firing of a working chamber is characterized by a cylinder torque fraction (CTF), which gives an indication of a working chamber output relative to a reference value. For example, the CTF values may be relative to the maximum possible output torque generated by a working chamber with wide open throttle at a reference ambient pressure and temperature i.e., 100 kPa and 0 C, and the appropriate valve and spark timing. Of course, other ranges and reference values may be used. In this application, CTF is generally a value between 0 and 1.0, although it may be greater than 1.0 in some circumstances, such as low ambient temperatures and/or operation below sea level or in boosted engines. For some of the embodiments described in this application, the full charge involves a reference CTF value of 1.0 and a partial charge involves a reference CTF value of 0.7. For clarity these values will be used in the following description of the invention although it should be appreciated that these values will vary depending on exact engine design and engine operating conditions. It should be appreciated that the actual CTF delivered by a working chamber may be adjusted from these references values.

In some embodiments, the firing fraction calculator 1602 is arranged to determine one or more combinations of level firing fractions and cylinder torque levels (e.g., as seen in Eq. 2) that would be appropriate to deliver a desired output. These combinations may also be expressed as an effective firing fraction (EFF) 1611. In some designs, the engine torque fraction (ETF) may be expressed as the product of the EFF and an adjustment factor α:

$$ETF = EFF * CTF^{act}_H = EFF * CTF^{R}_H * \alpha \qquad \text{(Eq. 5b)}$$

where $CTF^{R}_H$ is the reference cylinder torque fraction associated with the cylinder group having the highest cylinder charge. As described above $CTF^{R}_H$ is assumed to be 1 in the description provided here, but this is not a requirement. The adjustment factor α varies depending on engine parameter settings such as spark timing and throttle and cam phaser position.

The firing fraction calculator 1602 may generate the effective firing fraction in a variety of ways, depending on the needs of a particular application. In some implementations, for example, an effective firing fraction is selected from a library of predefined effective firing fractions and/or from a lookup table. Various implementations involve using a lookup table to determine an effective firing fraction based on one or more engine parameters (e.g., gear, engine speed, etc.), fuel consumption, a maximum allowable CTF, and/or NVH associated with various effective firing fractions. These and other approaches will be described in greater detail elsewhere.

Once the calculator 1602 determines an effective firing fraction, it is passed to the firing timing determination module 1606. Based on the received effective firing fraction, the firing timing determination module 1606 is arranged to issue a sequence of firing commands that cause the engine to deliver the percentage of firings and firing output torque levels necessary to generate the desired engine output. This sequence may be generated in variety of ways, such as using a sigma-delta converter, or through the use of one or more look up tables or using a state machine. The sequence of firing commands (sometimes referred to as a drive pulse signal 1616) outputted by the firing timing determining module 1606 are passed to the firing control unit 1610 which orchestrates the actual firings through firing signals 1619 directed to the engine working chambers 1612.

The sequence of firing commands issued by the firing timing determination module 1606 indicates a combination of skips and fires and the torque level associated with the fires. In various embodiments, for each fire, the sequence indicates a particular torque output level, which is selected from two or more possible torque output levels. The sequence may take any suitable form. In some embodiments, for example, the sequence is made up of values such as 0, 0, 0.7, 1. This example indicates that during the next four firing opportunities, associated working chambers should be skipped, skipped, fired (at a lower level of working chamber output e.g., 70% of the reference cylinder torque output, etc.) and fired (at a high level of working chamber output e.g., 100% of the reference cylinder torque output, etc.) A firing sequence that indicates skips and fires having multiple levels of working chamber output are referred to herein as a multi-level skip fire firing sequence.

The firing timing determination module 1606 may determine the firing decisions and firing sequence in a variety of ways. In various implementations, for example, the firing timing determination module 1606 searches one or more lookup tables to determine an appropriate multi-level firing sequence. The appropriate multi-level firing sequence may be arranged to maximize fuel economy consistent with achieving acceptable NVH characteristics. Factors which influence NVH can include transmission gear, engine speed, cylinder charge, and/or other engine parameters. Based on the effective firing fraction, fuel economy, NVH considerations and/or one or more of the aforementioned factors, the module 1606 selects a multi-level firing sequence from multiple firing sequence options. In other implementations, the module 1606 determines a suitable firing sequence using a sigma delta converter or algorithm. Any suitable algorithm or process may be used to generate a firing sequence that delivers the desired engine torque. Various techniques for determining the firing sequence are described below in connection with FIGS. 17-22.

In the illustrated embodiment shown in FIG. 16, a power train parameter adjusting module 1608 is provided that cooperates with the firing timing determination module 1606. The power train parameter adjusting module 1608 directs the engine working chambers 1612 to set selected power train parameters appropriately to ensure that the actual engine output substantially equals the requested engine output. For example, under some conditions, to deliver a desired engine torque, the output generated from each firing of a working chamber must be adjusted. The power train parameter adjusting module 1608 is responsible for setting any suitable engine setting (e.g., mass air charge, spark timing, cam timing, valve control, exhaust gas recirculation, throttle, etc.) to help ensure that the actual engine output matches the requested engine output. The engine output is thus not constrained to operate at only discrete levels, but in various implementations can be adjusted in a continuous, analog fashion by adjustment of the engine settings. Mathematically, in some approaches this may be expressed by including a multiplicative factor in the output of each cylinder group. Equation 2 can thus be modified and combined with Equation 5 such that $$ETF=\alpha*CTF^R_H*EFF=\alpha_1*CTF^R_1*FF_1+\alpha_2*CTF^R_2*FF_2+\ldots+\alpha_n*CTF^R_n*FF_n \quad (Eq.\ 6)$$

where $\alpha_1$, $\alpha_2$, and $\alpha_n$ represent an adjustment factor in the cylinder load associated with each cylinder group and $CTF^R_1$, $CTF^R_2$, and $CTF^R_n$ represent the reference cylinder torque fraction for each cylinder group. It should be appreciated that some engine settings, such as the throttle position, impact the adjustment for all cylinder groups, while some settings, such as spark timing and/or injected fuel mass, can be adjusted in a group by group or even cylinder by cylinder manner. In various implementations, each different cylinder group will have different spark timing and injected fuel mass. The spark timing for each group may be adjusted to give optimum fuel efficiency for that group and the injected fuel mass may be adjusted for a substantially stoichiometric air/fuel ratio for all groups. In this case the amount of injected fuel will be approximately proportional to the generated cylinder torque.

The engine controller 1630 also includes an engine diagnostics module 1650. The engine diagnostics module 1630 is arranged to detect any engine problems (e.g., knocking, misfire, etc.) in the engine. Any known techniques, sensors or detection processes may be used to detect the problems. In various embodiments, if a problem is detected, the engine diagnostics module 1650 directs the firing control unit 1610 to perform operations to reduce the likelihood of the problem arising in the future. In various embodiments, a multi-level skip fire firing sequence is generated to address the potential problem. Various example operations that may be performed by the engine diagnostics unit 1650 are described later in the application e.g., in connection with FIGS. 24 and 26.

It should be appreciated that the engine controller 1630 is not limited to the specific arrangement shown in FIG. 16. One or more of the illustrated modules may be integrated together. Alternatively, the features of a particular module may instead be distributed among multiple modules. One or more features from one module/component may (instead) be performed by another module/component. The engine controller may also include additional features, modules or operations based on other patent applications, including U.S. Pat. Nos. 7,954,474; 7,886,715; 7,849,835; 7,577,511; 8,099,224; 8,131,445; 8,131,447; and 8,616,181; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/654,244, 13/654,248; 14/638,908; 13/799,389; 14/207,109; and Ser. No. 14/206,918; and U.S. Provisional Patent Application Nos. 61/080,192; 61/104,222; and 61/640,646, each of which is incorporated herein by reference in its entirety for all purposes. Any of the features, modules and operations described in the above patent documents may be added to the illustrated engine controller 1630. In various alternative implementations, these functional blocks may be accomplished algorithmically using a microprocessor, ECU or other computation device, using analog or digital components, using programmable logic, using combinations of the foregoing and/or in any other suitable manner.

Figure 17:
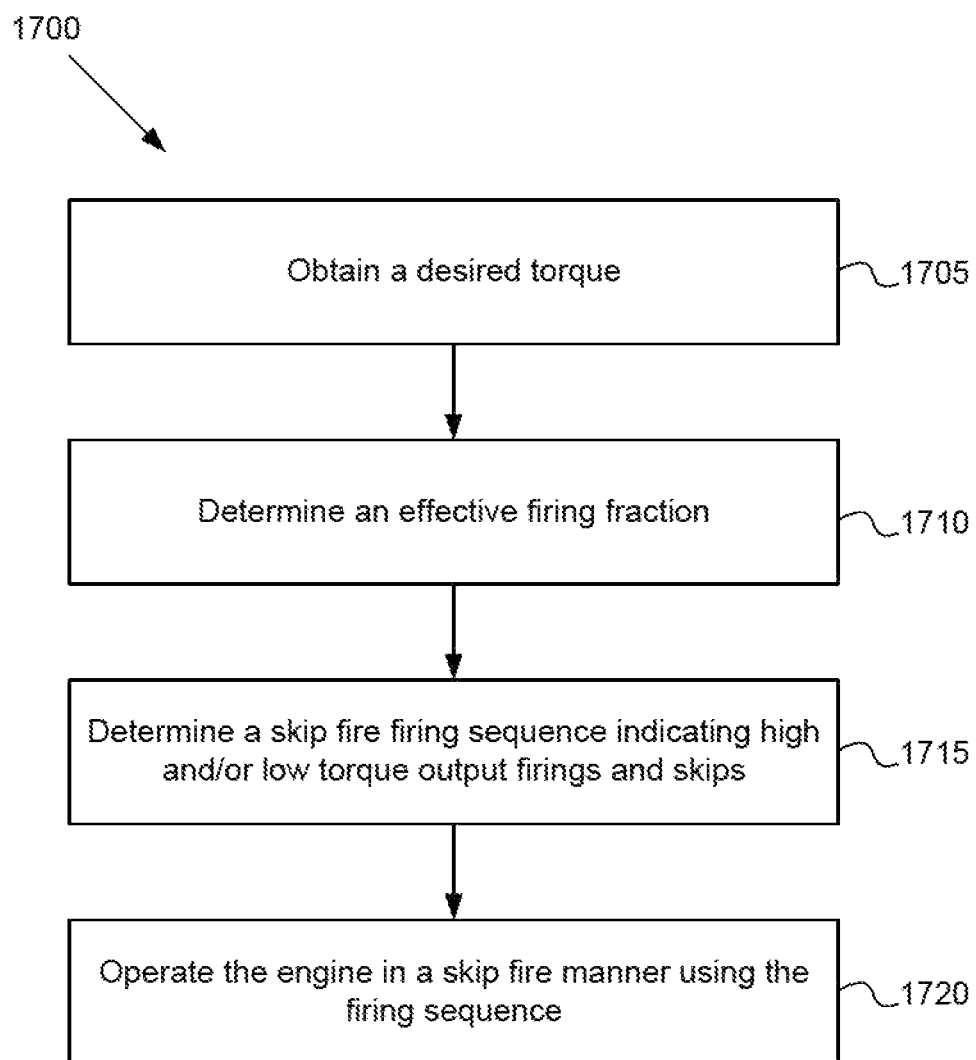
FIG. 17 is a flow diagram of a method for implementing multi-level skip fire engine control according to a particular embodiment of the present invention.

Referring next to FIG. 17, a method for determining a multi-level skip fire firing sequence according to a particular embodiment of the present invention will be described. The method may be performed by the engine controller 1630 illustrated in FIG. 16.

Initially, at step 1705, the engine controller 1630 determines a desired engine torque based on an input signal 1614 (FIG. 16), the current engine operating speed, transmission gear and/or other engine parameters. The input signal 1614 is derived from any suitable sensor(s) or operating parameter(s), including, for example, an accelerator pedal position sensor.

At step 1710, the firing fraction calculator 1602 determines an effective firing fraction that is suitable for delivering the desired torque. In various embodiments, as previously discussed, the effective firing fraction includes both the firing fraction for each cylinder group and the associated torque level of the cylinder group. The determination of the effective firing fraction may based on any suitable engine parameter e.g., gear, engine speed, etc., as well as other engine characteristics such as NVH and fuel efficiency. In some embodiments, the effective firing fraction is selected from a set of predetermined effective firing fractions that are determined to be fuel efficient and/or have acceptable NVH characteristics given the engine parameters. The effective firing fraction may be generated or selected using any suitable mechanism e.g., one or more lookup tables as described in connection with FIG. 18 of this application. One approach for determining a suitable effective firing fraction is illustrated in FIG. 18. FIG. 18 illustrates an example lookup table 1800 that includes indices for engine speed and an effective firing fraction (EFF). This table is associated with a particular gear i.e., there may be other tables for other gears. Alternatively, in another version of the illustrated table, gear is an additional index to the table. For each effective firing fraction and engine speed, the table indicates a maximum allowable high level working chamber torque output, which still provides acceptable NVH performance. Each effective firing fraction is based on a combination of the firing fraction associated with each firing level and the output at each level. For the case of a multi-level skip fire engine having two cylinder groups with different torque levels the effective firing fraction (EFF) can be expressed as the firing fraction (FF) and the ratio of high level firings to total firings denoted as HLF (high.) The FF and HLF values associated with the different effective firing fractions are shown in FIG. 19.

The maximum allowable working chamber output values reflects the fact that NVH generally tends to increase at higher levels of working chamber output. Thus, for any given engine speed and effective firing fraction, it is desirable to ensure that the working chamber output does not exceeds a particular level so that NVH is kept to acceptable levels. In various embodiments, the firing fraction calculator 1602 searches through the table, finding one or more effective firing fractions that are suitable for delivering a desired torque and that also meet the working chamber output requirements in the table.

To help clarify how the table may be used, an example will be described. In this example, the desired engine torque fraction is 0.2 and the engine speed is 1300 RPM. If the reference torque values associated with the high level firing cylinder group is at the maximum torque value, than the effective firing fraction must equal or exceed the engine torque fraction in order to generate the desired torque. Thus in this example only EFF values of 0.2 or greater are capable of generating the required torque output. Table 1800 in FIG. 18 lists an array of possible EFF values larger than 0.2 in column 1802.

The firing fraction calculator may search through the rows of the column 1802 for an engine speed of 1300 RPM to find a suitable effective firing fraction that provides optimum fuel efficiency and acceptable NVH simultaneous with delivering the requested engine torque.

By way of example, consider an effective firing faction of 0.57 when the engine load (engine torque fraction) is 0.2. Inspection of table 1800 shows that the torque level associated with the high torque firing ($CTF''_H$ of Eq. 5a and 5b) must be less than a CTF of 0.14, entry 1804, for acceptable NVH performance. However, it would only generate an ETF of 0.57*0.14=0.08, which is well below the requested torque level. Thus use of an EFF of 0.57 would be excluded in this case because it cannot simultaneously satisfy the NVH and torque requirements. In various embodiments, the firing fraction calculator 1602 searches through the rows of table 1800, until it finds a suitable effective firing fraction. For example, at an effective firing fraction of 0.70 the required working chamber output (CTF) to deliver the desired torque=0.2/0.70=0.29. Inspection of the table shown in FIG. 19 indicates that an EFF of 0.7 corresponds to a FF=1 and an HLF=0. Thus all the firings are low level firings corresponding to the low level reference CTF of 0.7 and all of the firing opportunities will involve fires and there will be no skips in this case.

The required high level working chamber output to deliver the desired torque is 0.29 which is below the high level working chamber output threshold described in table 1800 (0.58, entry 1806), so the effective firing fraction may be considered for use in operating the engine. The firing fraction calculator 1602 continues to search through the rows and may determine that multiple effective firing fractions meet the maximum working chamber output requirements of the table. Each such effective firing fraction is referred to herein as a candidate effective firing fraction.

The firing fraction calculator 1602 then selects one of the candidate effective firing fractions. This selection may be performed in any suitable manner. In some implementations, for example, the firing fraction calculator 1602 searches another table or module, which indicates the relative fuel consumption or efficiency for each of multiple effective firing fractions. Based on this fuel consumption information, the calculator selects one of the candidate effective firing fractions. That is, the calculator 1602 selects the candidate effective firing fraction that is most or highly fuel efficient. The selected effective firing fraction assumes a torque output per high level and low level firing that is necessary to deliver the desired engine output by adjustment of engine parameters to achieve the desired adjustment factors (as described in relation to Eq. 5). In various implementations, the selected effective firing fraction will generally be chosen based on maximizing fuel economy while operating with acceptable NVH performance Once the effective firing fraction has been selected or generated, it is passed to the firing timing determination module 1606.

Afterward, at step 1715 of FIG. 17, the firing timing determination module 1606 determines a multi-level skip fire firing sequence. The multi-level skip fire firing sequence indicates a sequence of firing decisions (i.e., fires and skips). For each fire in the sequence, a working chamber torque output level is selected. In various embodiments, this selection is indicated in the sequence.

The multi-level skip fire firing sequence may be generated in a variety of ways, depending on the needs of a particular application. In some embodiments, for example, the firing timing determination module 1606 searches one or more lookup tables that indicate a suitable firing sequence based on one or more selected engine parameters, including the effective firing fraction. Additionally or alternatively, the firing timing determination module 1606 may include a sigma delta converter or a circuit that outputs the firing decisions and/or firing sequence. A variety of different example implementations will be described below in FIGS. 19-22.

Figure 20:
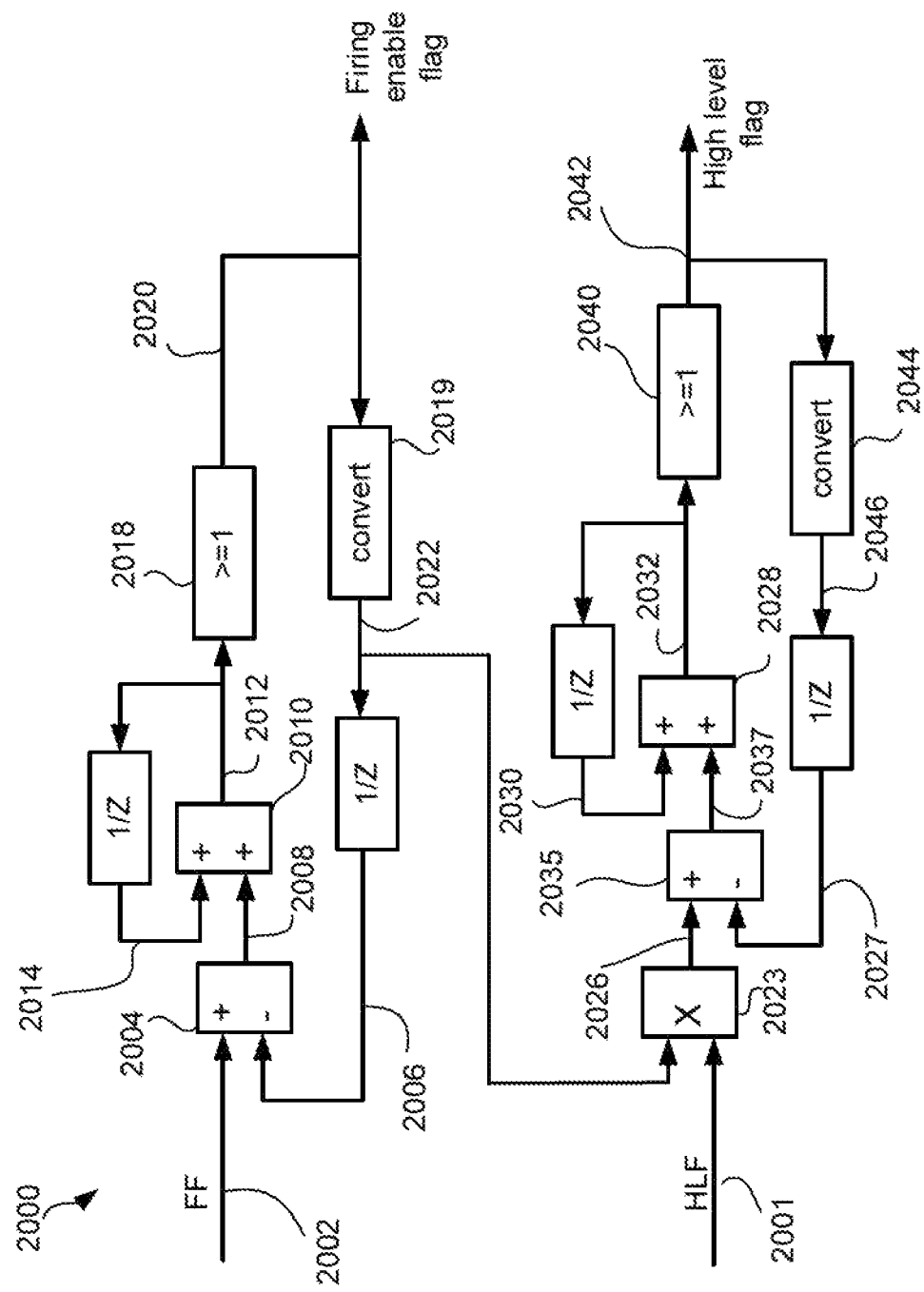
FIG. 20 is a diagram of an example circuit that generates a multi-level skip fire firing sequence according to a particular embodiment of the present invention.

FIGS. 19-20 illustrate one particular implementation. In this implementation, the firing timing determination module 1606 uses one or more lookup tables to determine characteristics of a multi-level skip fire firing sequence. An example lookup table is illustrated in FIG. 19. FIG. 19 is a table that indicates a firing fraction (FF) and a high level fraction (HLF) for each of a set of effective firing fractions (EFF). The firing fraction (FF) indicates a ratio of fires to firing opportunities (e.g., fires and skips) over an interval of multiple firing opportunities. The firing fraction does not necessarily assume a fixed level of torque output for each fire. A level fraction (LF) is any value that helps indicate a ratio of fires that each generate a particular (e.g., high or low) level of torque output relative to a total number of fires. In the illustrated embodiment, a high level fraction (HLF) is used, which indicates a ratio of high level torque output fires relative to a total number of fires.

In this particular example, the firing of a working chamber can generate two different levels of working chamber output, a high level of torque output (e.g., 100% of the reference cylinder torque output) and a low level of torque output (e.g., 70% of the reference cylinder torque output) Since there are two levels of torque output that can be generated by each fire, if the HLF is ⅓, then ⅓ of the firings over an interval generate high level torque output and ⅔ of the firings generate a low level torque output. The above system and indicators can be modified as appropriate for different implementations e.g., for more than two levels of working chamber torque output.

Using the lookup table illustrated in FIG. 19, the firing timing determination module 1606 determines characteristics of a multi-level skip fire firing sequence (e.g., a high level fraction and a firing fraction) based on the effective firing fraction (EFF) determined in step 1710. Thus, in the example illustrated in FIG. 19, if the EFF is 0.57, then the firing fraction is ⅔ and the high level fraction is ½.

In various embodiments, the firing timing determination module 1606 then generates a multi-level skip fire firing sequence that is in accordance with the determined firing characteristics. That is, to use the above example, if the firing fraction is ⅔ and the high level fraction ½, then the firing timing determination module 1606 generates a firing sequence that, over a selected interval, includes a mix of firing opportunity outcomes. In the interval, ⅔ of firing decisions are fires and ⅓ are skips. Of the fires, ½ are associated with high torque output and the rest are associated with low torque output. In some embodiments, the firing sequence takes the form of a series of CTF, numerical values e.g., a sequence of 0, 1, 0.7, 0 may indicate a skip, a high torque output fire, a low torque output fire and another skip. The firing sequence may be generated using any suitable algorithm, circuit or mechanism.

One such circuit is illustrated in FIG. 20. FIG. 20 illustrates a sigma delta circuit 2000, which is part of the firing timing determination module 1606. In the illustrated example, the firing timing determination module 1606 inputs the firing fraction (FF) and the high level fraction (HLF) obtained from the chart in FIG. 19 into the sigma delta circuit 2000 in order to generate a suitable multi-level skip fire firing sequence. The circuit 2000 may be implemented in hardware or software (e.g., as part of a software module or implementation in executable computer code.) In the figure, the symbol 1/z indicates a delay.

The top portion of the circuit 2000 effectively implements a first order sigma delta algorithm. In the circuit 2000, the firing fraction (FF) is provided at input 2002. At subtracter 2004, the firing fraction 2002 and feedback 2006 are added. The sum 2008 is passed to an accumulator 2010. The accumulator 2010 adds the sum 2008 with feedback 2014 to generate sum 2012. Sum 2012 is fed back into the accumulator 2010 as feedback 2014. Sum 2012 is passed to a quantizer 2018 and converted into a binary stream. That is, the quantizer 2018 generates firing value 2020, which forms a sequence of 0s and 1s. Each 0 indicates that an associated working chamber should be skipped. Each 1 indicates that an associated working chamber should be fired. The firing value is converted to a floating number at converter 2019 to generate value 2022, which is inputted into the subtracter 2004 as feedback 2006.

The bottom portion of the circuit indicates, for each fire indicated by value 2020, what level of torque output the fire should generate to deliver the desired torque. Value 2022 is passed to a multiplier 2023, which also receives the HLF 2001. The multiplier 2023 multiplies these two inputs. Thus, if a skip was indicated at value 2022, this causes the output of the multiplier 2023 to be 0. The above multiplication results in a value 2026, which is passed to a subtracter 2035. The subtracter 2035 subtracts feedback 2027 from the value 2026. The resulting value 2037 is passed to the accumulator 2028. The accumulator 2028 adds the value 2037 to the feedback 2030. The resulting value 2032 is fed back to the accumulator 2028 as feedback 2030 and is also passed to the quantizer 2040. The quantizer 2040 converts the input to a binary value i.e., 0 or 1. (For example, if the input value 2032 is >=1, then the output of the quantizer is 1. Otherwise, the output is 0.) The resulting high level flag 2042 indicates whether an associated fire (as indicated by firing value 2020) is a fire that should generate a high level torque output. That is, in this example, if the high level flag 2042 is a 0, the associated fire should generate a low level output. If the high level flag 2042 is a 1, the associated fire should generate a high level output. (If firing value 2020 indicates a skip, the high level flag 2042 will be a 0 and is not relevant.) The high level flag 2042 is passed to a converter 2044, which converts the value to a floating number. The resulting number 2046 is passed to the subtracter 2035 as feedback 2027.

The above circuit thus provides a multi-level skip fire firing sequence that can be used to operate the engine. In this example, based on the firing fraction (FF) (e.g., as determined in step 1710 of FIG. 17 and/or the lookup table of FIG. 19), a firing value 2020 is generated. If the firing value 2020 is a 1, an associated working chamber is fired. For each such fire, the high level flag 2042 may be 0 or 1, depending on the (high) level fraction 2001 (e.g., as determined using the lookup table of FIG. 19.) If the high level flag is a 1, then the fire should be a fire that generates a high level of output. If it is a 0, then the fire should be a fire that generates a low level of output. If the firing value 2020 is a 0, then the associated working chamber should be skipped. The passing of this zero value to multiplier 2023 will cause the associated high level flag to be 0 as well. Over time, the circuit can generate two streams of binary values that indicate firing decisions and working chamber output levels e.g.,0-0, 1-0, 0-1, 1-1 (i.e., firing value 2020 is a 0 or 1, high level flag 2042 is a 0 or 1).

Figure 21:
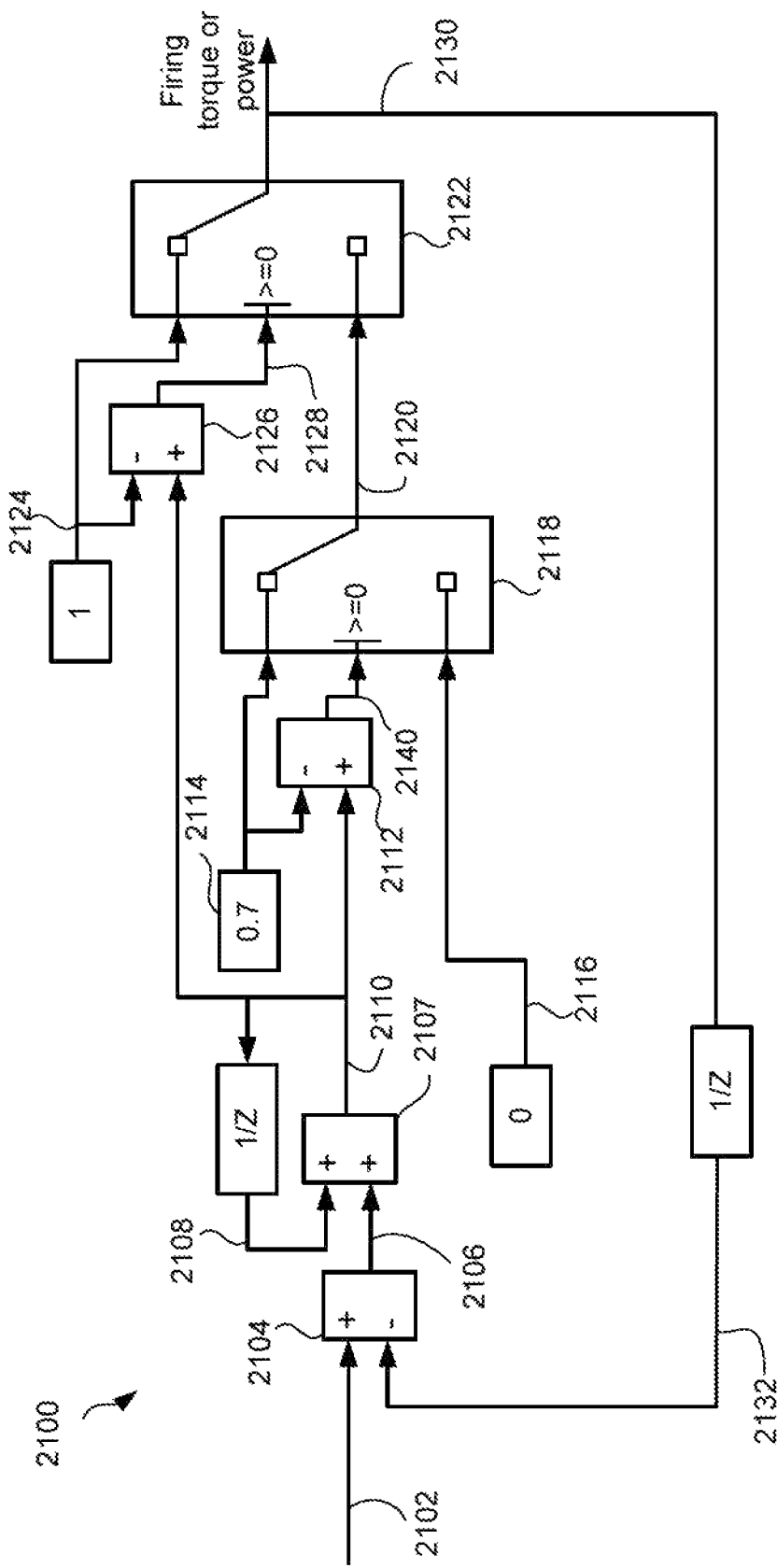
FIG. 21 is a diagram of an example circuit that generates a multi-level skip fire firing sequence according to another embodiment of the present invention.

FIG. 21 illustrates another circuit 2100 arranged to generate a multi-level skip fire firing sequence based on an effective firing fraction (EFF) e.g., as determined in step 1710 of FIG. 17. Such a circuit is sometimes called a multi-bit or multi-level sigma delta. From input 2102, which represents the effective firing fraction, the circuit is arranged to generate an output 2130, which indicates a skip, a fire at high level torque output or a fire at low level torque output.

In the circuit, an input 2102, which is the EFF determined in step 1710, is passed to a subtracter 2104. The feedback 2132 is subtracted from the input 2102. The resulting value 2106 is passed to an accumulator 2107. The accumulator 2107 adds feedback 2108 to the value 2106. The resulting sum 2110 is fed back to the accumulator 2107 as feedback 2108. The sum 2110 is also passed to the subtracter 2126 and the subtracter 2112. Value 2124 is defined as a 1, which indicates a high level of working chamber output. The value 2124 is passed to switch 2122 and to subtracter 2126. Subtracter 2126 subtracts value 2124 from sum 2110 to generate value 2128, which is passed to the switch 2122.

Value 2114 is defined in this example as 0.7 and is intended to indicate a low level of working chamber output. Value 2114 is passed to subtracter 2112 and to switch 2118. Subtracter 2112 subtracts value 2114 from sum 2110 to generate value 2140, which is passed to the switch 2118.

The switch 2118 receives three inputs: value 2114, value 2140 and value 2116. Value 2116 indicates the lowest level of working chamber output (e.g., a skip that generates no torque). The switch 2118 passes through value 2114 or value 2116 as its output depending on value 2140. If value 2140 is less than 0, the output of switch 2118 is equal to the value 2116. If the value 2140 is greater than or equal to 0, then the output of the switch 2118 is value 2114. The output 2120 of the switch is passed to switch 2122.

Switch 2122 receives three inputs: value 2120, value 2128 and value 2124. The switch passes as output value 2120 or value 2124 depending on value 2128. If sum 2128 is less than 0, the output of the switch 2130 is value 2120. If the value 2128 is greater than or equal to 0, then the output of the switch 2130 is value 2124. The output of the switch 2122 is passed to subtracter 2104 as feedback 2132.

The output 2130 of the switch 2122 indicates the firing decision and, if the firing decision involves a fire, what the torque output level of the fire is. In the illustrated embodiment, the output 2130 is either a 0, 1 or 0.7. Thus, based on the input 2102, the output 2130 indicates whether an associated working chamber during a particular working cycle should be skipped, fired at a high level of output or fired at a low level of output. Over time, the circuit 2100 is arranged to generate a string of values (e.g., 0, 1, 0.7, 0.7, 0, 1, etc.) that form a multi-level skip fire firing sequence (e.g., indicating skip, fire at high level torque, fire at low level torque, fire at low level torque, skip, fire at high level torque, etc.)

It should be noted that multi-level skip firing sequences have a mixture of at least three different levels, 0, 0.7, and 1 in the above example. By using three different levels, many different sequences can result in the same or similar effective firing fractions. The firing fraction calculator 1602 or the firing timing determination module 1606 (FIG. 16) may be used to determine which of these multi-level skip firing sequences yields the best fuel economy simultaneous with delivering the requested output torque level and acceptable NVH characteristics. Somewhat counter-intuitively it may sometimes be desirable to insert high torque output firings even when the overall engine torque output could be provided by using all low output torque pulses because the use of the high output torque pulse may shift the engine generated noise and vibration away from resonances or other undesirable frequencies.

FIG. 22 illustrates another approach for determining a multi-level skip fire firing sequence based on the effective firing fraction determined in step 1710 of FIG. 17. In this approach, the firing timing determination module 1606 uses one or more lookup tables to select a multi-level skip fire firing sequence based on the effective firing fraction (EFF) determined in step 1710.

FIG. 22 includes an example lookup table 2200. The lookup table 2200 indicates multiple different multi-level skip fire firing sequences. Each sequence (i.e., each row in the table) involves a number of firing opportunity outcomes and is associated with a different effective firing fraction. Each firing opportunity outcome is defined in the table as a 0 (designating a skip), a 1 (designating a fire at a high torque output level), or a 0.7 (designating a fire at a low torque output level). Each firing opportunity is associated with a particular cylinder, as indicated by the columns associated with cylinders 1-4 of a 4-cylinder engine.

In this example, the firing timing determination module 1606 uses the table 2200 to determine a multi-level skip fire firing sequence that delivers substantially the same amount of engine torque as the effective firing fraction determined in step 1710. By way of example, if the effective firing fraction is 0.47, the associated firing sequence is 0.7, 0.7, 0, 0.7, 0.7, 0, 0.7, 0.7, 0, 0.7, 0.7, 0. This means that on consecutive working cycles working chambers are fired, fired, skipped, fired, fired, skipped, fired, fired, skipped, fired, fired and skipped. The use of the 0.7 for each fire and the absence of a 1 indicates that all fired working chambers are fired to generate a low torque output, not a high torque output.

It should be appreciated that FIGS. 18-22 illustrate only a few ways of determining a suitable multi-level skip fire firing sequence, and that the above techniques may be modified as appropriate to meet the needs of different applications. In some implementations, for example, an effective firing fraction does not need to be calculated and/or a sigma delta converter is not required. Various embodiments involve determining a requested torque (e.g., as described in connection with step 1705 of FIG. 17) and consulting one or more lookup tables to determine the skip fire firing sequence based on the requested torque. In some approaches, the functionality of the tables is provided instead by a software module, software code, an algorithm, or a circuit.

Returning to FIG. 17, at step 1720, the firing timing determination module 1606 transmits the skip fire sequence to the fire control unit 1610. The fire control unit 1610 then assigns the firing decisions to associated working chambers and operates the working chambers accordingly. That is, as discussed in connection with step 1715, in various embodiments, each fire in the sequence is associated with a selection of a torque output level (e.g., a high torque output, a low torque output.) The fire control unit 1610 assigns each fire in the sequence and its associated torque output level to a particular working chamber. The working chambers are fired and operated to generate their associated torque output levels.

By way of example, if the firing sequence indicates that working chambers be sequentially skipped, fired at a high torque output and then fired at a low torque output, the firing control unit 1610 directs the associated working chambers to be operated in this manner. In various embodiments, this may involve independently controlling intake valves of the associated working chambers to generate the different torque output levels indicated in the skip fire firing sequence. The working chambers may be operated using any of the valve control techniques described herein (e.g., as discussed in connection with FIGS. 1A, 1B, 2-11, 12A-12F, 13A-13B, 14A-14H and 15) to generate the different torque output levels. The working chambers may also have any of the designs or arrangements discussed herein or in the above figures. It should be appreciated that in various embodiments where not all working chambers are capable of being fired/skipped or controlled at different torque levels the control methods described in FIGS. 17-22 may include provisions that recognize the engine hardware limitation and direct working chamber high-level-firings/low-level-firings-firings/skips appropriately.

In various embodiments, the determination of an effective firing fraction (step 1710), the determination of a firing sequence and/or the selection of high or low level torque output for selected working cycles and working chambers (step 1715) is performed on a firing opportunity by firing opportunity basis. Thus, the various operations described above can be performed quickly in response to changes in requested torque or other conditions. In other embodiments, the above operations are performed somewhat less frequently e.g., every second firing opportunity or every engine cycle.

The operations of method 1700 of FIG. 17 may be performed using any of the systems described in FIGS. 1-15. By way of example, method 1700 refers to the generation of a firing sequence in which each fire is associated with a particular torque output level. In various embodiments, these torque output levels are the different power levels or torque output levels discussed in connection with FIGS. 13A-13B and 14A-14H. That is, when the firing sequence (step 1720 of FIG. 17) is implemented at the engine and selected working chambers are fired to generate different levels of torque output, any of the valve control mechanisms and/or other systems described in the figures are used to generate those different levels of torque output.

Transitioning Between Engine Torque Fractions and Effective Firing Fractions

One challenge in skip fire engine control is managing transitions between different engine output torque levels. Consider an example in which the accelerator is slightly depressed indicating a desire for more torque. This increase in torque request can only be accomplished by increasing the cylinder load beyond that level that provides acceptable levels of NVH. Consequently a different firing fraction and level fraction are chosen. However, if the new pattern is abruptly used, the resulting change in delivered torque may be so abrupt that it creates a separate NVH problem. As a result, it may be desirable to have a more gradual transition between the two effective firing fractions.

Such transitions can be managed using a variety of techniques. For one, spark timing could be adjusted to lower the torque output during the transition. However, using spark timing in this manner is generally not fuel efficient. Another option is to manage the transition using multi-level skip fire engine control.

Figure 23:
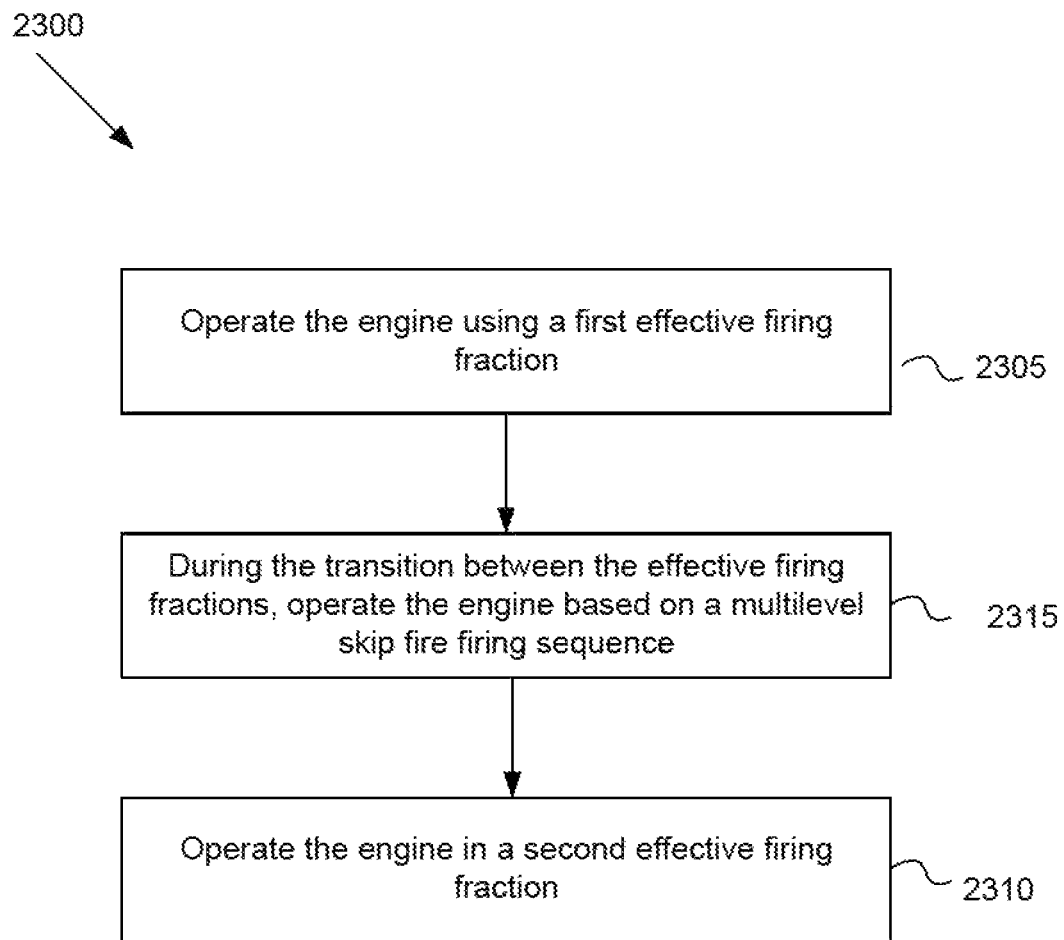
FIG. 23 is a flow diagram illustrating an example method for using multi-level skip fire engine control during a transition between firing fractions.

One example technique is described in FIG. 23. FIG. 23 illustrates a method 2300 for using multi-level skip fire engine control to manage a transition between first and second effective firing fractions. Initially, at step 2305, an engine is operated using a particular effective firing fraction. Afterward, the engine is operated using a second, different effective firing fraction (step 2310). These different effective firing fractions will generally be associated with different engine output torque levels although in some cases the engine torque may remain constant through an effective firing fraction transition.

Each of the effective firing fractions may involve operating the engine in a skip fire manner. In some cases there may be a variety of firing patterns while in other cases there may be a limited number of firing patterns, e.g., rolling cylinder deactivation, where a cylinder subsequently fires and skips on alternating firing opportunities. In some cases the effective firing fraction may correspond to a variable displacement operation, e.g. in which a fixed set of cylinders are deactivated or all cylinder operation is used. Even though variable displacement operation with fixed cylinder sets is not skip fire operation, if supported by the engine hardware, skip fire control may be used to transition between the various fixed displacement levels. In some cases the effective firing fraction may be zero, such as when coasting. During each operational state in which a particular firing fraction is used to operate the engine, the engine may be operated using any of the techniques described in connection with FIGS. 16-22, or using other engine control techniques.

At step 2315, during the transition between the two effective firing fractions, the engine is operated using a multi-level skip fire firing sequence. The multi-level skip fire firing sequence may be generated in a variety of ways, depending on the needs of a particular application. In some embodiments, for example, the effective firing fraction is gradually raised to one or more intermediate firing fractions during the transition. A multi-level skip fire firing sequence is generated based on the intermediate firing fraction(s) and used to operate the engine during the transition. The rate of change in the effective firing fraction during the transition may be based on any suitable engine parameter e.g., the absolute manifold pressure. Any of the techniques described in connection with the figures (e.g., one or more lookup tables, a sigma delta converter, etc.) may be used to generate the multi-level skip fire firing sequence. Additionally, various techniques for using skip fire operation during a transition between modes are described in co-assigned U.S. patent application Ser. No. 13/799,389, which is incorporated herein in its entirety for all purposes. Any of the techniques described therein may also be used.

One approach involves storing predetermined multi-level skip fire firing sequences in a library (e.g., in one or more lookup tables.) In various embodiments, each skip fire firing sequence is associated with particular effective firing fractions. To determine a suitable multi-level firing sequence to use for a transition, the firing timing determination module 1606 consults the library and selects one of the predetermined sequences. The selected sequence is then used to operate the engine during the transition.

Consider an example in which a four-cylinder engine is operated using a firing sequence in which the four working chambers are fired or skipped based on the pattern 0.7, 0, 0.7, 0. That is, the working chambers 1-4 are repeatedly fired, skipped, fired and skipped, where each fire is a low level output firing. (e.g., involving a CTF=0.7.) Thus, the equivalent effective firing fraction for this type of engine operation is 0.35. The engine then transitions to another type of engine operation in which the firing pattern will be 0.7, 0.7, 0.7, 0.7. That is, the working chambers will be repeatedly fired and no working chambers will be skipped. Each fire will generate the same low level of output (e.g., CTF=0.7.) The effective firing fraction for this type of engine operation is thus 0.7. That is, the engine output torque will double in the transition from the first effective firing fraction (0.35) to the second effective firing fraction (0.7) assuming other engine parameters, such as MAP and sparking time remain fixed.

In this example, the firing timing determination module 1606 consults one or more lookup tables. Based on the associated effective firing fractions, the lookup table(s) provide the following transitional multi-level skip fire firing sequences (underlined below):
0, 0.7, 0, 0.7 (first effective firing fraction)
0, 1, 0.7, 0
0.7, 0.7, 0, 0.7
0.7, 0.7, 0.7, 0.7 (second effective firing fraction).

The working chambers 1-4 are then operated based on the above transitional patterns as the engine transitions between the two effective firing fractions. As a result, engine torque has been more gradually increased, thus helping to smooth the transition and improve passenger comfort.

It should be appreciated that the above use of transitional multi-level skip fire firing sequences may be used in a wide variety of engine types. Accordingly, it is not required that each working chamber in the engine be capable of deactivation and/or of firing at multiple torque output levels. It is possible that only one or some of the working chambers will have the above functionality e.g., as previously discussed in connection with FIGS. 14A-14H. In the above example, for instance, only the first and third cylinders are capable of being deactivated. The second and fourth cylinders are fired during every engine cycle and are capable of adjusting their working chamber output between high and low levels.

In some situations, during a transition between two effective firing fractions, it can be desirable to change the level fraction. That is, in an engine control system that allows for multiple levels of working chamber torque output, during the transition between effective firing fractions it can be useful to change the frequency with which a particular working chamber output level is used.

Consider an example in which an engine is shifting between two effective firing fractions. When operating the engine using the first effective firing fraction, the effective firing fraction is ½ and the working chambers 1-4 of the engine are being operated using a sequence of 1-0-1-0 (i.e., fire at a high level of working chamber torque output, skip, fire at a high level of working chamber torque output, skip.) When operating the engine using the second effective firing fraction, the effective firing fraction is 1 and the engine is operated using a sequence of 1-1-1-1 (i.e., every working chamber is fired at a high level of output.) Thus, the engine torque output is doubled during the transition between the two effective firing fractions assuming other engine parameters remain fixed.

Since all of the aforementioned fires involve generating maximum working chamber output, the firing fraction for each of the aforementioned operational states equals the effective firing fraction (which assumes that each fire involves a CTF=1.0) and the high level fraction (HLF) for both states is 1 (i.e., 100% of fires involve high level output.) In this example, the working chambers are each also capable of being fired at a low level of working chamber torque output (e.g., CTF=0.7). Each effective firing fraction can be characterized by the following values: (X, Y), in which X=the firing fraction and Y=the HLF as shown in FIG. 19. Thus, the two states are characterized by (½, 1) and (1,1).

During a transition between two different effective firing fractions, it is sometimes desirable to have the engine operated in a skip fire manner using a different level fraction than the one used while the engine is operated in one or both the states. In the context of the above example, during the transition there is a change from (½, 1) to (1, 0) i.e., a firing sequence of 0.7-0.7-0.7-0.7. That is, during a subset of the firing in the transition between the two states, the working chambers are fired at a low level of output (e.g., CTF=0.7). The effective firing fraction thus transitions from ½ to 0.7 to 1. An advantage of using low level firings during the transition is that the NVH generated by such firings is lower. This is because the firings involve lower cylinder loads and also because there are no skips in the firing pattern.

In the above example, the engine was operated using a high level fraction of 1 when operating at a fixed effective firing fraction and 0 during a transition between the fixed firing fractions. The reverse can also take place. In other words, consider an example in which each working chamber can again be fired at one of two output levels, a high output level (e.g., CTF=1.0) or a low output level (e.g., CTF=0.7). In the initial effective firing fraction, the engine is operated using (½, 0). In the target effective firing fraction, the engine is operated using (1, 0). That is, while operating at a fixed effective firing fraction, the engine is operated using a high level fraction of 0 (i.e., all fires generate a lower level of torque output.) The transition, however, involves a different high level fraction. In this example, the engine is operated in a skip fire manner using a high level fraction of 1 i.e., (½, 1). Thus, the effective firing fraction changes from 0.35 to 0.5 to 0.7.

In other embodiments the effective firing fraction can be filtered to slow the transition between the initial and final firing fraction. This can be accomplished by filtering the firing fraction, filtering the level fraction, or filtering both quantities. The filtering techniques and time constants for the firing fraction and level fraction may equivalent or may differ depending on the nature of the transition. Methods of filtering and managing a transition are described in U.S. patent application Ser. Nos. 13/654,244 and 14/857,371 which are incorporated by reference herein in their entirety for all purposes. Any of these methods may be used during the transition. For example, in some embodiments the EFF is transitioned at a constant rate, by transitioning the FF at a constant rate and the LF monotonically at an appropriately calculated rate. Alternatively, one could transition first to an intermediate point, then to the final fraction (e.g. ½ to 0.7, to 1) so the LF or FF does not change monotonically. The intermediate value could be determined from a lookup table; for example, a 2D table works well where one dimension is the starting fraction and the second dimension is the target fraction. A third dimension may be added, such as an engine parameter or the rate of change of the accelerator pedal position. Also, in some cases it may be desirable to maintain a constant effective firing fraction, but change the firing fraction and level fraction. In this case the FF and LF could transition at constant opposing rates, such that their product, the EFF remains constant.

Knock Detection and Management

Multi-level skip fire engine control can be used to help manage knocking. Knocking tends to occur more frequently under higher pressures or temperatures e.g., when the working chamber is being fired with maximum amounts of air and fuel to generate the highest possible torque output. Thus, under selected conditions, it is desirable to fire working chambers at a lower torque output level when a knock has been detected.

Figure 24:
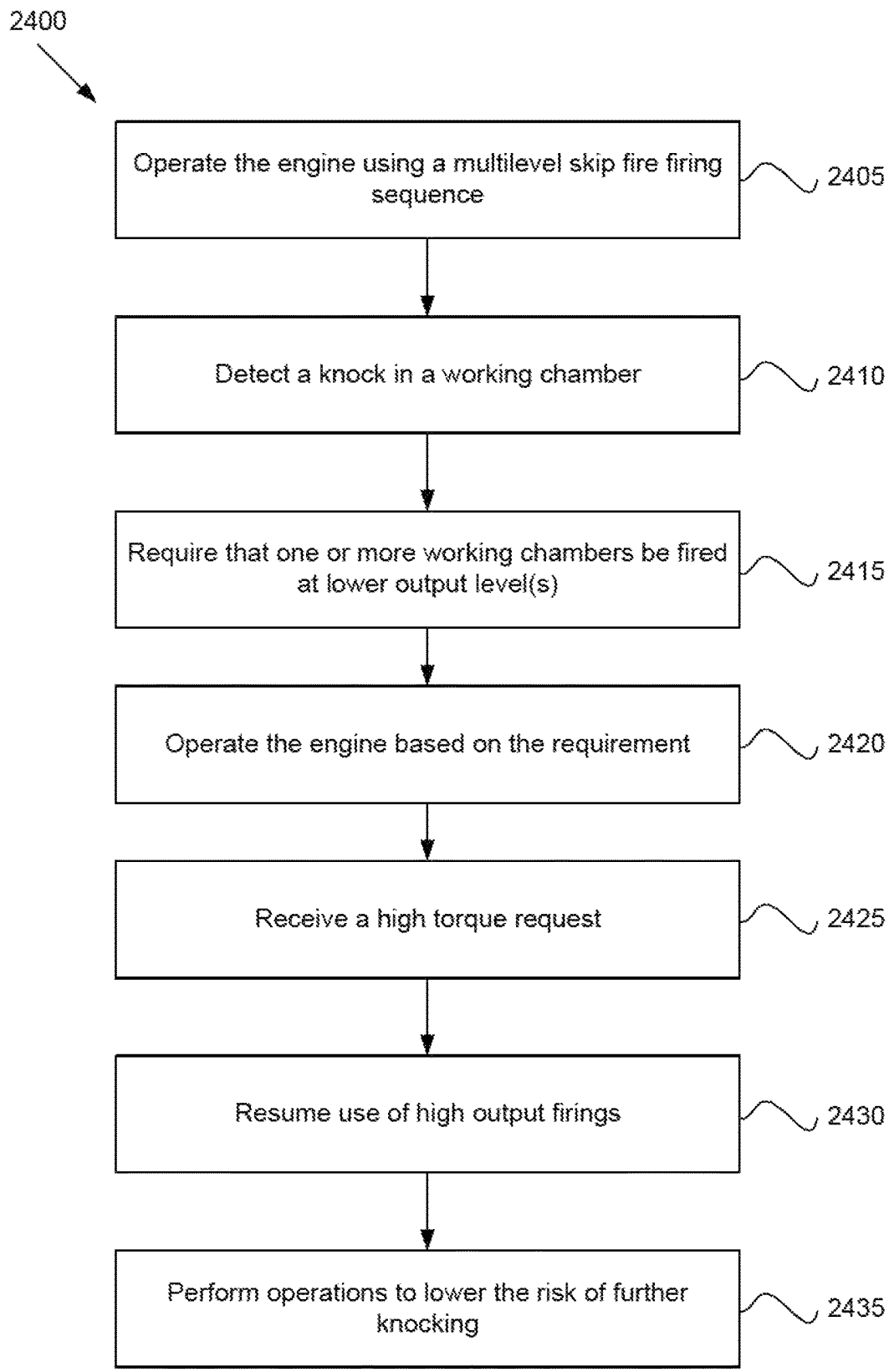
FIG. 24 is a flow diagram illustrating an example method for detecting and managing knock in an engine according to a particular embodiment of the present invention.

Referring now to FIG. 24, an example method 2400 for reducing the likelihood of knock in a multi-level skip fire engine control system will be described. Initially, at step 2405, the engine is operated using a multi-level skip fire firing sequence. That is, a multi-level skip fire engine controller 1630 receives a torque request and generates a multi-level skip fire firing sequence to deliver the desired torque. The engine is operated based on the firing sequence.

In various embodiments, the engine is operated using any of the multi-level skip fire operations, mechanisms and/or systems described in this application (e.g., as described in FIG. 16 or 17).

At step 2410, an engine diagnostics module 1650 (FIG. 16) detects a (potential) knock in one or more working chambers of the engine 1612. Any suitable technique or sensors may be used to detect possible knocking in the engine. In some implementations, for example, the engine diagnostics module 1650 receives sensor data from one or more knock sensors that detect vibration patterns generated by the working chambers of the engine 1612. The engine diagnostics module 1650 analyzes the vibration patterns to determine whether a knock may have taken place.

In response to the detection of a (potential) knock in a working chamber of the engine 1612, the engine diagnostics module 1650 requires one or more selected working chambers during one or more selected working cycles to be fired only at lower output level(s) (step 2415). Consider an example multi-level skip fire engine control system in which a particular working chamber can be fired at low (e.g., CTF=0.5), medium (CTF=0.7) and high (CTF=1.0) levels. In response to the detection of a (potential) knock in a particular working chamber, the engine diagnostics module 1650 prevents the working chamber from being fired at one or more selected levels (e.g., the medium and/or high levels.) Put another way, the (high) level fraction may be reduced/changed (e.g., from 1 to 0). This restriction may be applied to a single working chamber, a subset of the working chambers or all the working chambers. It may also be applied to a selected number of working cycles, or to all working cycles for a predetermined period of time.

In various embodiments, the engine diagnostics module 1650 transmits the above requirement to the firing timing determination module 1606, so that future skip fire sequences take such limitations into account when determining a sequence to deliver a requested torque. At step 2420, the engine is operated in skip fire manner based on the requirement. That is, the engine is operated as described in step 2405, except that the requested torque is delivered using only the allowed working chamber output levels.

Knocking tends to occur more frequently when a working chamber is fired to generate high torque output i.e., at a higher CTF. This is because pressures and temperatures within the working chamber tend to be significantly greater under such conditions. There are means of reducing the pressures and temperatures in the working chamber e.g., by adjusting the spark timing. However, such techniques generally tend to be less fuel efficient. By limiting firings to lower torque output levels by reducing the air charge, the likelihood of knocking can be reduced in a more fuel efficient manner.

Optionally, the engine diagnostics module 1650 includes a feature for re-enabling high torque output firings in response to high torque requests. At step 2425, the engine controller 1630 receives a high torque request e.g., based on data received from an accelerator pedal position sensor. In various embodiments, the high torque request must exceed a predetermined threshold for the method to progress to step 2430.

At step 2430, in response to the high torque request, the engine diagnostics module 1650 causes the engine control system to resume the use of high output firings. That is, some or all of the restrictions on high output firings that were implemented at step 2415 are removed. At step 2435, the engine diagnostics module 1650, fire control unit 1610 and/or power train parameter adjusting module 1608 performs one or more suitable operations for lowering the risk of further knocking. Any known technique may be used to reduce the risk of knocking e.g., spark timing adjustment.

Deceleration Cylinder Cutoff and Start/Stop Feature

Multi-level skip fire engine control can also be used in certain situations where no working chambers are being fired and the manifold absolute pressure rises to atmospheric levels. For example, when a vehicle is coasting and/or coming to a stop, the driver may release his or her foot from the accelerator pedal. In such a situation, various engine systems may shift to a mode referred to as decel cylinder cutoff (DCCO.) In this mode, to save fuel, the cylinders of the engine are deactivated while no torque is being requested from the engine. During that period, the intake and exhaust valves are shut and no air is delivered from the intake manifold into the working chambers of the engine.

Another situation is when a start/stop feature is implemented. That is, in some engine systems, when the vehicle has stopped, the engine, rather than idling, is turned off to conserve fuel. In both of the above situations, since no air is being delivered from the intake manifold into the working chambers, the manifold absolute pressure (MAP) equalizes with the atmospheric pressure. One problem with this is when the accelerator pedal is depressed again or some other engine control demands torque, the high MAP may cause the engine to deliver more torque than is required. If no measures are taken to mitigate this torque surge, the vehicle and/or engine may abruptly accelerate.

Figure 25:
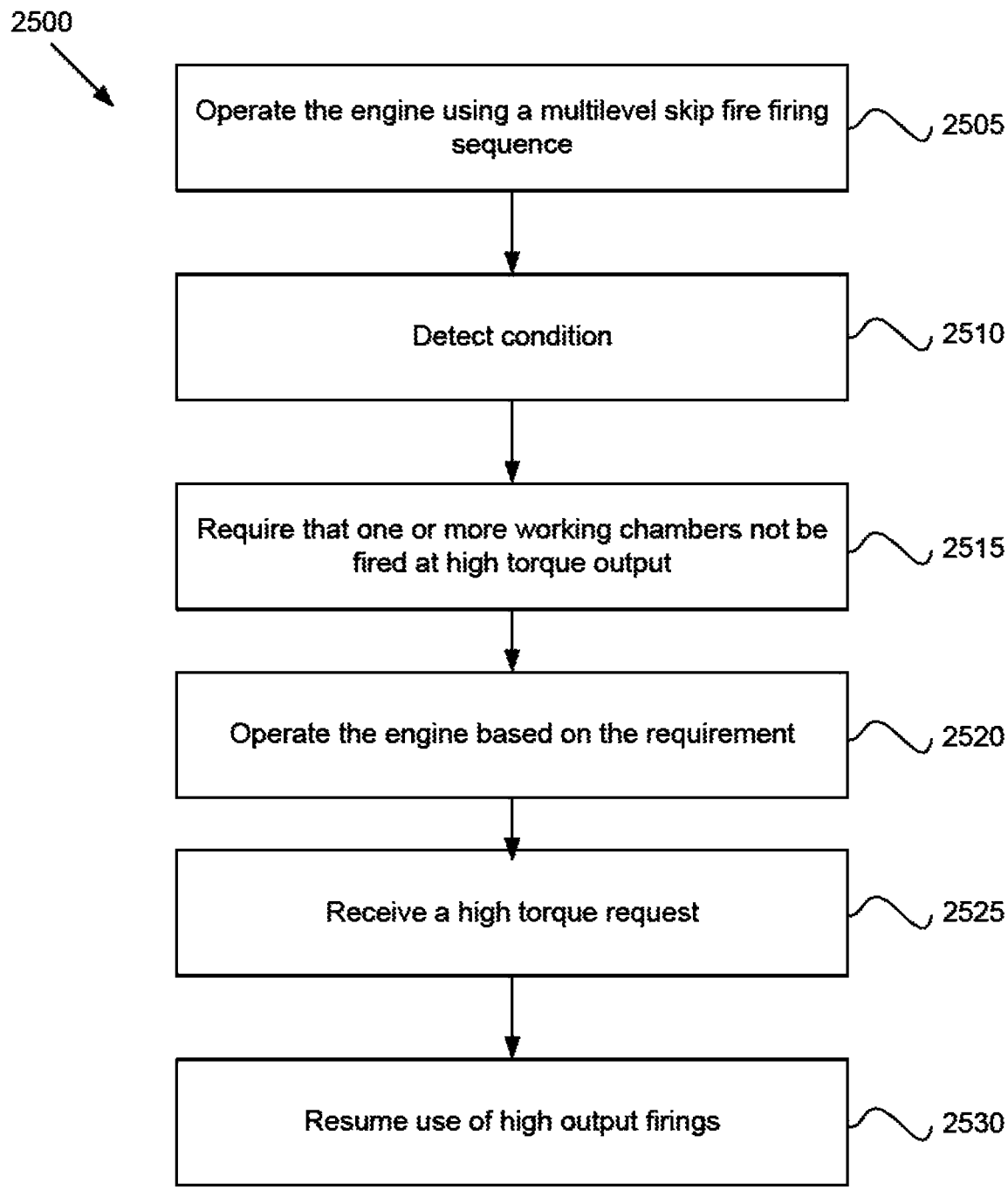
FIG. 25 is a flow diagram illustrating an example method for using multi-level skip fire engine control in response to particular engine operations.

Multi-level skip fire engine control may be used to address the above issue. One example method 2500 is illustrated in FIG. 25. Initially, at step 2505, the engine is operated using a multi-level skip fire firing sequence. That is, a multi-level skip fire engine controller 1630 receives torque requests and generates multi-level skip fire firing sequences to deliver the desired torque. The engine is operated based on the firing sequences. In various embodiments, the engine is operated using any of the multi-level skip fire operations, mechanisms or systems described in this application (e.g., as described in FIG. 16 or 17).

At step 2510, the engine controller 1630 (or any suitable module in the controller) detects that one or more conditions exist. In some embodiments, for example, the controller 1630 detects that the engine had been coasting/decelerating, has entered DCCO and/or that torque has now been requested. In other embodiments, the controller 1630 detects that the engine has been stopped using a start/stop feature and that torque is again being requested.

In response to the detection of the condition(s), the controller 1630 requires one or more selected working chambers during one or more selected working cycles to be fired only at lower torque output level(s) (step 2515). The requirement may take a wide variety of forms. In some embodiments, for example, the controller 1630 prevents any use of one or more higher working chamber output levels (e.g., CTF=1.0). Put another way, the high level fraction is reduced or maintained at a lower level (e.g., set to 0, ½, etc.) The requirement can include any of the operations and features described above in connection with step 2415 of FIG. 24 e.g., any number of working chambers or working cycles may be restricted in this manner, etc.

At step 2515, the engine is operated in a multi-level skip fire manner based on the requirement. That is, the engine is operated as described in step 2505, except that the requested torque is delivered using only the allowed working chamber output levels. In some embodiments, the requirement is in effect until a particular condition is met or for a predetermined period of time, after which normal multi-level skip fire engine operation is resumed. Alternatively or additionally, the high level fraction may be gradually increased over time until normal multi-level skip fire engine operation is resumed. This gradual increase may be adjusted dynamically based one or more engine parameters e.g., the manifold absolute pressure. The use of lower high level fractions and/or lower working chamber torque output levels helps to mitigate the effects of the high MAP.

Optionally, the engine controller 1630 may have a feature for re-enabling high output firings in response to high torque requests. At step 2525, the engine controller 1630 receives a high torque request e.g., based on data received from an accelerator pedal position sensor. In various embodiments, the high torque request must exceed a predetermined threshold for the method to progress to step 2530.

At step 2530, in response to the high torque request, the engine controller 1630 causes the fire control unit 1610 to resume the use of high output firings. That is, some or all of the restrictions on high torque output firings that were implemented at step 2515 are removed.

Any of the steps of the method 2500 may be modified as appropriate for different applications. By way of example, U.S. patent application Ser. No. 14/743,581, which is hereinafter referred to as the '581 application and is incorporated by reference in its entirety for all purposes, describes various techniques for implementing a start/stop feature with skip fire engine control. Any of the features or operations described in the '581 application may be included in method 2500 as well.

Engine Diagnostics Applications

The use of multi-level skip fire engine control can also have an impact on the design of engine diagnostics systems. In various engine diagnostics systems, an engine problem is detected based on the measurement of a particular engine parameter (e.g., crankshaft acceleration.) In various embodiments, such systems take into account the effects of firings that generate different levels of torque output.

Figure 26:
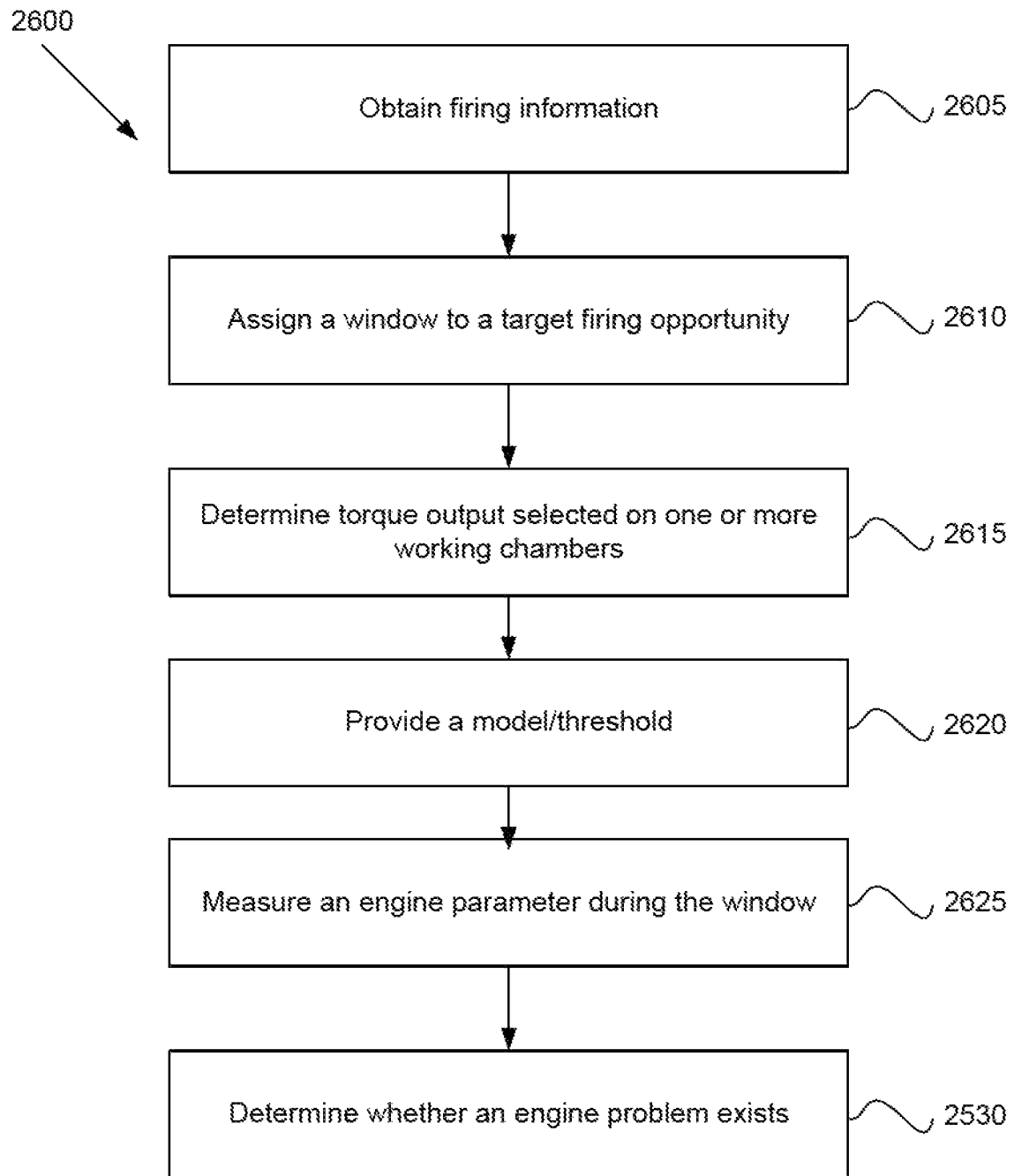
FIG. 26 is a flow diagram illustrating an example method for diagnosing and managing engine problems according to a particular embodiment of the present invention.

Referring to FIG. 26, an example method 2600 for diagnosing an engine problem is described. Initially, at step 2605, the engine diagnostics module 1650 obtains firing information e.g., from the firing timing determination module 1606 and/or the fire control unit 1610. The firing information includes but is not limited to firing decisions (e.g., skips or fires), firing sequences and the identities of associated working chambers. The firing information also includes information indicating the level of working chamber output associated with each decision to fire a working chamber.

At step 2610, the engine diagnostics module 1650 assigns a window to each firing opportunity. The window may be any suitable time period or interval that corresponds to a target firing opportunity of a target working chamber. A particular engine parameter will later be measured across the window to help determine if an engine problem has occurred in the target working chamber during the window. The characteristics of the window may differ depending on the type of engine parameter measurement.

Consider an example that involves a four stroke, eight cylinder engine. In this example, the assigned window is an angular window segment that corresponds to a 90° rotation of the crankshaft. During that window, a target working chamber is fired. That is, in this example, the window covers the first half the power stroke for the target working chamber. It should be appreciated that the window may have any suitable length, depending on the needs of a particular application.

At step 2615, the engine diagnostics module 1650 determines, during the assigned window, the working chamber torque output associated with one or more of the working chambers during the window. Put another way, in various embodiments, the firing timing determination module 1606 and/or fire control unit 1610 has assigned a firing decision to each working chamber. During a particular window assigned in step 2610, a target working chamber is being fired. During the same window, the other working chambers are at different stages of an operational cycle. To use the above example, some working chambers have already completed the power stroke; other are still completing or will later enter the power stroke. For their associated power strokes, each working chamber is arranged to be skipped or fired. For each fire, a particular working chamber output level has been assigned e.g., a firing at a low torque output, a firing at a high torque output, etc. The engine diagnostics module 1650 determines the working chamber torque output associated with one, some or all of the working chambers during the assigned window.

At step 2620, the engine diagnostics module 1650 provides an engine parameter threshold or model. In some embodiments, for example, the engine diagnostics module 1650 determines an engine parameter threshold (e.g., a crankshaft acceleration threshold) that will be used to later help determine whether an engine problem exists. That is, the threshold helps indicate an expected value for a later engine parameter measurement, given the firing information (step 2605) and torque output level determinations (step 2615). In other embodiments, the engine diagnostics module 1650 determines a model (e.g., a torque model) that can also be used to help identify an engine problem. By way of example, a torque model may be used to help indicate an expected torque that should be generated by the working chambers during the window. The model takes into account the firing decisions made for one or more working chambers during the window (e.g., as indicated by the firing information obtained in step 2605) and, for each fire, the associated torque output level (e.g., as indicated by the determinations made in step 2615.)

At step 2625, the engine diagnostics module 1650 measures an engine parameter during the window. A variety of engine parameters may be used, depending on the needs of a particular application and the engine problem that is being diagnosed. Some designs, for example, involve measuring crankshaft acceleration, MAP, and/or oxygen sensor output during the window, although any suitable parameter may be measured. It should be appreciated that different measurements may use different windows.

Based on the measurement (step 2625) and the threshold/model (step 2620), the engine diagnostics module 1650 then determines whether an engine problem exists. This determination may be performed in a variety of ways. In some embodiments, for example, the crankshaft acceleration is measured (step 2625). The measurement is used to estimate an actual torque generated during the window. This is compared to an expected torque calculated using the torque model (e.g., step 2620). If the actual torque is less than the expected torque, then the engine diagnostics module 1650 determines that a engine problem (e.g., a misfire) may exist. In other implementations, the crankshaft acceleration measurement is compared against a threshold (e.g., step 2620) and a torque estimate is not necessary. If the actual measurement exceeds the threshold, then it is assumed that an engine problem exists or is likely to exist.

To help illustrate how some embodiments of the method may be performed, the following example is provided. In this example, the engine is a four stroke, eight-cylinder in which cylinders are fired in the order 1-8-7-2-6-5-4-3. Each cylinder has independently controlled intake valves and/or is capable of operating the valves using different cycles, as described in connection with FIGS. 1-15. As a result, each cylinder, when fired, is capable of being fired at one of two torque output levels: e.g., low torque output (e.g., CTF=0.7) or high output (CTF=1.0).

The engine diagnostics module 1650 is arranged to determine whether working chamber 8 is misfiring. The module obtains firing information (step 2605), which indicates that during consecutive firing opportunities, working chambers 1, 8, 7, 2, 6, 5, 4 and 3 will be skipped, fired, skipped, fired, skipped, fired, skipped and fired, respectively. The module assigns a window to the above firing opportunity for working chamber 8 (step 2610). The assigned window takes place while cylinder 8 is in the first half of its power stroke and covers 90° rotation of the crankshaft.

In this example, the engine diagnostics module 1650 also determines that each of the above fires are at low torque output (step 2615), including the firing of working chamber 8. In this example, the module 1650 determines a crankshaft acceleration threshold that takes the cylinder torque output level into account. That is, if the engine diagnostics module 1650 determined instead that one, some or all of the above fires were instead at a high torque output, then the threshold would be different.

In various embodiments, the crankshaft acceleration threshold is particularly strongly influenced by the operation of working chamber 8 i.e., whether cylinder 8 is fired at a low or high torque output. However, the torque output levels associated with other cylinders may have an impact as well. For example, during the assigned window, when cylinder 8 is in the first half of the power stroke, cylinder 1 is in the second half of its power stroke. Whether cylinder 1 is fired at a low rather than a high torque output may also significantly influence the threshold.

The engine diagnostics module 1650 then measures the actual crankshaft acceleration during the window (step 2625). The module 1650 compares the measurement to the threshold. If the measurement falls (substantially) below the threshold, then it is determined that working chamber 8 misfired (or that there is a likelihood that it has misfired.)

The above example and method 2600 may be modified in a variety of ways for different applications. By way of example, co-assigned U.S. patent application Ser. Nos. 14/207,109, 14/582,008, 14/700,494, and 14/206,918, which are incorporated herein by reference in their entirety for all purposes, describe various engine diagnostics systems and operations. Any of the features or operations described in these applications may be incorporated into method 2600.

Any and all of the described components may be arranged to refresh their determinations/calculations very rapidly. In some preferred embodiments, these determinations/calculations are refreshed on a firing opportunity by firing opportunity basis although, that is not a requirement. In some embodiments, for example, the determination of an (effective) firing fraction (step 1710 of FIG. 17), the determination of a multi-level skip fire firing sequence (step 1715) and/or the operation of an engine based on the sequence (step 1720) are performed on a firing opportunity by firing opportunity basis. An advantage of firing opportunity by firing opportunity control of the various components is that it makes the engine very responsive to changed inputs and/or conditions. Although firing opportunity by firing opportunity operation is very effective, it should be appreciated that the various components can be refreshed more slowly while still providing good control (e.g., the firing fraction/sequence determinations may be performed every revolution of the crankshaft, every two or more firing opportunities, etc.).

The invention has been described primarily in the context of operating a naturally aspirated, 4-stroke, internal combustion piston engines suitable for use in motor vehicles. However, it should be appreciated that the described applications are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles. Boosted engines, such as those using a supercharger or turbocharger may also be used. In this case the maximum cylinder load may correspond to the maximum cylinder air charge obtained by boosting the air intake.

It should be also appreciated that any of the methods or operations described herein may be stored in a suitable computer readable medium in the form of executable computer code. The operations are carried out when a processor executes the computer code. Such operations include but are not limited to any and all operations performed by the firing fraction calculator 1602, the firing timing determination module 1606, the firing control unit 1610, the power train parameter adjusting module 1608, the engine controller 1630, the engine diagnostics module 1650, or any other module, component or controller described in this application.

Some of the above embodiments refer to the deactivation of a working chamber. In various implementations, the deactivation of a working chamber involves preventing the pumping of air through the skipped working chamber during one or more selected skipped working cycles. A working chamber may be skipped or deactivated in a variety of ways. In various approaches, a low pressure spring is formed in the working chamber i.e., after exhaust gases are released from the working chamber in a prior working cycle, neither the intake valves nor the exhaust valves are opened during a subsequent working cycle, thus forming a low pressure vacuum in the working chamber. In still other embodiments, a high pressure spring is formed in the skipped working chamber i.e., air and/or exhaust gases are prevented from escaping the working chamber. The working chamber may be deactivated in any suitable manner such that the working chamber contributes little or no power during its power stroke.

This application also refers to the concept of a working chamber that is used to generate different levels of torque or have different air charge or cylinder load levels. By way of example, these levels of torque output may be indicated in a multi-level skip fire firing sequence and/or stored in a lookup table or library. As previously discussed, in some embodiments, each such level of torque output is implemented using a distinct set of operations, which are described in this application (e.g., the opening of one intake valve and not another, the opening of both intake valves, the use of different cycles for different intake valves, etc.) In some approaches, the level of torque generated by a working chamber may vary on a firing opportunity by firing opportunity basis e.g., a cylinder may be skipped during a working cycle, fired during the next working cycle at a high torque output, fired during the next working cycle at a low torque output, and then skipped or fired at either torque output level.

Various embodiments of the invention have been primarily described in the context of a skip fire control arrangement in which cylinders are deactivated during skipped working cycles by deactivating both the intake and exhaust valves in order to prevent air from being pumped through the cylinders during skipped working cycles. However, it should be appreciated that some skip fire valve actuation schemes contemplate deactivating only exhaust valves, or only the intake valves to effectively deactivate the cylinders and prevent the pumping of air through the cylinders. Several of the described approaches work equally well in such applications. Further, although it is generally preferable to deactivate cylinders, and thereby prevent the passing of air through the deactivated cylinders during skipped working cycles, there are some specific times when it may be desirable to pass air through a cylinder during a selected skipped working cycle. By way of example, this may be desirable when engine braking is desired and/or for specific emissions equipment related diagnostic or operational requirements. It may also be useful when transitioning out of a DCCO (decel cylinder cut off) state. The described valve control approaches work equally well in such applications.

This application refers to various systems and techniques for selectively generating multiple different (e.g., high or low) torque output levels from fired working chambers. In various embodiments, it should be appreciated that during the selected working cycles during which the working chambers are fired, various engine conditions may remain substantially the same (although this is not a requirement.) Such engine conditions include but are not limited to manifold absolute pressure, cam phaser settings, engine speed and/or throttle position. Put another way, this application describes various example valve control systems and technologies (e.g., as discussed in connection with FIGS. 1A, 1B, 2-11, 12A-12F, 13A, 13B, 14A-14H and 15) that are arranged to generate different levels of torque output for fired working chambers without requiring that, for example, the throttle position, MAP, engine speed and/or cam phaser settings be varied to generate those different levels of torque output.

Various implementations of the invention are very well suited for use in with conjunction dynamic skip fire operation in which an accumulator or other mechanism tracks the portion of a firing that has been requested, but not delivered, or that has been delivered, but not requested such that firing decisions may be made on a firing opportunity by firing opportunity basis. However the described techniques are equally well suited for use in virtually any skip fire application (operational modes in which individual cylinders are sometimes fired and sometime skipped during operation in a particular operational mode) including skip fire operation using fixed firing patterns or firing sequences as may occur when using rolling cylinder deactivation and/or various other skip fire techniques. Similar techniques may also be used in variable stroke engine control in which the number of strokes in each working cycle are altered to effectively vary the displacement of an engine.

Although only a few embodiments of the invention have been described in detail, it should be appreciated that the invention may be implemented in many other forms without departing from the spirit or scope of the invention. There are several references to the term, firing fraction. It should be appreciated that a firing fraction may be conveyed or represented in a wide variety of ways. For example, the firing fraction may take the form of a firing pattern, sequence or any other firing characteristic that involves or inherently conveys the aforementioned percentage of firings. There are also several references to the term, "cylinder." It should be understood that in various embodiments, the term cylinder should be understood as broadly encompassing any suitable type of working chamber. An engine may also use a skip fire-like technique where instead of a cylinder operating on skips and fires, it operates at either a low torque or high torque output firing. In this control scheme, denoted as dynamic firing level modulation, the cylinders are not skipped. In dynamic firing level modulation, the output of fired cylinders are varied dynamically in a skip/fire type pattern. For example, a particular cylinder may sometimes be fired at a "high" or "higher" torque output level and may sometimes be fired at a "low" or "lower" torque output level, with the "low" output levels corresponding to the "skips" and the "high" output levels corresponding to the fires in a skip fire pattern. Therefore, the present embodiments should be considered illustrative and not restrictive and the invention is not to be limited to the details given herein.

What is claimed is:

1. A method of controlling operation of an internal combustion engine with an intake manifold and a plurality of working chambers to deliver a requested torque output, wherein each working chamber has at least one cam-actuated intake valve and at least one exhaust valve, the method comprising:
   requesting no torque output from the internal combustion engine;
   shutting the intake and exhaust valves of all of the plurality of working chambers so that no air is delivered from the intake manifold into the working chambers of the internal combustion engine;
   requesting a torque output from the internal combustion engine; and
   in response to the torque output request, firing a selected working chamber of the plurality of working chambers during a selected working cycle, wherein the selected working chamber is capable of being fired at a high torque output level and a low torque output level, and the low torque output level is used unless the requested torque output exceeds a predetermined threshold, wherein an air charge is adjusted to obtain the low torque output level.

2. A method as recited in claim 1 wherein all the intake and exhaust valves are actuated by one or more cam lobes coupled with one or more camshafts.

3. A method as recited in claim 1 wherein each of the working chambers has at least two associated intake valves, and the air charge for each working cycle is adjusted to generate the high or low torque output by independently controlling at least the two intake valves in the working chamber associated with such working cycle.

4. A method as recited in claim 1 wherein a camshaft shifts axially to engage different cam lobes with an intake valve stem of the at least one intake valve to adjust the air charge.

5. A method as recited in claim 4 wherein one of the different cam lobes is a zero-lift lobe that effectively deactivates its associated working chamber.

6. A method as recited in claim 1 comprising; adjusting an engine setting to ensure a delivered torque output matches the requested torque output.

7. A method as recited in claim 6 wherein the engine setting is selected from a group consisting of spark timing, cam timing, exhaust gas recirculation adjustment, and throttle position.

8. A method as recited in claim 1 wherein the requested torque output is delivered using only the low torque output level until a particular condition is met or for a predetermined period of time.

9. A method as recited in claim 1 wherein the internal combustion engine stops in response to the request for no torque output from the internal combustion engine.

10. An engine controller for an internal combustion engine including an intake manifold and a plurality of working chambers, wherein each working chamber has at least one cam-actuated intake valve, the at least one cam-actuated intake valve associated with each working chamber being selectively actuatable in a first manner to induct a first air charge to facilitate the production of a low torque output level for an associated working cycle and in a second manner to induct a second air charge that is greater than the first air charge to facilitate the production of a high torque output level for the associated working cycle, the engine controller comprising:
- a firing fraction calculator arranged to determine a firing fraction suitable for delivering a requested engine torque;
- a firing timing determination module arranged to determine a skip fire firing sequence based on the firing fraction wherein the skip fire firing sequence indicates whether, during a selected firing opportunity, a selected working chamber is skipped or fired and further indicates, for each fire, whether the fire generates the low torque output level or the high torque output level; and
- a firing control unit that is arranged to operate the plurality of working chambers of the internal combustion engine in a skip fire manner based on the skip fire firing sequence to deliver the requested torque;
- wherein the firing sequence associated with a request for no torque output is a series of skipped firing opportunities and a first fired working cycle after the series of skipped firing opportunities uses the low torque output level unless the requested torque output exceeds a predetermined threshold.

11. An engine controller as recited in claim 10 wherein all the intake and exhaust valves in the internal combustion engine are actuated by one or more cam lobes coupled with one or more camshafts.

12. An engine controller as recited in claim 10 wherein each of the working chambers has at least two associated intake valves, and the air charge for each working cycle is adjusted to generate the high or low torque output by independently controlling the at least two intake valves in the working chamber associated with such working cycle.

13. An engine controller as recited in claim 10 wherein a camshaft shifts axially to engage different cam lobes with an intake valve stem of the at least one intake valve to adjust the air charge.

14. An engine controller as recited in claim 13 wherein one of the different cam lobes is a zero-lift lobe that effectively deactivates its associated working chamber.

15. An engine controller as recited in claim 10 further comprising; a power train parameter adjusting module to adjust an engine setting so that an engine torque output matches the requested torque output.

16. An engine controller as recited in claim 15 wherein the engine setting is selected from a group consisting of spark timing, cam timing, exhaust gas recirculation adjustment, and throttle position.

17. An engine controller as recited in claim 10 wherein the requested torque output is delivered using only the low torque output level until a particular condition is met or for a predetermined period of time.

18. An engine controller as recited in claim 10 wherein the internal combustion engine stops in response to the request for no torque output from the internal combustion engine.

19. An engine controller for an internal combustion engine including an intake manifold and a plurality of working chambers, wherein each working chamber has at least one cam-actuated intake valve, the at least one cam-actuated intake valve associated with each working chamber being selectively actuatable in a first manner to induct a first air charge to facilitate the production of a low torque output level for an associated working cycle and in a second manner to induct a second air charge that is greater than the first air charge to facilitate the production of a high torque output level for the associated working cycle, the engine controller comprising:
- a firing fraction calculator arranged to determine a firing fraction suitable for delivering a requested engine torque;
- a firing timing determination module arranged to determine a skip fire firing sequence based on the firing fraction wherein the skip fire firing sequence indicates whether, during a selected firing opportunity, a selected working chamber is skipped or fired and further indicates, for each fire, whether the fire generates a low torque output level or a high torque output level; and
- a firing control unit that is arranged to operate the plurality of working chambers of the internal combustion engine in a skip fire manner based on the skip fire firing sequence to deliver the requested torque;
- wherein in response to a request for no torque output, the engine controller causes a series of skipped firing opportunities; and
- wherein the engine controller is configured to cause a first fired working cycle that is temporally the first working cycle that is fired after the series of skipped firing opportunities associated with the no torque output request to utilize the low torque output level to help mitigate a torque surge that would otherwise occur in the first fired working cycle, unless the requested torque output exceeds a predetermined threshold.

* * * * *